(12) United States Patent
Ang et al.

(10) Patent No.: US 12,455,624 B1
(45) Date of Patent: Oct. 28, 2025

(54) SYSTEMS AND METHODS FOR ASSESSING REACTION PERFORMANCE BASED ON SURFACE BIOPOTENTIALS

(71) Applicant: Pison Technology, Inc., Boston, MA (US)

(72) Inventors: Dexter Ang, Boston, MA (US); David Cipoletta, Boston, MA (US); Henry Valk, Boston, MA (US)

(73) Assignee: Pison Technology, Inc., Boston, MA (US)

( * ) Notice: Subject to any disclaimer, the term of this patent is extended or adjusted under 35 U.S.C. 154(b) by 0 days.

(21) Appl. No.: 18/431,801

(22) Filed: Feb. 2, 2024

(51) Int. Cl.
*G06F 3/01* (2006.01)

(52) U.S. Cl.
CPC .............. *G06F 3/015* (2013.01); *G06F 3/017* (2013.01)

(58) Field of Classification Search
CPC ....................................... G06F 3/015
See application file for complete search history.

(56) References Cited

U.S. PATENT DOCUMENTS

| | | | | |
|---|---|---|---|---|
| 11,953,938 | B1* | 4/2024 | Hochschild | G06F 1/12 |
| 2023/0280835 | A1* | 9/2023 | McDaniel | G06F 3/016 |
| | | | | 345/156 |
| 2023/0305633 | A1* | 9/2023 | Wagner | G06F 1/163 |
| 2024/0115202 | A1* | 4/2024 | Tran | A61B 5/002 |
| 2024/0249720 | A1* | 7/2024 | Shin | G06F 3/167 |

\* cited by examiner

*Primary Examiner* — Chun-Nan Lin
(74) *Attorney, Agent, or Firm* — Scale LLP

(57) ABSTRACT

Systems and methods for gesture control are described. In some embodiments, a system for assessing a reaction performance of a user engaging with an interactive digital program based on biopotentials detected at an external surface of a skin portion of the user may be provided. The system may include the wearable device comprising one or more electrodes configured to be disposed adjacent to an external surface of the skin portion. A first timestamp may be determined indicating a first time at which a stimulus condition is presented to the user. A second timestamp may be determined indicating a second time at which the biopotential signals indicate an intention by the user to perform a responsive action in response to the stimulus condition. A subject response time for the user may be determined based at least on the first timestamp and the second timestamp.

20 Claims, 38 Drawing Sheets

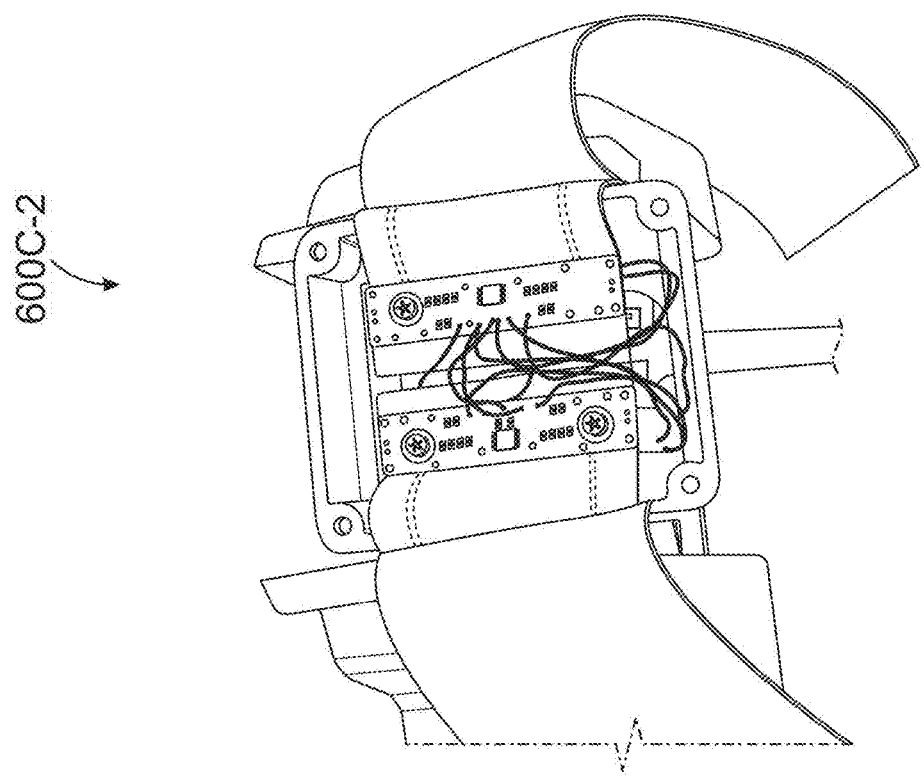
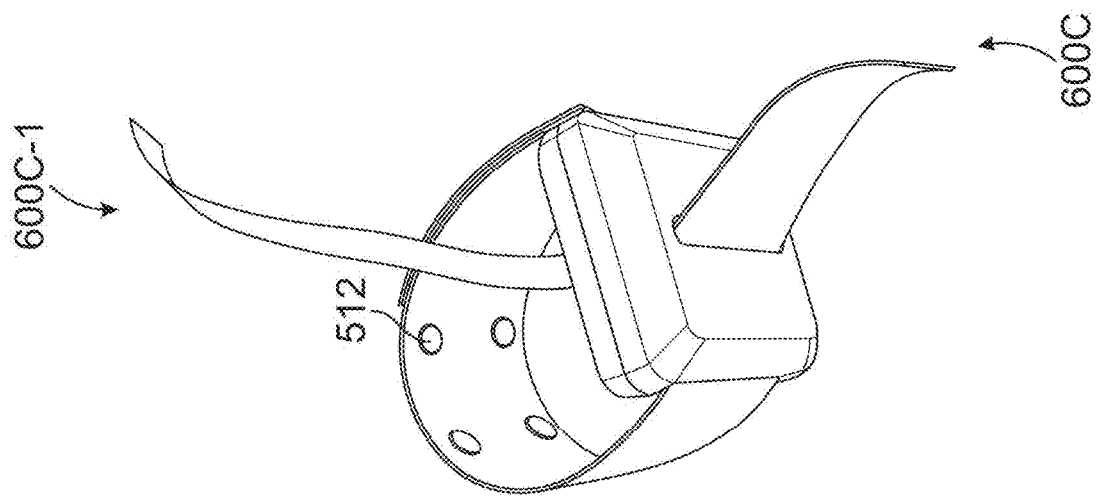
FIG. 6C

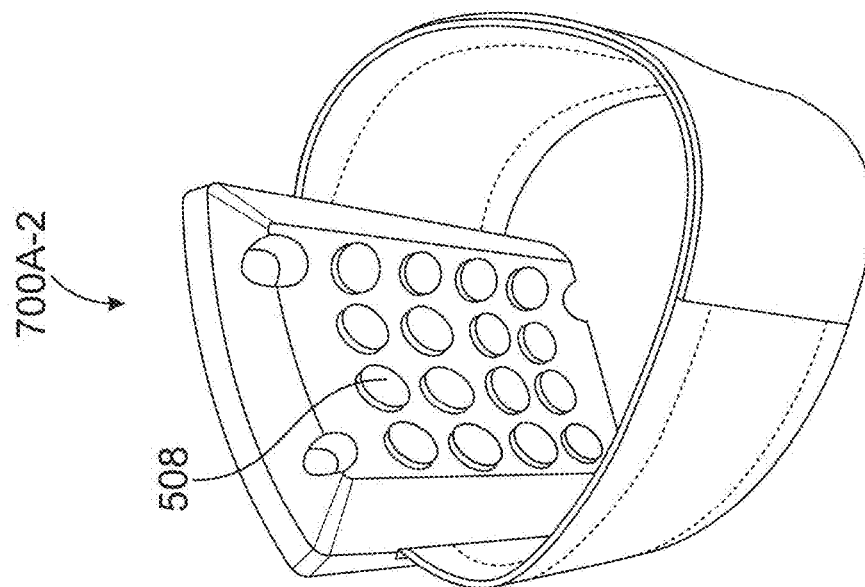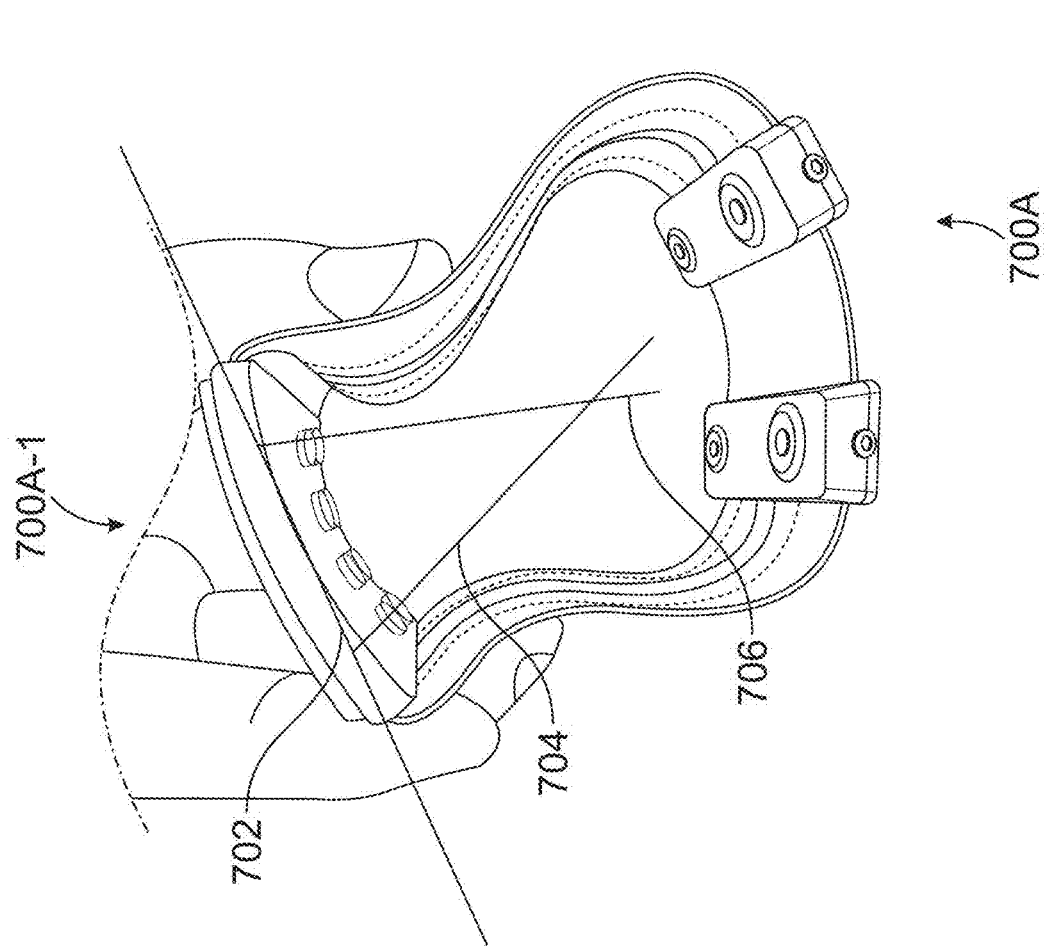
FIG. 7A

SYSTEMS AND METHODS FOR ASSESSING REACTION PERFORMANCE BASED ON SURFACE BIOPOTENTIALS

TECHNICAL FIELD

Various aspects of the present disclosure relate generally to systems and methods for reaction time testing using biopotential sensing wearable devices and, more particularly, to systems and methods for assessing a reaction performance of a user engaging with an interactive digital program based on biopotentials detected at an external surface of a skin portion of the user.

BACKGROUND

Generally, a reaction time test is intended to provide meaningful insight in regard to a current physiological state of the user. The test functions by having a user perform a specific action, such as pressing a touchscreen, in response to being presented a stimulus. The rationale behind why such a test can be used to evaluate physiological states is that when a user is in an impaired state, his or her responses to stimulus are slowed. Accordingly, when the results of a reaction time test show a user is responding slower than normal, it can be inferred that he or she is functioning at a diminished capacity. However, for such a test to be effective and reliable, the measurements used to track how long it takes for a user to respond must be accurate, or in other words, the time recorded must truly reflect how long it takes for a user to perform a responsive action. This may require both the time the stimulus was presented to the user to be accurately recorded and the time it took for the user to respond to such stimulus to be accurately recorded. Traditional reaction time tests are unable to provide such accuracy due to system and electromagnetic noise that cause variability/delays, obscuring the recorded measurements. A system that is able to execute a reaction time test with minimal external noise may be desirable.

Generally, reaction time tests can often provide insights into how a user performs various activities. The test can be administered (e.g., "behind-the-scenes" by one or more backend operations managing the execution of the activity) while the user engages/performs a given activity. Additionally, issues impacting the accuracy of the measurements taken during the reaction time test, which are mentioned above, may also distort the results of how well the user performed during the activity. An example of an activity where the reaction time test could provide useful insights is an interactive digital program, where a user interacts with generated digital content such as a displayed graphic. These interactions may in turn be used to measure start and stop times of one or more of the reaction time tests to assess the user's overall reaction performance. Such an assessment relies on these times recorded to truly reflect how long it takes for the user to interact with the generated digital content, and, accordingly, removing any noise that could skew the time measurements would be beneficial in improving accuracy. A system that is able to execute a reaction time test with minimal external noise during the course of a user performing an activity may be desirable.

The present disclosure is directed to overcoming one or more of these above-referenced challenges.

SUMMARY OF THE DISCLOSURE

According to certain aspects of the disclosure, systems, methods, and computer readable memory are disclosed for reaction time testing using biopotential sensing wearable devices and, more particularly, to systems and methods for assessing a reaction performance of a user engaging with an interactive digital program based on biopotentials detected at an external surface of a skin portion of the user.

For instance, a system for gesture control may include: a wearable device configured to be worn on a portion of an arm of a user. The wearable device may include: a plurality of electrodes disposed on an interior of the wearable device and configured to obtain biopotential signals from the user's arm; and a biopotential microchip. The biopotential microchip may include: one or more analog inputs configured to be coupled to and receive the biopotential signals from the plurality of electrodes, at least one of the one or more analog inputs being coupled to a respective differential amplifier configured to amplify differences in signals between pairs of electrodes; one or more analog-to-digital converters (ADCs), the one or more ADCs being configured to convert the biopotential signals to biopotential data; an accelerometer, the accelerometer being disposed onboard the biopotential microchip and configured to output acceleration data indicating an acceleration of the portion of the user's arm; a gyroscope, the gyroscope being disposed onboard the biopotential microchip and configured to output angular rate data indicating an angular rate of the portion of the user's arm; and a processor. Alternatively, in some embodiments, one, some, or all of the accelerometer, gyroscope, ADCs, and differential amplifiers may be located on different chips or installed as independent components. The processor may be configured to process the biopotential data outputted by the one or more ADCs, the acceleration data outputted by the accelerometer, and the angular rate data outputted by the gyroscope. The biopotential microchip may be configured to output, directly or indirectly, the biopotential data outputted by the one or more ADCs, the acceleration data outputted by the accelerometer, and the angular rate data outputted by the gyroscope, or derivatives thereof (collectively, the gesture data), to a machine learning classifier. The machine learning classifier may be configured to generate, based on the gesture data, a gesture output indicating a gesture performed by the user.

For instance, a system for gesture control may include: a wearable device configured to be worn on a wrist of a user. The wearable device may include: a hub and a wristband. The hub may include: a sealed housing; a plurality of hub electrodes; and a biopotential microchip. The biopotential microchip may include a plurality of analog inputs, a plurality of analog-to-digital converters (ADCs) configured to receive signals from the plurality of analog inputs, an accelerometer, and a gyroscope. The wristband and the hub together may be configured to encircle the wrist of the user. The wristband may include one or more wristband electrodes. The sealed housing of the hub may include an electrical port, the electrical port being electrically connected to at least a first analog input of the plurality of analog inputs of the biopotential microchip. The wristband may include one or more wristband conductors, the one or more wristband conductors electrically connecting the one or more wristband electrodes to the electrical port of the sealed housing of the hub. The plurality of hub electrodes are electrically connected via conductors disposed within the hub to one or more additional analog inputs of the plurality of analog inputs of the biopotential microchip. The one or more wristband electrodes are electrically connected to at least the first analog input of the plurality of analog inputs of the biopotential microchip via the wristband conductor and the electrical port of the sealed housing of the hub. The system may be configured to obtain biopotential data based on signals received by both the plurality of hub electrodes and the one or more wristband electrodes and processed by the ADCs of the biopotential microchip. The system may be configured to obtain wrist location data based on outputs from the accelerometer and the gyroscope. The system may be configured to transmit the biopotential data and the wrist location data to a machine learning classifier, the machine learning classifier being configured to analyze the biopotential data and the wrist location data to generate a gesture output indicating a gesture performed by the user.

For instance, a system for assessing a physiological state of a user based on biopotentials detected at an external surface of a skin portion of the user may include: a wearable device configured to be worn by the user. The wearable device may include one or more electrodes configured to be disposed adjacent to an external surface of the skin portion. The skin portion may be disposed at a body portion comprising peripheral nerve tissue that is biologically coupled to a central nervous system of the user. Biopotential signals generated at least in part by the peripheral nerve tissue may be obtained using the plurality of electrodes. A first timestamp may be determined. The first timestamp may indicate a first time at which a stimulus is presented to the user. In some embodiments, the stimulus may be presented to the user by illuminating an LED. In such a case, a stimulus delay between a machine instruction to illuminate the LED and the illumination of the LED may, for example, be less than a millisecond. In some embodiments, the first timestamp may be determined by registering a time, on a monotonic clock, that the machine instruction to illuminate the LED is generated, received by a microcontroller, and/or passed to the LED. In such a case, the biopotential signals received by the one or more electrodes may be converted to a series of biopotential data samples, and each sample of biopotential data may have a respective timestamp determined by the same monotonic clock used to generate the first timestamp. A second timestamp may be determined. The second timestamp may indicate a second time at which the biopotential signals indicate an intention by the user to perform a responsive action in response to the stimulus. In some embodiments, the second timestamp may be determined by analyzing the series of biopotential data samples, selecting a set of one or more biopotential data samples, from the series of biopotential data samples, that indicate the intention by the user to perform the responsive action, and determining the second timestamp based on one or more timestamps of the selected set of one or more biopotential samples that indicate the intention by the user to perform the responsive action. Based at least on the first timestamp and the second timestamp, a subject response time for the user may be determined. In some embodiments, the determined subject response time may measure, with an accuracy to within 1-5 milliseconds, a pre-motor time indicating a time between presentation of the stimulus and peripheral nerve activity responsive to the stimulus. The subject response time for the user, or a one or more values based thereon, may be compared to at least a baseline response time for the user, and, based on this comparison, an assessment of a physiological state of the user may be generated. In some embodiments, the assessment of the physiological state of the user may relate to whether the user is one or more of concussed, intoxicated, has a neurodegenerative disease, or mentally fatigued. In some embodiments, a software application may wirelessly transmit from a wearable device to a responsive device one or more of the assessment of the physiological state of the user, the subject response time, or one or both of the first timestamp and the second timestamp. The software application may be configured to receive a plurality of subject measurements for the user, each subject measurement comprising a respective response time that indicates, with an accuracy to within 5 milliseconds, a respective pre-motor time between presentation of a respective stimulus and respective peripheral nerve activity responsive to the respective stimulus. The software application may compare the subject response time for the user, or one or more values based thereon, to at least a baseline response time for the user that was previously determined by the software application. In such a case, the comparison may be performed by the software application comparing an aggregate measure, determined based on multiple of the plurality of subject measurements for the user, to the baseline response time for the user. In some embodiments, the method described above may include one or more of the following: receiving a human instruction to perform a response time measurement for the user; causing a software instruction to present the stimulus to the user to be wirelessly transmitted to a wearable device; receiving, from the wearable device, user measurement data, the user measurement data comprising a user premotor time and/or one or more user timestamps; and associating the user measurement data with a user account for the user and store the user measurement data.

For instance, a system for assessing a reaction performance of a user engaging with an interactive digital program based at least in part on biopotentials detected at an external surface of a skin portion of the user. A wearable device may be configured to be worn by the user. The wearable device may comprise one or more electrodes configured to be disposed adjacent to an external surface of the skin portion. The skin portion may be disposed at a body portion comprising peripheral nerve tissue that is biologically coupled to a central nervous system of the user. The system may be configured to perform one or more of the following described below. Biopotential signals generated at least in part by the peripheral nerve tissue may be obtained, using the plurality of electrodes. A first timestamp may be determined. The first timestamp may indicate a first time at which a stimulus condition based on a graphical display is presented to the user during the interactive digital program. In some embodiments, the system may comprise the interactive digital program being executed by the one or more processors. The one or more processors may be wirelessly connected to the wearable device and configured to generate a real-time data stream comprising a sequence of digitally encoded signals based on instructions from the interactive digital program. At least a portion of the sequence of digitally encoded signals may be indicative of the stimulus condition. In some embodiments, the interactive digital program may provide an instruction to the one or more processors indicating that the stimulus condition of the graphical display has been presented to the user. The first timestamp may be determined by registering a time, on a game clock, that the instruction to present the stimulus condition is received and processed by the one or more processors. A second timestamp may be determined. The second timestamp may indicate a second time at which the biopotential signals indicate an intention by the user to perform a responsive action in response to the stimulus condition. In some embodiments, the wearable device may comprise a monotonic clock and one or more analog-to-digital converters (ADCs) being configured to convert biopotential signals received by the one or more electrodes to a series of biopotential data samples, and each sample of biopotential data has a respective timestamp determined by the monotonic clock. The second timestamp may be determined by analyzing the series of biopotential data samples, selecting a set of one or more biopotential data samples that indicate the intention by the user to perform the responsive action in response to the stimulus condition, and determining the second timestamp based on one or more timestamps of the selected set of one or more biopotential samples that indicate the intention by the user to perform the responsive action. A subject response time for the user may be determined based at least on the first timestamp and the second timestamp. In some embodiments, during a session of the user engaging in the interactive digital program, a plurality of subject response times may be determined for the user, at periodic intervals, based on respective first and second timestamps and an aggregate measure may be determined based on multiple of the plurality of subject response times. Based on the aggregate measure, or one or more values based thereon, a score associated with the reaction performance of the user may be generated. The score may relate to one or more of actions per minute (APM), completion time, decision-making speed, response time, or time-to-target. In some embodiments, the one or more processors executing the interactive digital program may be included in one or more of a video game console, a personal computer, a mobile device running a software application, or an extended reality (XR) headset. In some embodiments, the system may comprise an inertial measurement unit (IMU) device connected to the one or more processors. The IMU device may determine a current position of the user's hand. The system may be configured to predict a gesture of the user based, at least in part, on the biopotential signals and the hand position. Based on the predicted gesture of the user, the interactive digital program may be configured to provide an instruction to the one or more processors indicating to initiate an animation sequence reflecting the predicted gesture.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIGS. 6A-6D depict graphics of different aspects of wristband electrodes of a biopotential sensor.

FIGS. 7A-7B depict graphics of different aspects of hub electrodes disposed in a curved arrangement.

DETAILED DESCRIPTION

In general, the present disclosure is directed to methods and systems for reaction time testing using biopotential sensing wearable devices and, more particularly, to systems and methods for assessing a reaction performance of a user engaging with an interactive digital program based on biopotentials detected at an external surface of a skin portion of the user. As discussed in detail herein, a wearable device of the present disclosure may be configured to be worn on a portion of an arm of a user. The wearable device may include a plurality of electrodes disposed on an interior of the wearable device and configured to obtain biopotential signals from the user's arm. The wearable device may also include a biopotential chip. The biopotential chip may be configured to output, directly or indirectly, biopotential data, acceleration data, and/or angular rate data, or derivatives thereof ("gesture data"), to a machine learning classifier. The biopotential chip may include an accelerometer, a gyroscope and biopotential signal processing components on the same substrate. The machine learning classifier may be configured to generate, based on the gesture data, a gesture output indicating a gesture performed by the user.

In some cases, the biopotential device may include switches or a multiplexer to dynamically rearrange signal pathways between the plurality of electrodes and analog inputs on the biopotential chip (and/or other biopotential chips). In this manner, the wearable device may be reconfigured based on remote instructions (e.g., from a server) or over time (as a user provides feedback during training). Thus, the wearable device may improve over time without requiring hardware replacement of components.

In some cases, the plurality of electrodes may include one or more wristband electrodes and/or a plurality of hub electrodes in a hub. In this manner, the wristband electrodes may enable the wearable device to sense biopotentials away from the hub and increase a range of gesture detection.

In some cases, the hub electrodes may be arranged in a curved manner. In this manner, the hub electrodes provide increased signal quality across the hub electrodes, especially in contrast to flatly arranged hub electrodes near the edges of a hub.

Thus, methods and systems of the present disclosure may be improvements to computer technology and/or gesture detection technology using biopotential data.

Environment

Figure 1:
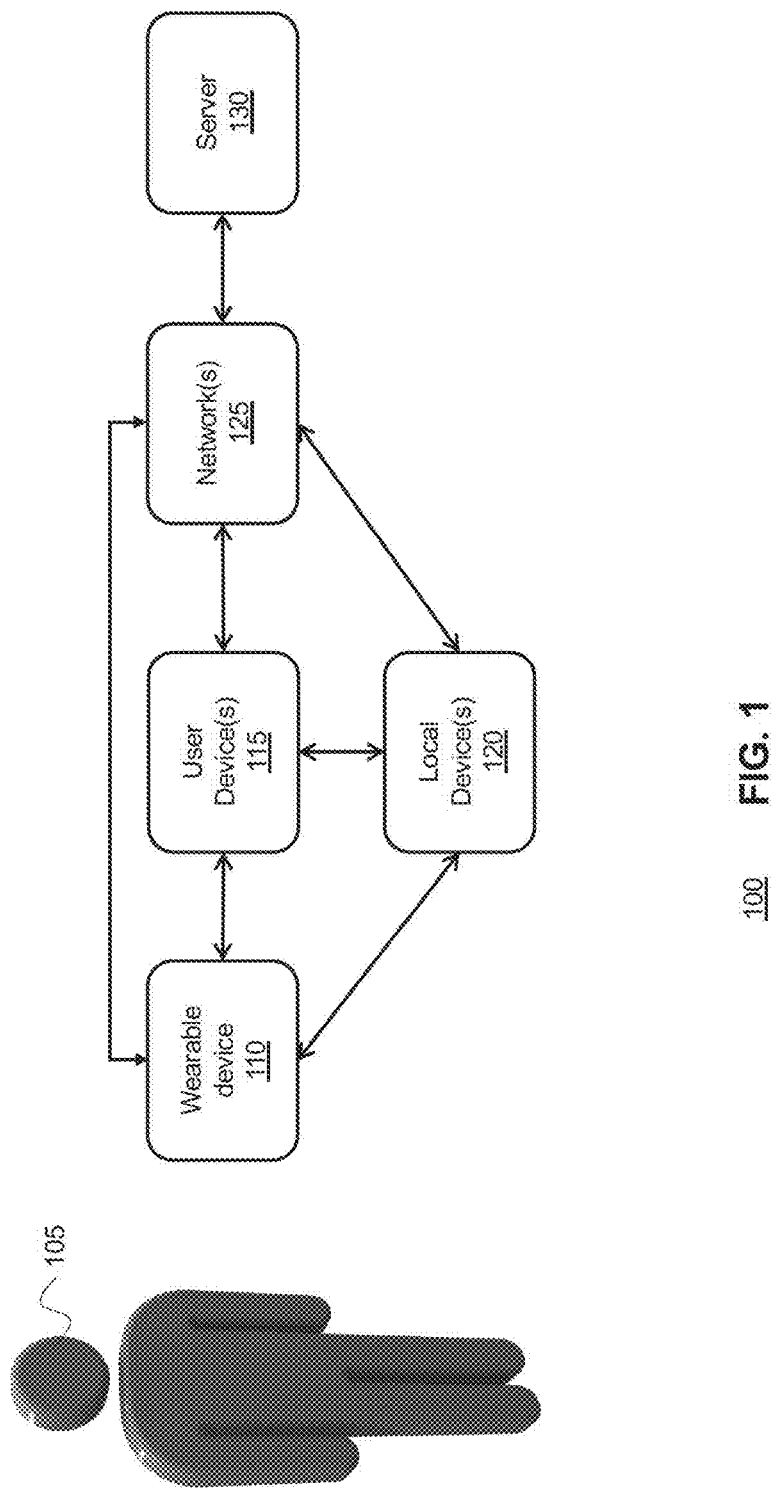
FIG. 1 depicts an example environment for gesture control using a wearable device.

FIG. 1 depicts an example environment 100 for gesture control using a wearable device 110. The environment 100 may include a user 105, the wearable device 110, a user device 115, local device(s) 120, network(s) 125, and a server 130. The wearable device 110 may obtain gesture data, so that a gesture output can be generated (e.g., by the wearable device 110, the user device 115, the server 130). The gesture output may indicate a gesture performed by the user 105. The wearable device 110, the user device 115, and/or the server 130 may then perform one or more command actions based on the gesture output, such as control remote devices (e.g., robots, UAMs, or systems), control local devices, such as the user device 115 or the local devices 120, and the like.

The user 105 may wear the wearable device 110 on a portion of an arm of the user 105, such as the wrist and/or the forearm of the user 105. The wearable device 110 may be gesture control device, a smartwatch, or other wrist or forearm wearable (e.g., a smart sleeve).

In some cases, the user device 115 may be a personal computing device, such as a cell phone, a tablet, a laptop, or a desktop computer. In some cases, the user device 115 may be an extended reality (XR) device, such as a virtual reality device, an argument reality device, a mixed reality device, and the like.

The local device(s) 120 may be other information technology devices in environments, such as the home, the office, in public, and the like. The local device(s) 120 may include speakers (e.g., smart speakers), TVs, garage doors, doors, cars, internet of things (IoT) devices that control various electrical and mechanical devices. Thus, local device(s) 120 may generally be any software controllable device or system that can receive action commands from the wearable device 110 or the user device 115 based on gesture outputs.

The network(s) 125 may include one or more local networks, private networks, enterprise networks, public networks (such as the internet), cellular networks, satellite networks, to connect the various devices in the environment 100. In some cases, the wearable device 110 may connect to server 130 (or local device 120) via the user device 115 and/or network(s) 125, while in some cases the wearable device 110 may connect to the server 130 (or a local device 120) directly or via the network(s) 125. For instance, in some cases, the wearable device 110 may connect to the local device 120 over a short range communication standard (such as Bluetooth or WIFI) and connect to the server 130 via a longer range communication standard (such as 4G, 5G, or 6G cellular communications, or satellite communications).

The server 130 may perform certain actions, such as host ML classifiers, provide software updates to components of the environment 100, and provide personalization data for the wearable device 110. In the case of hosting ML classifiers, the server 130 may receive requests from the wearable device 110 (e.g., via user device 115 or not) to generate a gesture output (e.g., using a certain ML classifier) based on gesture data; process the request to generate the gesture output; and transmit the gesture output and/or an action command based on the gesture output to the wearable device 110. In some cases, the user device 115 may host ML classifiers and perform the same process for the wearable device 110. In some cases, the wearable device 110 may host the ML classifiers and perform the process onboard the wearable device 110.

In the case of providing software updates to components of the environment 100, the server 130 may transmit software updates and/or ML classifiers updates to the wearable device 110 (e.g., to change certain features thereon), transmit software features and/or ML classifiers updates to the user device 115 (e.g., to change certain features thereon), and/or transmit software updates to the local device(s) 120 (to change certain features thereon). In some cases, the software updates may change what gesture output corresponds to what action command. In some cases, for the wearable device 110, the software updates may change how biopotential signals are processed onboard the wearable device 110, such configurations of connection states (as discussed herein), how encryption is handled, how communications are handled, and the like.

Figure 2A:
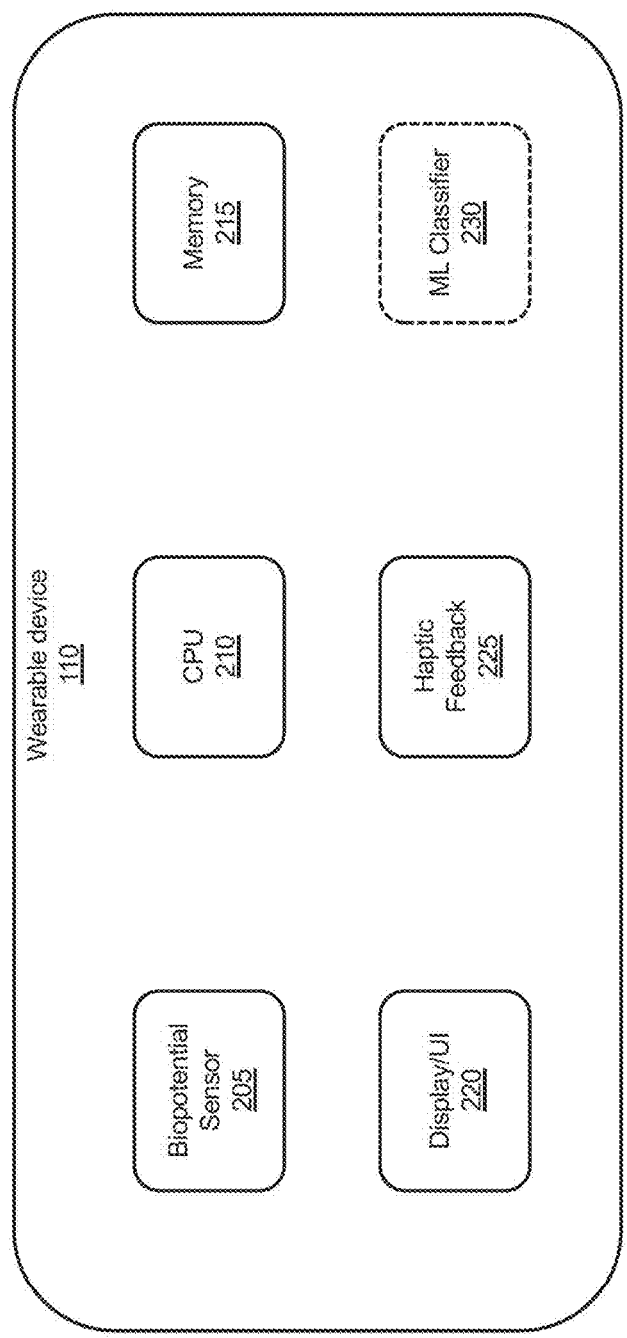
FIGS. 2A-2C depict block diagrams of aspects of a wearable device.
Figure 2B:
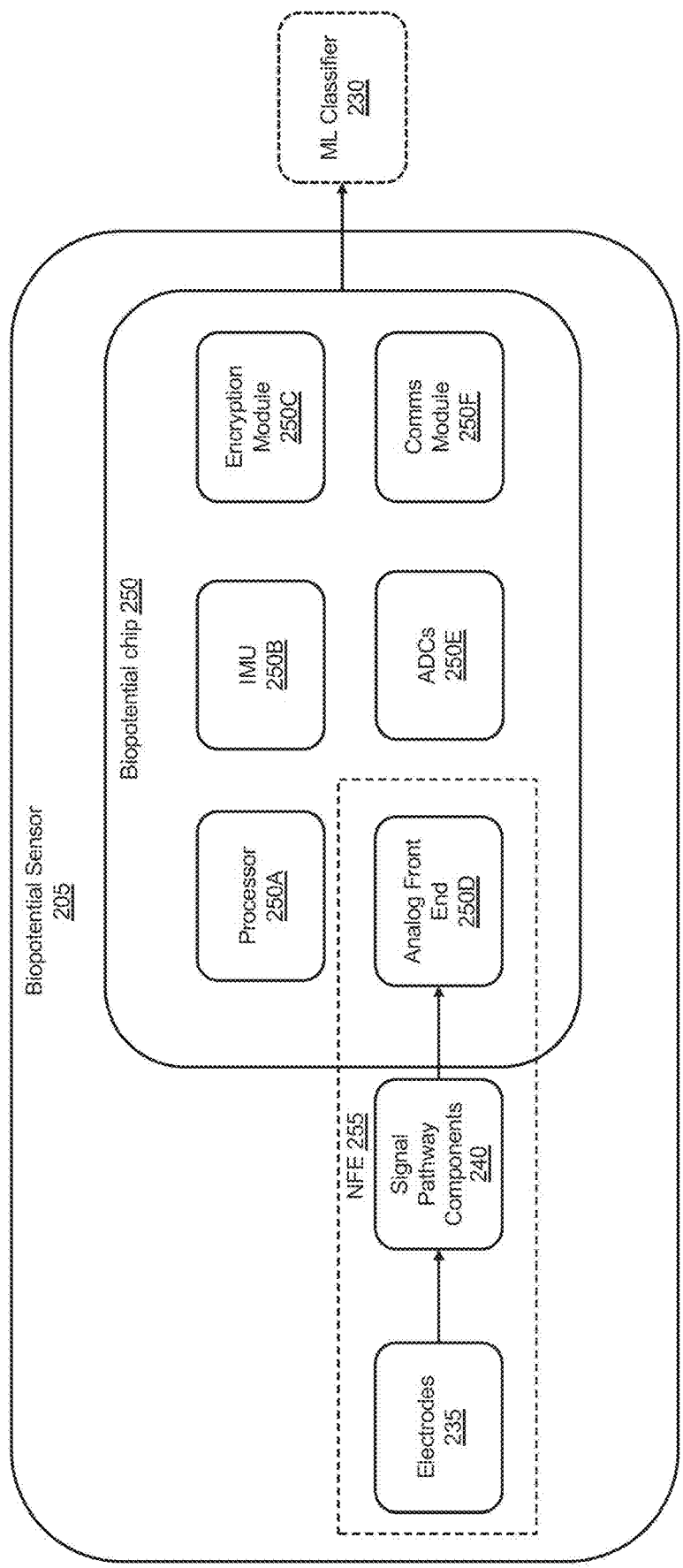
Figure 2C:
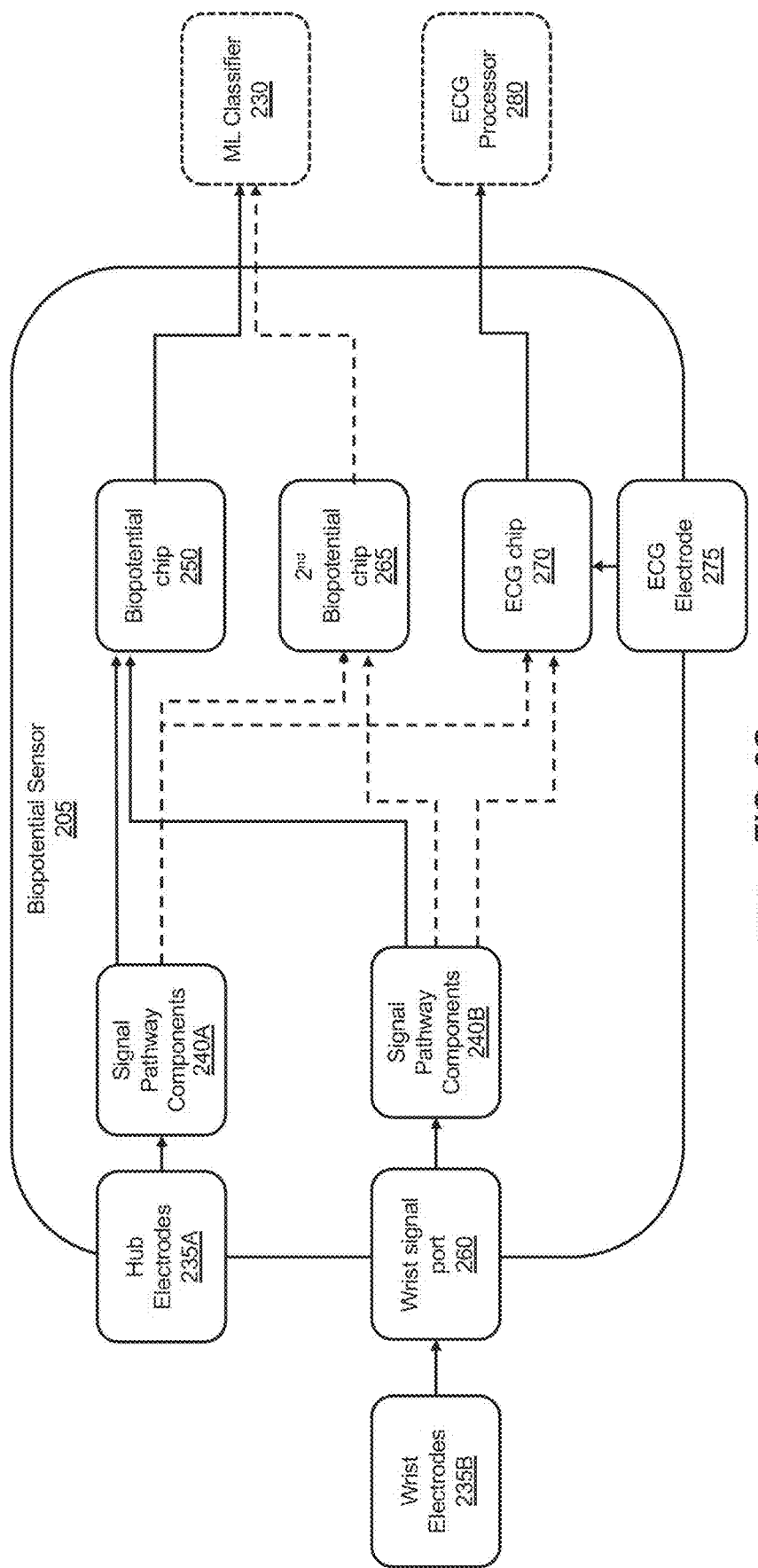

FIGS. 2A-2C depict block diagrams 200A, 200B, and 200C of aspects of a wearable device 110. The aspects of the wearable device 110 in block diagrams 200A, 200B, and 200C may apply to the wearable device 110, as discussed in FIG. 1 above.

In FIG. 2A, diagram 200A may depict a biopotential sensor 205, a central processing unit 210 ("CPU 210"), a memory 215, a display/user interface 220 ("UI 220"), a haptic feedback module 225 (e.g., a vibration motor), and a machine learning classifier 230 ("ML classifier 230") in a wearable device 110.

The biopotential sensor 205 may detect gesture data (e.g., biopotential signals, acceleration data, and/or orientation data of a portion of a user's arm). In some cases, the biopotential chip 250 may have the ML classifier 230 onboard and the biopotential chip 250 may provide the gesture data to the ML classifier 230, so that the ML classifier 230 may generate a gesture output indicating a gesture performed by the user 105. In some cases, the biopotential chip 250 may relay the gesture data to the ML classifier 230 (e.g., in the CPU 210 or outside the wearable device 110, such as in the user device 115, a local device 120, and/or the server 130). Further details of the biopotential sensor 205 are discussed herein.

The memory 215 may store instructions (e.g., software code) for an operating system (e.g., a wearable device O/S) and at least one application, such as a biopotential sensor application. The memory 215 may also store data for the wearable device 110, such as user data, configurations of settings, and the like, but also biopotential sensor data. The biopotential sensor data may include various bits of data, such as raw biopotential data for gesture data, processed gesture data, gesture outputs, user feedback for the same, and the like.

The CPU 210 may execute the instructions to execute the O/S and the at least the biopotential sensor application. The O/S may control certain functions, such as interactions with the user 105 via the UI 220 and/or the haptic feedback 225. The UI 220 may include a touch display, display, a microphone, a speaker, and/or software or hardware buttons, switches, dials, and the like. The haptic feedback 225 may be an actuator to cause movement of the wearable device 110 (e.g., a vibration and the like) to indicate certain states or data. The CPU 210 may also include a communication module to send and receive communications to, e.g., the server 130, the user device 115, and/or the local device(s) 120.

The biopotential sensor application, via the CPU 210, may also interact with the user via the UI 220 and/or the haptic feedback 225. In some cases, the biopotential sensor application, via the CPU 210, may send and receive communications to, e.g., the server 130, the user device 115, and/or the local device(s) 120. In some cases, the biopotential sensor application, via the CPU 210, may instruct the biopotential sensor 205 to change connection states, such as from gesture detection mode to ECG detection mode, and the like, as discussed herein. In some cases, the biopotential sensor application, via the CPU 210, may interface between the biopotential sensor 205 and the O/S.

The ML classifier 230 may, based on the gesture data, generate the gesture output indicating the gesture performed by the user 105. As discussed above, the ML classifier 230 may be hosted on the wearable device 110, the user device 115, or the server 130. Generally, the ML classifier 230 may be a trained ML model to classify a gesture based on one or more of biopotential signals, acceleration data, and/or orientation data of a portion of a user's arm). For instance, the ML classifier 230 may be trained on a training dataset (e.g., gesture data and/or labels) in a supervised, an unsupervised, or semi-supervised manner. In some cases, the ML classifier 230 may output a result set of gestures with confidence values, and select a gesture with a highest confidence value as an identified gesture. In some cases, the ML classifier 230 may only identify a gesture if a confidence value is above a threshold. Further details for ML classification of gestures may be found in U.S. Pat. Nos. 10,070,799, 10,802,598, 11,199,908, and 11,157,086, and U.S. patent application Ser. Nos. 16/196,462, 16/774,825, and 16/737,252, each of which is incorporated by reference herein in its entirety. For instance, the gestures may include: index finger lift, index finger lift-and-hold, index finger swipe, thumbs up, wrist roll (e.g., palm open, fist closed, index finger or thumb extended), wrist shake, and others.

In FIG. 2B, diagram 200B shows a first embodiment of the biopotential sensor 205. In this case, the biopotential sensor 205 may include a biopotential chip 250 and a neural front end 255 ("NFE 255"). The NFE 255 may include an analog front end 250D of the biopotential chip 250 and electrodes 235 and signal pathway components 240 off of the biopotential chip 250. The biopotential chip 250 may include a processor 250A, an inertial measurement unit 250B ("IMU 250B"), an encryption module 250C, the analog front end 250D, analog-to-digital converters 250E ("ADCs 250E"), and a communications module 250F ("comms module 250F"). The biopotential chip 250 may be manufactured as an integral unit and have all of the processor 250A, the IMU 250B, the encryption module 250C, the analog front end 250D, the ADCs 250E, and the communications module 250F located on a common unitary substrate.

The electrodes 235 may each be metal configured to contact a portion of skin to detect a biopotential signal. For instance, the electrodes 235 may include a plurality of electrodes 235 disposed on an interior of the wearable device 110 and configured to obtain biopotential signals from the user's arm. In some cases, the electrodes 235 may be a solid metal electrode with a face of various shapes, e.g., a polygon, a square, a circle, an arc segment, a circle sector (with or without extending to a center of the circle), and the like. The face may be configured to contact the portion of the skin. The face may be flat or curved (e.g., a dome of a certain radius). The solid metal electrode may be made of stainless steel, and the like. The solid metal electrode may extend from the face for a given length. In some cases, the solid metal electrode may include a threaded portion to engage a first retention member that has a corresponding opposite threaded portion. In some cases, the solid metal electrode may include a pressure fit portion that engages a second retention member that pressure fit holds the solid metal electrode via the pressure fit portion. In some cases, the first or second retention member may retain the solid metal electrode to a housing (e.g., of a wristband electrode) or a housing of a hub. In some cases, the solid metal electrode may be an "active electrode" that buffers biopotential signals. In this case, the solid metal electrode may also include a printed circuit board (PCB) and signal pathway components 240 for active buffering of the biopotential signal (hereinafter "buffer components"). For instance, the buffer components may include one or combinations of an amplifier, a capacitor, a power source, a filter, and the like.

In some cases (e.g., on a wristband), the electrodes 235 may be metal filament grouped in certain arrangements. For instance, the metal filament may be sewn into (e.g., in the case of a textile) or placed onto (e.g., in the case of a rubber or other material) an interior face of a wristband into various shapes, e.g., a polygon, a square, a circle, an arc segment, a circle sector (with or without extending to a center of the circle), and the like. In some cases, the metal filament electrode may be an "active electrode" that buffers biopotential signals. In this case, the metal filament electrode may be connected to a PCB and buffer components for active buffering of the biopotential signal. The metal filament electrode may be proximately located to the PCB and buffer components, such as on a housing protecting the PCB and buffer components, or on an opposite side of a wristband from the housing with the PCB and buffer components. In some cases, the housing for the PCB and buffer components may be attached to the wristband, embedded in the wristband, surround the wristband, or separate and re-connected the wristband, and the like. In some cases, the housing may be a rigid material (e.g., rubber or plastic). In some cases, the housing may be a laminate or shielded textile.

In some cases, the wearable device 110 is a smartwatch and the plurality of electrodes 235 are disposed in a circular arrangement on an inner surface of a hub of the smartwatch. In this case, the plurality of electrodes 235 may be configured to contact a top of the user's arm when the smartwatch is worn. In some cases, the biopotential chip 250 may be disposed in the hub of the smartwatch. In some cases, at least one of the plurality of electrodes 235 is a wristband electrode. The wristband electrode may be disposed on an interior surface of a wristband of the smartwatch. The wristband electrode may be configured to contact a portion of the user's arm different than the top of the user's arm when the smartwatch is worn. The wristband electrode may be electrically coupled to the biopotential chip 250 disposed in the hub of the smartwatch.

The signal pathway components 240 may include electrical conductors (e.g., metal wires that are insulated or not), traces, and the like. In some cases, the signal pathway components 240 may include switches to change signal pathways of biopotential signals.

The analog front end 250D (see, generally, FIGS. 3A-3C) may include a plurality of analog inputs 305 (see FIG. 3A) configured to be coupled to and receive the biopotential signals from the plurality of electrodes 235. In some cases, one or more of the plurality of analog inputs 305 may be coupled to respective differential amplifiers 315 (see FIG. 3A). The differential amplifiers 315 may be configured to amplify differences in signals between pairs of electrodes.

The ADCs 250E may include a plurality of ADCs. The ADCs 250E may be configured to convert the biopotential signals to biopotential data. For instance, the ADCs 250E may be connected to outputs of corresponding differential amplifiers 315 and may convert the differential signals to biopotential data.

The IMU 250B may be disposed onboard the biopotential chip 250. The IMU 250B may include at least an accelerometer and a gyroscope. The accelerometer may output acceleration data of a portion of a user's arm and the gyroscope may output orientation data (e.g., an angular position or angular rate) of a portion of a user's arm.

The processor 250A may be configured to process the biopotential data outputted by the ADCs 250E, the acceleration data outputted by the accelerometer of the IMU 250B, and/or the orientation data outputted by the gyroscope of the IMU 250B (collectively, "initial gesture data"). For instance, the processor 250A may time sync the initial gesture data, format the initial gesture data for transmission, and send the initial gesture data (as processed into gesture data) to the comms module 250F.

In some cases, the processor 250A may encrypt the initial gesture data using the encryption module 250C. For instance, to encrypt the initial gesture data, using the encryption module 250C, the encryption module 250C may store (and, optionally generate) a private biopotential key and a public biopotential key, and store one or more external public keys corresponding to the ML classifier, the CPU 210, the device 115, or the server 130. The processor 250A (or the encryption module 250C) may retrieve the private biopotential key and an external public key corresponding to a destination (e.g., the ML classifier, the CPU 210, the device 115, or the server 130), and encrypt the initial gesture data using the private biopotential key and an external public key. The processor 250A may transmit, e.g., separately or in a same packet or a first packet), the public biopotential key to one or more of the ML classifier, the CPU 210, the device 115, or the server 130 (referred to as "endpoint"). The endpoint may store the public biopotential key. The endpoint may have a corresponding private key to the external public key. The endpoint may transmit the public key to the processor 250A, so that the processor 250A may store it in encryption module 250C. The endpoint may use the public biopotential key and its private key to decrypt any encrypted gesture data received from the biopotential chip.

In some cases, the processor 250A may normalize the initial gesture data. For instance, to normalize the initial gesture data, the processor 250A may map the initial gesture data into a defined range of values based on data type. In some cases, the biopotential data outputted by the ADCs 250E may be scaled (e.g., proportionally in accordance with the values of the biopotential data with respect to a maximum biopotential signal value) between a first value (e.g., 0) and a second value (e.g., 1 or 100, and the like), In some cases, the acceleration data outputted by the accelerometer of the IMU 250B may be scaled (e.g., proportionally in accordance with the values of the acceleration data with respect to a maximum acceleration value) between a first value (e.g., −1) and a second value (e.g., 1). In some cases, the orientation data outputted by the gyroscope of the IMU 250B may be scaled if the orientation data includes rates of change (e.g., rotational velocity or rotational acceleration) of orientation between a first value (e.g., 0) and a second value (e.g., 1 or 100, and the like). By normalizing the initial gesture data using the processor 250A of the biopotential chip, the initial gesture data may be better formatted for analysis by a classifier.

The comms module 250F may then transmit the gesture data to the ML classifier 230, whether the ML classifier is onboard the wearable device 110, the user device 115, or the server 130. For instance, the comms module 250F may transmit the gesture data to the CPU 210, so that the CPU 210 may process it (e.g., via the biopotential application) or transmit the gesture data to the user device 115 or the server 130.

In some cases, the processor 250A may control connection states between electrodes 235 and biopotential chips, an ECG chip 270, or specific differential amplifiers within biopotential chips, as discussed herein. In these cases, the processor 250A may cause switches or a multiplexer to change signal pathways from form a currently active connection state (for a first mode) to a new active connection state (for a second mode). For instance, the connection states may correspond to various modes, such as a biopotential sensing mode, a training mode, an ECG detection mode, right arm mode, left arm mode, an impendence measurement mode, and the like.

In some cases, the switches or multiplexer may be configured to apply a plurality of connection states between the plurality of electrodes 235 and the differential amplifiers (of a same or a different biopotential chip) or analog inputs of an ECG chip. For instance, in some cases, the switches or multiplexer may apply a first connection state in which a first pair of electrodes of the plurality of electrodes 235 is connected to a first differential amplifier. The first differential amplifier may be configured to amplify a difference in signals obtained by the first pair of electrodes in the first connection state. The switches or the multiplexer may then apply a second connection state in which a second pair of electrodes of the plurality of electrodes 235 is connected to the first differential amplifier, and the first differential amplifier may be configured to amplify a difference in signals obtained by the second pair of electrodes in the second connection state. In some cases, at least one of the electrodes of the second pair of electrodes is not included in the first pair of electrodes.

In FIG. 2C, diagram 200C shows a second embodiment of the biopotential sensor 205. In this case, the biopotential sensor 205 may include the biopotential chip 250 with at least one other biopotential chip, such as second biopotential chip 265, and an ECG chip 270. In some cases, the biopotential sensor 205 may be connected to different sets of electrodes 235, such as hub electrodes 235A and wristband electrodes 235B. In some cases, the hub electrodes 235A may have signal pathway components 240A that are the same or different than signal pathway components 240B for the wristband electrodes 235B. For instance, the signal pathway components 240B for the wristband electrodes 235B may be located proximate the wristband electrodes 235B (e.g., outside a housing of the biopotential sensor 205 and on a wristband). As the wristband electrodes 235B may be outside the housing of the biopotential sensor 205, the signal pathway for biopotential signals from the wristband electrodes 235B may pass through a wrist signal port 260.

In some cases, the biopotential signals from the hub electrodes 235A and the wristband electrodes 235B may be routed to a same or different biopotential chip, or switched between biopotential chips. For instance, due to form factor and/or chip sizing constraints, different (e.g., pairings of) biopotential signals may be processed on different biopotential chips. In some cases, the biopotential chips may process the biopotential signals differently. Generally, the processor 250A may instruct switches or a multiplexer to route certain biopotential signals to certain biopotential chips (or certain differential amplifiers of a biopotential chip) by changing a connection state between electrodes 235 and biopotential chips (or differential amplifiers of a biopotential chip).

In some cases, the hub electrodes 235A and the wristband electrodes 235B may be connected to the biopotential chip 250 in a first connection state (e.g., by switches or a multiplexer), and the hub electrodes 235A and the wristband electrodes 235B may be connected to the second biopotential chip 265 in a second connection state (e.g., by switches or a multiplexer). For instance, the switches or multiplexer may be controlled by the processor 250A to change the connection state between the first connection state (for a first mode, such as biopotential sensing mode) and the second connection state (for a second mode, such as a training mode).

In some cases, the hub electrodes 235A may be connected to the biopotential chip 250, while the wristband electrodes 235B may be connected to the second biopotential chip 265 (or vice versa). In some cases, a first subset the hub electrodes 235A may be connected to the biopotential chip 250, a first subset the wristband electrodes 235B may be connected to the biopotential chip 250, a second subset the hub electrodes 235A may be connected to the second biopotential chip 265, and a second subset the wristband electrodes 235B may be connected to the second biopotential chip 265.

In some cases, all (or subsets of) the hub electrodes 235A and the wristband electrodes 235B may be selectively connected (e.g., by switches or a multiplexer, in a third connection state) to the ECG chip 270. The ECG chip 270 may also be connected to an ECG electrode 275, which may be different from the hub electrodes 235A and wristband electrodes 235B and located on the biopotential sensor such that the ECG electrode 275 would not ordinarily contact the wrist of the person. For instance, the switches or multiplexer may be controlled by the processor 250A to change the connection state between the first connection state or the second connection state to the third connection state. For example, a processor of the biopotential sensor 205 may detect that a user has contacted the ECG electrode (e.g., with one or more fingers of the hand opposite the arm on which the biopotential sensor 205 is worn), and in response to determining that the user has contacted the ECG electrode, the system may switch the signal pathway components for the hub electrodes and/or wristband electrodes such that at least some of the signals from these electrodes are directed to the ECG chip 270.

The ECG chip 270 may process the biopotential signals from all (or subsets of) the hub electrodes 235A and the wristband electrodes 235B and the biopotential signal from the ECG electrode 275, and generate ECG data. The ECG data may be a digital signal based on the biopotential signals. The ECG chip 270 may transmit the ECG data to an ECG processor 280. The ECG processor 280 may receive the ECG data and produce an electrocardiogram based on the ECG data. For instance, the ECG chip 270 (to generate the ECG data, or the ECG processor 280 based on the digital signal) may filter power line interference (e.g., 60 Hz in the US), and measure frequency of cardiac pulses (e.g., heart rates). For instance, cardiac pulses of a cardiac signal may have three (3) primary structures, that are areas of a waveform for the cardiac signal. In some cases, the ECG chip 270 may detect the primary structures and compare magnitudes and relative magnitudes of the detected primary structures. In some cases, the ECG chip 270 may cause an alert to be transmitted or output (e.g., to the user or a Doctor) about certain detected cardiac anomalies indicated by comparisons of the magnitudes and relative magnitudes of the detected primary structures. The ECG processor 280 may be a part of the wearable device 110 (e.g., be hosted on the CPU 210 or separate from the CPU 210) or on a different device, such as the user device 115 or the server 130.

In some cases, the second biopotential chip 265 may include some or all of the same features as the biopotential chip 250. In some cases, the second biopotential chip 265 may include the IMU 250B and the IMU 250B may be omitted from the biopotential chip 250.

In some cases, the processor 250A of the biopotential chip 250 or the biopotential application, executed by the CPU 210, (or a different device, such as the user device 115 or the server 130) may determine that an impedance determination check is to be performed. For instance, the CPU 210 or the processor 250A of biopotential chip 250 may determine that the impedance determination check is to be performed in response to an impedance check timer elapsing (e.g., for inter or intra-session wearing), in response to a recalibration process being conducted, or in response certain signal characteristics changing over time. For instance, the biopotential chip 250 may detect presence of significant (e.g., higher than a threshold value) amount of interference (e.g., electrical line frequency, e.g., 60 Hz in the US) in the biopotential signals. The presence high interference may be indicative of poor electrode-skin contact, that is high impedance. The detection of the interference may be performed in parallel to gesture classification continuously, or periodically (e.g., depending upon implementation considerations, such as space, volume, electrical power draw, and/or component cost). In some cases, detecting interference (instead of, e.g., only periodically switching to impendence measurement) may avoid interrupting gesture classification, whereas switching to impendence measurement periodically may interrupt the gesture classification. In this case, user convenience may be maintained for gesture classification. In response to this determination, an impedance command may be transmitted (e.g., from the CPU 210, the user device 115, or the server 130) to the processor 250A (or the processor 250A may have determined to perform the impedance check). The processor 250A may then cause a connection state change by changing a state of switches or the multiplexer so as to connect certain electrodes to certain points, such as to an impedance processing circuit of the first or second the second biopotential chips (if configured to perform impedance measurements).

For instance, in an impedance measurement mode, the processor 250A may connect a stimulus source to at least one first electrode (e.g., a first electrode) of the plurality of electrodes 235, and connect the at least one first electrode and at least one second electrode of the plurality of electrodes 235 to an impedance processing circuit of the first or second biopotential chips, so that electrical signals from the at least one first electrode and at least one second electrode may be carried to the impedance processing circuit. The stimulus source may then apply a stimulus to the at least one first electrode, and the biopotential chip may receive corresponding electrical signals. The second biopotential chip 265 may analyze the electrical signals from the at least one first electrode and the least one second electrode to determine an impedance measurement signal. The impedance measurement signal may include a response to the stimulus applied to the at least one first electrode. The biopotential chip may, based on the impedance measurement signal, determine an impedance between the at least one first electrode and the at least one second electrode.

The chip may output the determined impedance between the at least one first electrode and the at least one second electrode to the processor 250A, and the processor 250A (or CPU 210, or another device, such as user device 115 or server 130) may determine whether the signal quality is impaired. For instance, the signal quality may be impaired if the determined impedance between the at least one first electrode and the at least one second electrode satisfied an impairment condition (e.g., is greater than a first threshold or less than a second threshold). In some cases, based on the determined impedance between the at least one first electrode and the at least one second electrode and/or the impairment condition being satisfied, the wearable device 110 (or the user device 115) may present to the user 105 an indication that signal quality is impaired. For instance, the indication may be a haptic feedback, an audio noise, a display graphic, and the like. In some embodiments, the impedance measurement, or derivative thereof, may be provided to the ML classifier 230 and used as an input for gesture determination. For example, the ML classifier may be trained to apply higher confidence or to make gesture classifications more quickly, based on less data, or based on smaller signal deviations when it is determined that impedance measurements indicate high contact quality. In some case, the impendence measurements may be an input to the ML classifier. For example, an impendence measurements may be periodically or simultaneously obtained with gesture data (e.g., EMG and wrist motion data), and the multiple data sources may analyzed by the ML classifier to determine gesture classifications and/or to modify confidence rating or others parameters relating to classifications or confidences.

The biopotential chip 250 may have a first low-power state and an active state. In some cases, the first low-power state may turn off (e.g., not enable, not provide power to) at least the ADCs 250E and the differential amplifiers 315 and turn on (e.g., enable, provide power to) the accelerometer and the gyroscope. In some cases, the active state may turn on (e.g., enable, provide power to) the ADCs 250E, the differential amplifiers 315, the accelerometer, and the gyroscope. The biopotential chip 250 may be configured to transition from the first low-power state to the active state in response to an activate command. In some cases, the biopotential chip 250 may determine the activate command be based on detecting certain acceleration and/or orientation data while in the first lower-power state. In some cases, the activate command may be generated externally from the biopotential chip 250 (e.g., from the user device 115 or the server 130), and the biopotential chip 250 may receive activate command, via the CPU 210. In response to determining (or receiving) the activate command in the first low-power state, the biopotential chip 250 may turn on (e.g., enable, provide power to) the ADCs 250E and the differential amplifiers 315.

In some cases, the biopotential chip 250 may have a second low-power state. The second low-power state may turn off (e.g., not enable, not provide power to) at least the accelerometer and the gyroscope and turn on (e.g., enable, provide power to) the ADCs 250E and/or the differential amplifiers 315. In this case, the biopotential chip 250 may determine the activate command be based on detecting a certain gesture or combination of gestures. In response to determining (or receiving) the activate command in the second low-power state, the biopotential chip 250 may turn on (e.g., enable, provide power to) the accelerometer and the gyroscope.

Figure 3A:
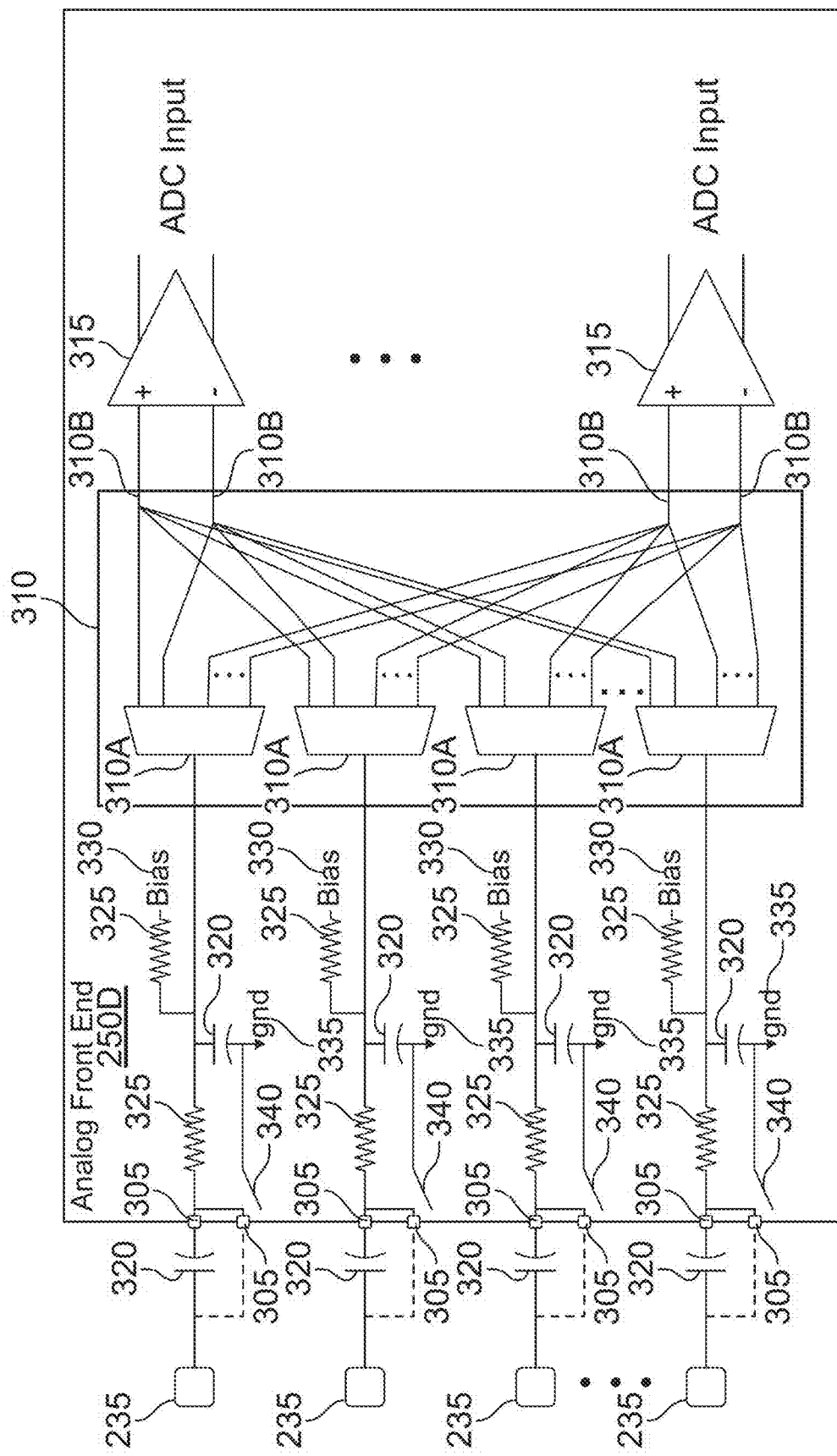
FIGS. 3A-3C depict schematic diagrams of aspects of a biopotential sensor of a wearable device.
Figure 3B:
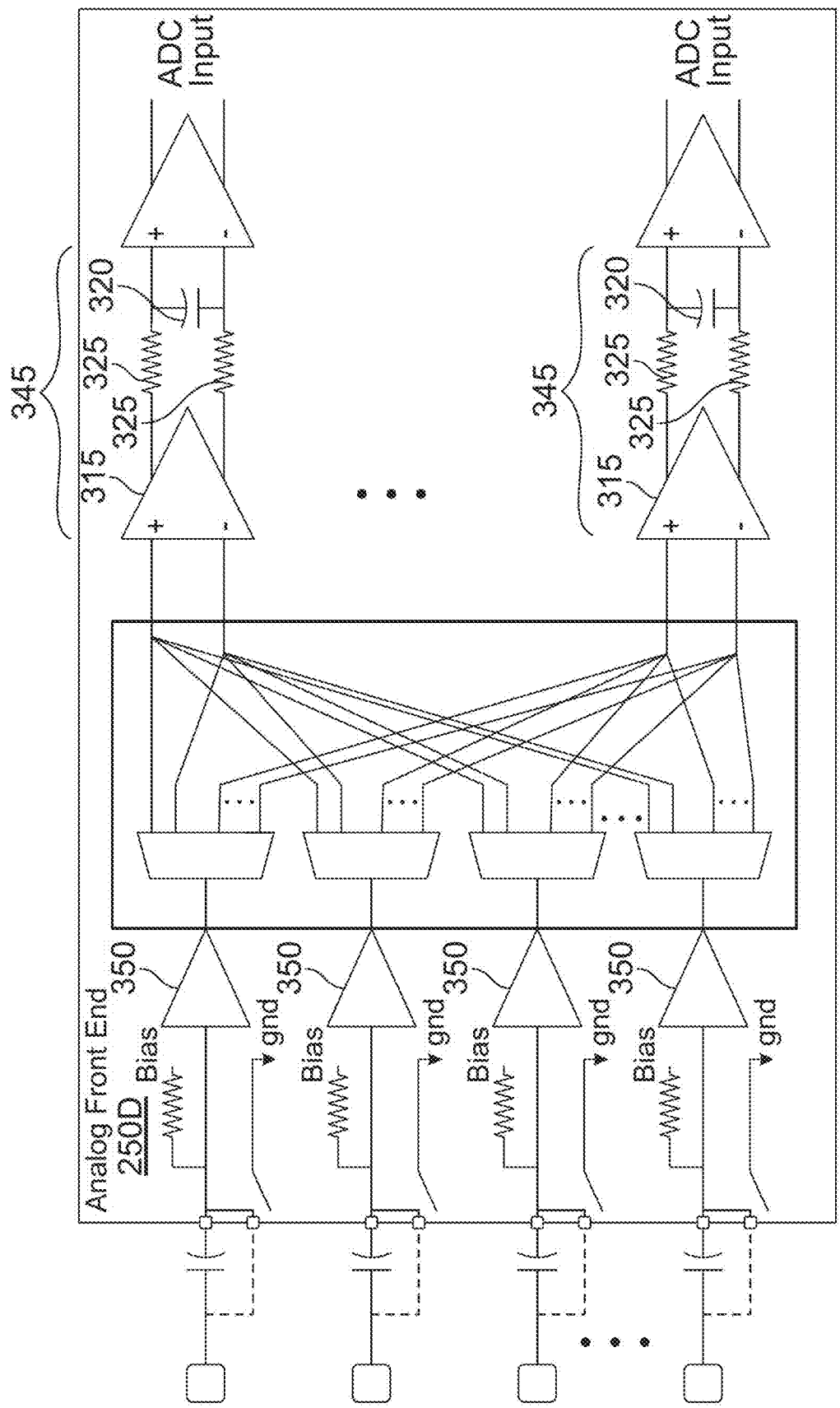
Figure 3C:
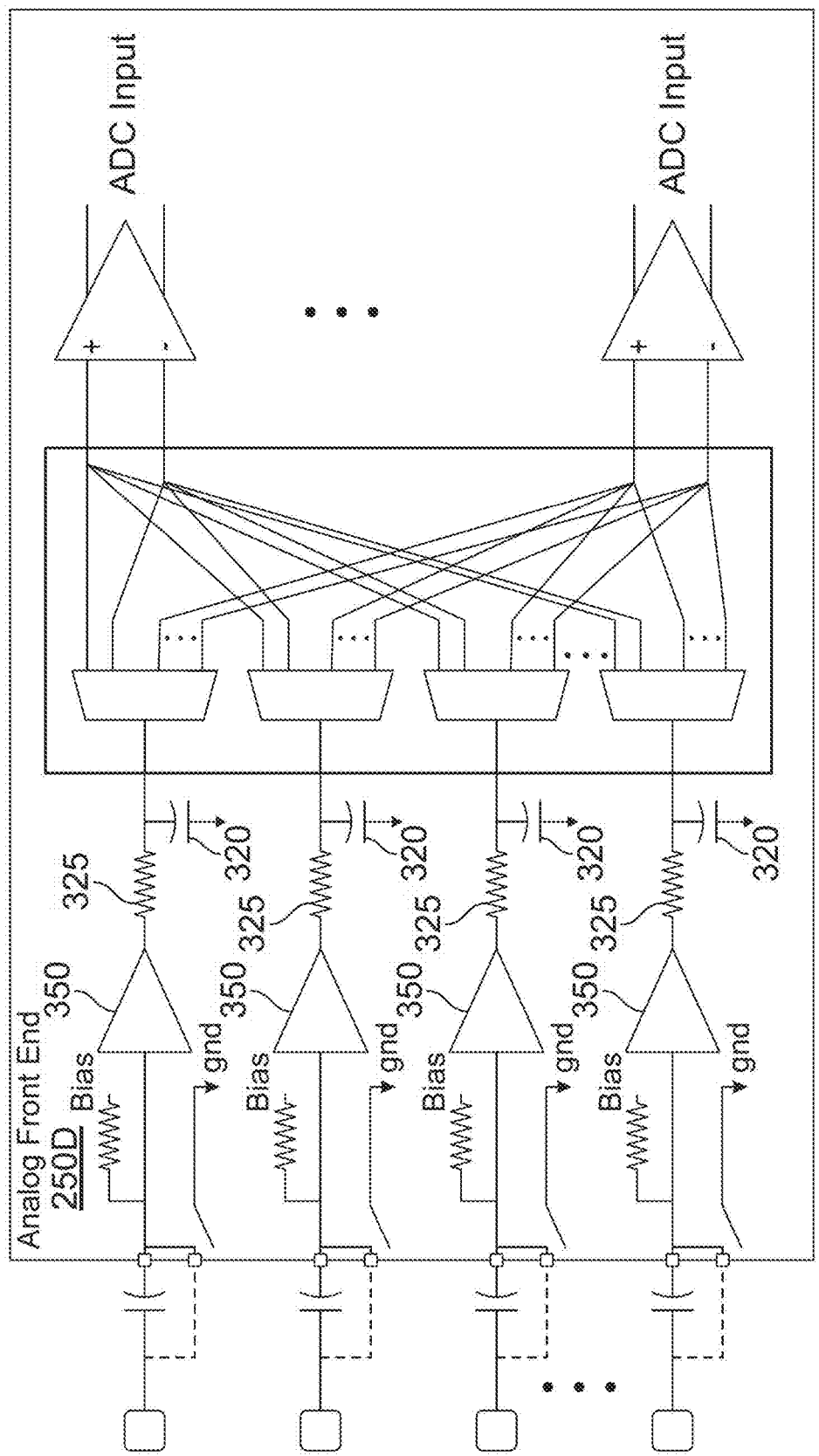

FIGS. 3A-3C depict schematic diagrams 300A, 300B, and 300C of aspects of a biopotential sensor 205 of a wearable device 110. The aspects of the biopotential sensor 205 of the wearable device 110 in block diagrams 300A, 300B, and 300C may apply to the wearable device 110, as discussed in FIGS. 1 and 2A-2C above. Diagrams 300A, 300B, and 300C may be modified to have different arrangements and include less or more components as shown.

In FIG. 3A, diagram 300A may depict a first arrangement aspects of the electrodes 235 (which may be hub electrodes or wristband electrodes), the signal pathway components 240, and the analog front end 250D. For instance, in diagram 300A, each electrode 235 may be connected to an analog inputs 305 of the analog front end 250D. In some cases, the signal pathway components 240 may include signal conductors (e.g., wires and/or traces) and other elements, such as a capacitor 320. In some cases, the signal pathway components 240 may include only the signal conductors. In some cases, none, some, or all of the electrodes 235 may have a second analog input 305 that (based on control of a switch 340 on the analog front end 250D) shorts the signal pathway to a ground 335. In some cases, the switch 340 may connect on a first side or a second side of the capacitor 320.

On the analog front end 250D, the analog front end 250D may include at least the plurality of differential amplifiers 315. Each of the differential amplifiers 315 may be coupled (or couplable) to a first electrode and a second electrode at a first input and a second input, respectively.

In some cases, the analog front end 250D may also include a multiplexer 310. The multiplexer may include a plurality of signal muxes 310A and a plurality of connection points 310B. For instance, each analog input 305 may correspond a signal mux 310A. The signal mux 310A may connect its respective analog input 305 to one (or more) of a set of connection points 310B. For instance, the set of connection points 310B may include some or all of the plurality of connection points 310B. Thus, each electrode 235 connected to an analog input 305 may be connected to first input or a second input of some or all of the differential amplifiers 315, thereby enabling the biopotential sensor 205 to change a sensed biopotential data.

In some cases, the multiplexer 310 may also change a signal pathway for an analog input 305 to a certain analog input 305 on a different biopotential chip (e.g., the biopotential chip 265) or an analog input 305 on the ECG chip 270. In this case, the multiplexer 310 may include additional connection points 310B so that the signal muxes 310A may connect the electrodes 235 to, via the analog input 305 of the analog front end 250D, to an analog input 305 on a different biopotential chip (e.g., the biopotential chip 265) or an analog input 305 on the ECG chip 270.

The analog front end 250D may also include various arrangements of analog filter(s) that include resistors 325, a bias 330, capacitors 320, and/or the ground 335. The elements of the analog filter(s) may be omitted or included, and, if included, may be arranged in various different arrangements to perform a filtering function. For instance, first analog filters may be in between the analog input 305 and the differential amplifiers 315. For instance, in diagram 300A, the first analog filters may be in between the analog input 305 and the signal muxes 310A of the multiplexer 310.

In FIG. 3B, diagram 300B may depict a second arrangement aspects of the electrodes 235, the signal pathway components 240, and the analog front end 250D. The second arrangement may be the same as the first arrangement, but also include a plurality of amplifiers 350 and a plurality of second analog filters 345. In some cases, the amplifiers 350 may be in between the analog inputs 305 and second analog filters 345. In some cases, the amplifiers 350 may be in between the analog inputs 305 and the multiplexer 310 with the second analog filters 345 arranged in between the multiplexer 310 and the differential amplifiers 315. The amplifiers 350 may amplify a signal received by an analog input 305. The second analog filters 345 may include a differential amplifier 315 coupled in series to a pair of resistors 325 and a capacitor 320.

In FIG. 3C, diagram 300C may depict a third arrangement aspects of the electrodes 235, the signal pathway components 240, and the analog front end 250D. The third arrangement may be the same as the first arrangement, but also include a plurality of amplifiers 350 (like in the second arrangement), with third second analog filters with resistors 325 and capacitors 320 in between the amplifiers 350 and the differential amplifiers 315 (e.g., before the multiplexer 310).

In general, including capacitors 320 and/or resistors 325 in the first, second, or third analog filters may regulate the biopotential signal for signal quality. In some cases, a capacitor 320 may make the system less vulnerable to DC shifts (of the biopotential signal) than if directly coupled. In some cases, an electrode may become charged due to polarization, and the effect of the polarization may be lessened by the capacitor 320. In some cases, the resistor 325 may lessen the effect of voltage read changing due to skin impedance changing. That is to say, the skin may have a constantly shifting impedance, but if skin is in series with a large value resistor, the shifting values of skin resistance may contribute a relatively small amount (e.g., compared to the resistor 325) to the noise of the front end system. For instance, an effective resistance may be equal to the resistance of the skin and the resistance of the front end system, but if the resistance of the front end system is greater (e.g., 10×, 100×, and the like) than the resistance of the skin, the effective resistance is substantially the resistance of the resistance of the front end (and accounted for in design).

FIGS. 4A-4D depict graphics 400A, 400B, 400C, and 400D of different arrangements of hub electrodes 235A of a wearable device 110. The different arrangements of the hub electrodes 235A of the wearable device 110 in graphics 400A, 400B, 400C, and 400D may apply to the wearable device 110, as discussed in FIGS. 1, 2A-2C, and 3A-3C above. Graphics 400A, 400B, 400C, and 400D may be modified to have different arrangements and include less or more components as shown.

Figure 4A:
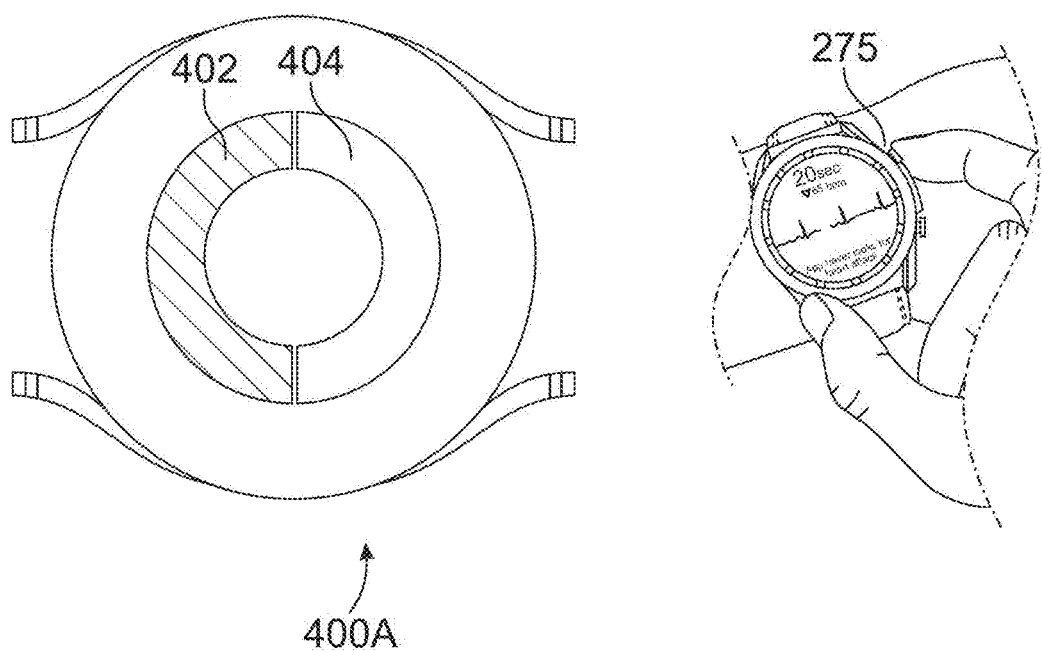
FIGS. 4A-4D depict graphics of different arrangements of hub electrodes of a wearable device.

In FIG. 4A, graphic 400A may depict the ECG electrode 275 and a first arrangement (e.g., a pair) of hub electrodes 402 and 404. In some cases, a first hub electrode 402 or a second hub electrode 404 may be a reference electrode that inputs a biopotential signal to the ECG chip 270. For instance, the first hub electrode or the second hub electrode may be connected to a biopotential chip, such as the biopotential chip 250 or the second biopotential chip 265 in, e.g., the first or second connection state, and then connected to the ECG chip 270 in the third connection state. In some cases, the ECG electrode 275 is positioned on the wearable device 10 such that the ECG electrode 275 is not in contact with the user's arm when the wearable device 110 is being worn on the arm of the user 105. For instance, as depicted in FIG. 4A, the ECG electrode 275 is positioned on a side of the wearable device 110 and not in contact with the user's arm when the wearable device 110 is being worn. In some cases, the ECG electrode 275 may be positioned on other locations (not depicted), such as a top of the wearable device 110 or on a wristband (on an exterior facing surface of the wristband).

In some cases, the processor 250A may detect that the user 105 has contacted the ECG electrode 275; and in response to detecting that the user has contacted the ECG electrode, transition from a current connection state (e.g., the first connection state or the second connection state) to the third connection state. In this manner, hub electrodes 402 or 404 may provide dual functionality including at least biopotential sensing for gesture control and ECG sensing as a reference electrode, thereby increasing functionality while minimizing a number of sensor components that interact with users.

Figure 4B:
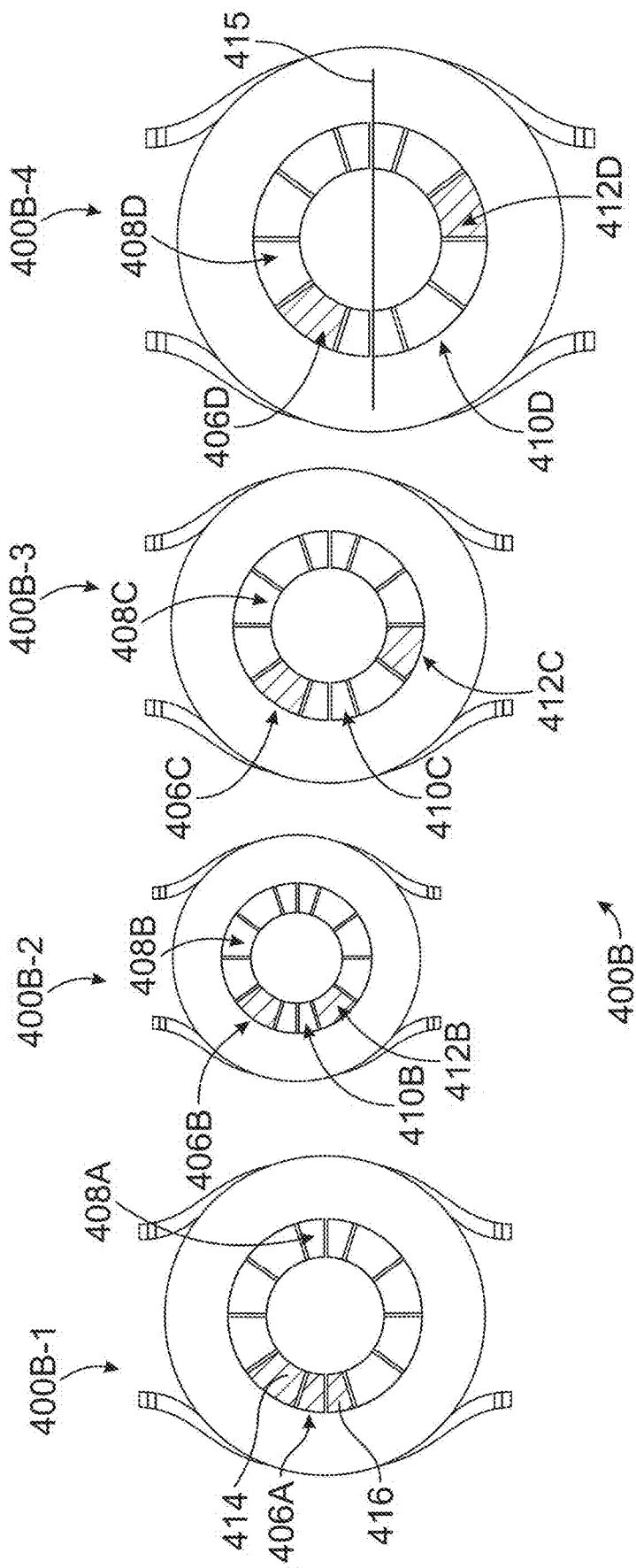

In FIG. 4B, graphic 400B may depict a second arrangement of the hub electrodes 235A. For instance, the hub electrodes 235A may be a plurality of circle sector electrodes that extend from an interior diameter to an exterior diameter. In some cases, the circle sector electrodes may be centered on a same center point (e.g., to surround the center point in a circular arrangement (e.g., a ring)). The circle sector electrodes may be uniform in arc length (see, e.g., FIG. 4C) or not uniform in arc length (see FIG. 4B or 4D). In FIG. 4B, the circle sector electrodes may include a first circle sector type 414 and a second circle sector type 416. The first circle sector type 414 may have a larger arc length then the second circle sector type 416. In some cases, the hub electrodes 235A may have a same or different number of the first circle sector type 414 as a number of the second circle sector type 416. For instance, as depicted in FIG. 4B, there may be eight electrodes of the first circle sector type 414 and four electrodes of the second circle sector type 416. In some cases, the arrangement of electrodes of the first circle sector type 414 and the second circle sector type 416 may be symmetrical along at least one axis 415.

In some cases, different sets of hub electrodes 235A may be used as reference inputs to the ECG chip 270 when in the third connection state. For instance, in graphic 400B-1, a first group 406A of hub electrodes 235A may be connected to the ECG chip 270 as reference electrodes, while a second group 408A may not be connected to the ECG chip 270, when in the third connection state. In this case, the first group 406A may form first continuous sequence of adjacent hub electrodes 235A, while the second group 408A may form a second continuous sequence of adjacent hub electrodes 235A. In other cases, such as in graphics 400B-2, 400B-3, or 400B-4, the first group 406B/406C/406D may not be adjacent third group 412B/412C/412D of reference electrodes, thereby being separated by the second group 408B/408C/408D and a fourth group 410B/410C/410D. The sequence length (e.g., a number of adjacent electrodes) for each group may be the same or different. For instance, in graphic 400B-2, the first group 406B (one electrode of first circle sector type 414) may be separated from the second group 412B (one electrode of first circle sector type 414) by the fourth group 410B (a double electrode of second circle sector type 416); in graphic 400B-3, the first group 406C (one electrode of first circle sector type 414) may be separated from the second group 412C (one electrode of first circle sector type 414) by the fourth group 410C (two electrodes of second circle sector type 416 and one electrode of first circle sector type 414); and in graphic 400B-4, the first group 406D (one electrode of first circle sector type 414) may be separated from the second group 412D (one electrode of first circle sector type 414) by the fourth group 410D (two electrodes of second circle sector type 416 and two electrodes of first circle sector type 414). Of note, as the fourth group is increased in number of electrodes (and if the first group and third group stay the same), the second group is decreased in number of electrodes. Thus, in this manner, different regions of skin may be used as a reference for the ECG chip 270. In some cases, the processor 250A may change the selection of reference electrodes for the ECG chip 270. In some cases, the processor 250A may have the selection of reference electrodes stored as a configuration that is preset.

Figure 4C:
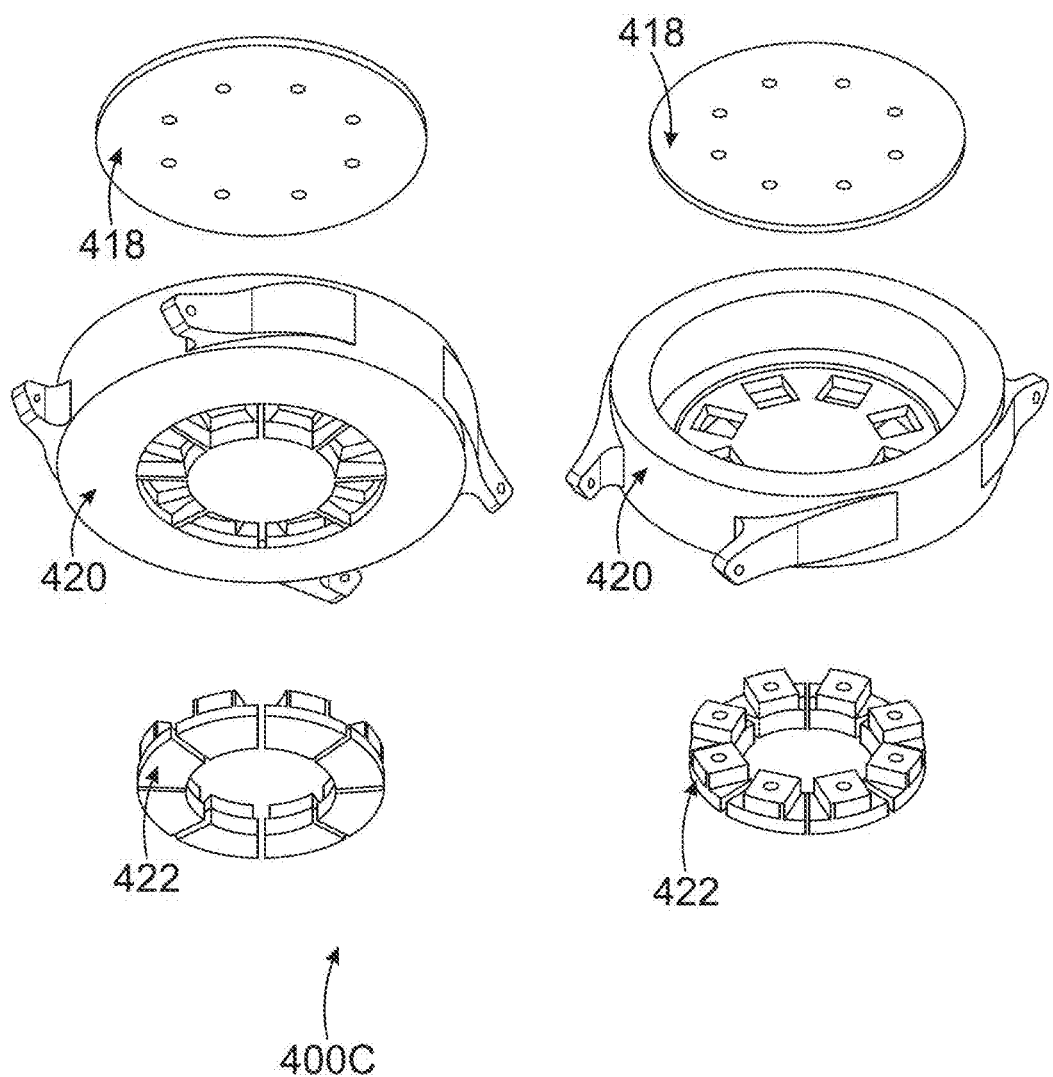

In FIG. 4C, graphic 400C may depict a third arrangement of circle sector electrodes 422 of a uniform arc length and depict how the circle sector electrodes 422 may be inserted into holes in a bottom 420 of a hub (or case) of the wearable device 110 and connected to a PCB 418. In some cases, the hub electrodes 235A of the first circle sector type 414 and the second circle sector type 416 may be inserted and connected in a similar manner. In some cases, the PCB 418 may be a disk to affix (e.g., via a first retention member) the circle sector electrodes 422 once inserted through the holes in the bottom 420. In some cases, the circle sector electrodes 422 may be affixed by the holes in the bottom via a second retention member (e.g., via pressure fit of the walls of the holes). The PCB 418 may include buffer components. The PCB 418 may carry biopotential signals to the analog inputs 305, via signal pathway components 240 (e.g., signal conductors and traces).

Figure 4D:
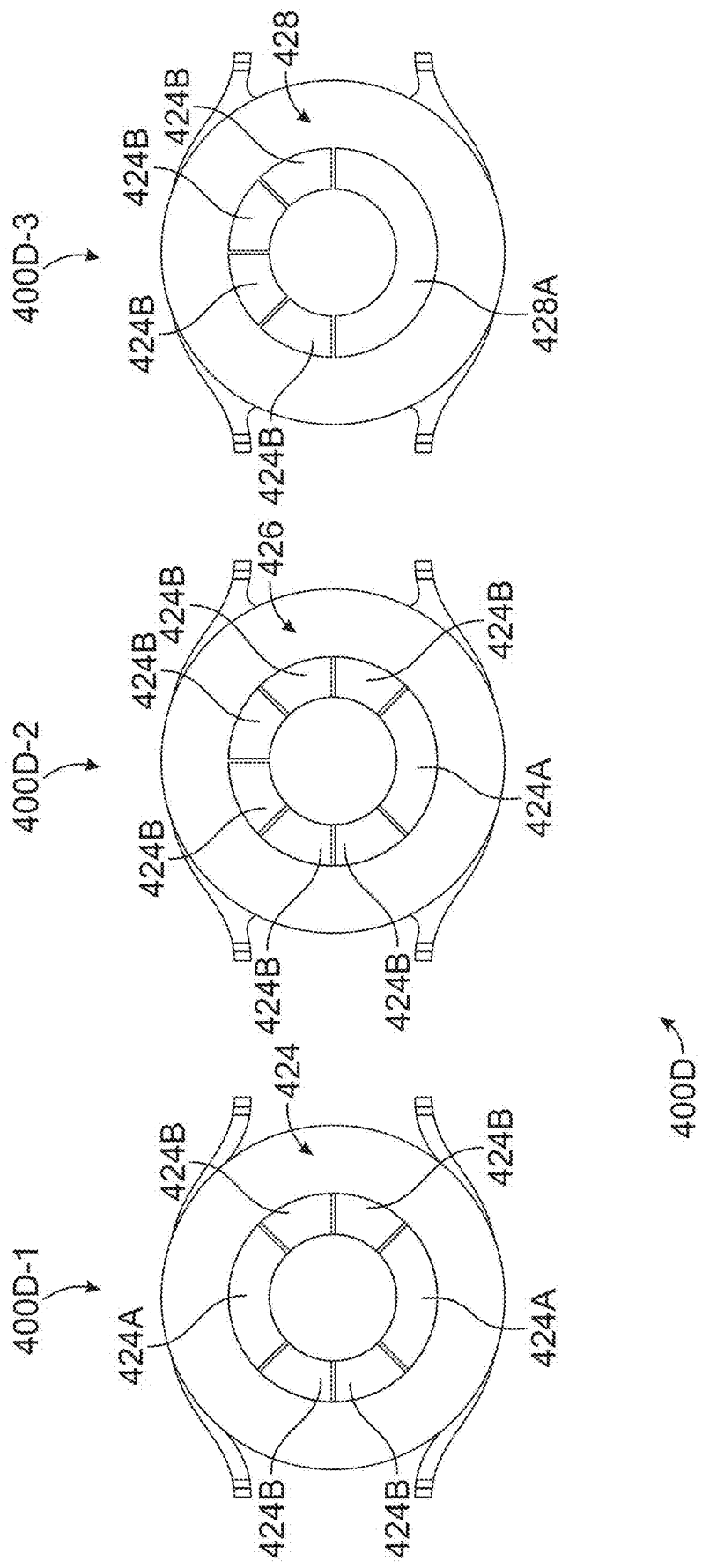

In FIG. 4D, graphic 400D may depict other arrangements of non-uniform arc length circle sector electrodes. In graphic 400D-1, a fourth arrangement 424 of hub electrodes 235A may include a third circle sector type 424A and a fourth circle sector type 424B. The third circle sector type 424A may have a longer arc length than the fourth circle sector type 424B. For instance, the third circle sector type 424A may have an arc length twice as long as the fourth circle sector type 424B, such that a single electrode of the third circle sector type 424A may have a same surface area as two electrodes of fourth circle sector type 424B. In some cases, the third circle sector type 424A may have an arc length corresponding to (or near to) 900 and the fourth circle sector type 424B may have an arc length corresponding to (or near to) 45°. The fourth arrangement 424 may, in sequence in a ring, proceed as follows: one electrode of the third circle sector type 424A, two electrodes of the fourth circle sector type 424B, one electrode of the third circle sector type 424A, and two electrodes of the fourth circle sector type 424B. In the graphic 400D-2, a fifth arrangement 426 may have a same arrangement as in the fourth arrangement, but one electrode of the third circle sector type 424A may be replaced by two electrodes of the fourth circle sector type 424B. In graphic 400D-3, a sixth arrangement 428 may have a same arrangement as the fifth arrangement, but the remaining electrode of the third circle sector type 424A and the adjacent electrodes of the fourth circle sector type 424B may be replaced by a fifth circle sector type 428A. The fifth circle sector type 428A may have an arc length corresponding to (or near to) 180°. In some cases, the hub electrodes 235A of the third, fourth, and fifth sector type may be inserted and connected in a similar manner as discussed in FIG. 4C.

In this manner, the hub electrodes 235A may be arranged in different arrangements that have trade-offs. For instance, uniform arc length circle sectors may ensure each electrode is in contact with a similar amount of skin to sense biopotential signals, while non-uniform arc length circle sectors may provide a greater range of functionality (e.g., for sensing ECG data, or sensing different combinations of bio-electrical activity). Moreover, in the cases where switches or a multiplexer enable dynamic signal paths (e.g., to different differential amplifiers 315 or the ECG chip 270), different combinations (based on configuration data for each connections state) of the circle sector electrodes may be used for biopotential sensing or as reference electrodes.

In some cases, the hub electrodes 235A may include electrodes of different form factors (e.g., the first circle sector type 414, the second circle sector type 416, and the like, as discussed herein). The electrodes of different form factors may include sets of at least two electrodes of a same form factor or sets of at least two electrodes that have different form factors and same surface areas. In this manner, electrodes that have a same form factor or a same surface area may be input connection points 310B of a same differential amplifier 315. For instance, a pair of electrodes of the first circle sector type 414, or a pair of electrodes of the second circle sector type 416, may have a same surface area (and form factor). The pair of electrodes may input biopotential signals to connection points 310B of a same differential amplifier 315. In some cases, the differential amplifier 315 may subtract the biopotential signals correctly if the signals are from electrodes of equal surface area. Thus, in some cases, all electrodes in an array may have equal surface area or not, but each pair of electrodes which forms a channel may have equal surface areas.

In some cases, the surface area of the hub electrodes 235A may be larger or smaller for different form factors. Larger surface area form factors may have a greater resistance to noise (as compared to smaller surface area form factors). In this case, larger surface area form factors may provide for a more resilient system over all. Smaller surface area form factors may provide space for additional electrodes and channels (as compared to larger surface are form factors). In this case, having more electrodes and channels may provide additional biopotential signals to provide greater classification breadth (e.g., enable classifying a larger number of a plurality of gestures as compared to larger surface area form factors). In some cases, providing more channels may be useful for more complicated inferences in machine learning model. For example, a machine learning model may classify a smaller number of gestures using fewer channels, while the machine learning model may classify a larger number of gestures using a greater number of channels.

In some cases, size of the hub electrodes 235A may also enable placement of electrodes where better (or different) placements may enable better signal quality (or signals for different gestures). For instance, certain locations on a wrist or forearm may provide better signals (for certain gestures) and electrodes may take certain shapes or surface areas to accommodate the locations where the better signal is located.

In some cases, symmetry of (at least a some) of the hub electrodes 235A along an axis (such as the at least one axis 415) may match (or align with) areas of symmetry in the wrist or forearm. For instance, a symmetrical layout may enable left and right wrist use, as the muscles in wrists are functionally symmetrical.

Thus, various arrangements and selections of form factor may be designed. Each such arrangement and selection may have different benefits and tradeoffs.

FIGS. 5A-5E depict graphics 500A, 500B, 500C, 500D, and 500E of different aspects of a biopotential sensor 205 of a wearable device 110 with hub electrodes 235A and wristband electrodes 235B. The different aspects of the biopotential sensor 205 of the wearable device 110 in graphics 500A, 500B, 500C, 500D, and 500E may apply to the wearable device 110, as discussed in FIGS. 1, 2A-2C, 3A-3C, and 4A-4D above. Graphics 500A, 500B, 500C, 500D, and 500E may be modified to have different arrangements and include less or more components as shown.

Figure 5A:
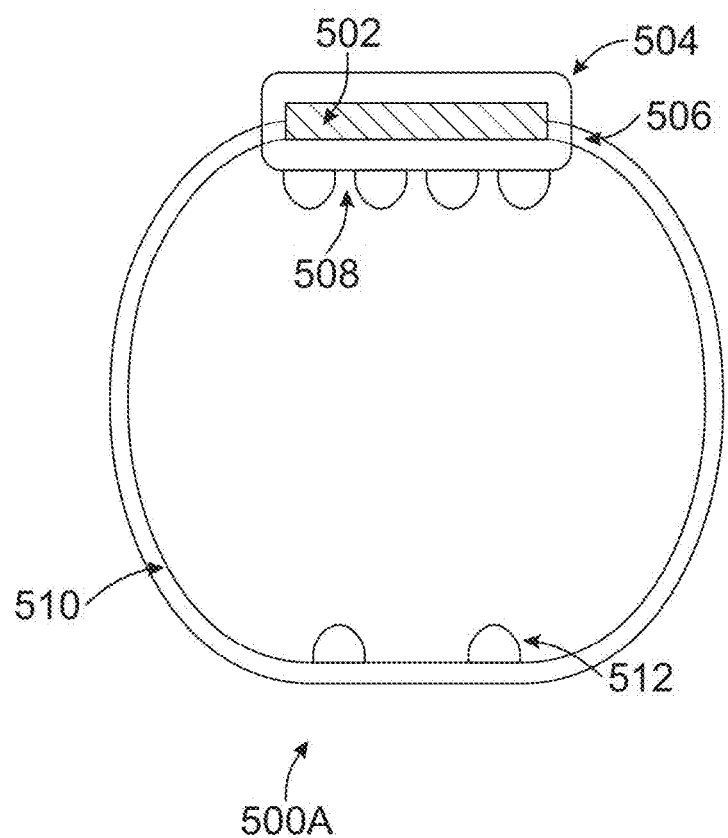
FIGS. 5A-5E depict graphics of different aspects of a biopotential sensor of a wearable device with hub electrodes and wristband electrodes.

In FIG. 5A, graphic 500A may depict a wearable device 110 with hub electrodes 508 (corresponding to hub electrodes 235A) and wristband electrodes 512 (corresponding to wristband electrodes 235B). The wearable device 110 may include a hub 504 with a biopotential chip 502 (corresponding to biopotential chip 250) disposed inside the hub 504. The hub 504 may have a sealed housing. The sealed housing may be water and/or air impermeable.

In some cases, the hub 504 may be rigid (e.g., made out of plastic or metal, and the like). In some cases, the hub 504 may be flexible (e.g., made out of silicon or a rubber, and the like). In some cases, the hub 504 may be 504 may include multiple rigid segments to enable a "semi flexible" behavior. For instance, the hub 504 may have rigid segments with joints that bend to allow for a degree of flexibility (see, e.g., wristband 510 in graphic 600B-2 as an example of this type of structure). The hub 504 may have the hub electrodes 508 (e.g., a plurality of hub electrodes 508) disposed on an interior surface of the hub 504, so as to contact a user's arm (e.g., wrist or forearm). For instance, the hub 504 may be positioned over the top of a user's wrist, so that the hub electrodes 508 may sense biopotentials from the top of the wrist.

The biopotential chip 502 may include the plurality of analog inputs 305 and the plurality of ADCs 250E configured to receive signals from the plurality of analog inputs 305, as discussed herein. The biopotential chip 502 may also receive signals from the accelerometer and the gyroscope, as discussed herein. The hub electrodes 508 may be electrically connected, via conductors disposed within the hub 504, to one or more analog inputs 305 of the plurality of analog inputs 305 of the biopotential chip 502.

Figure 5B:
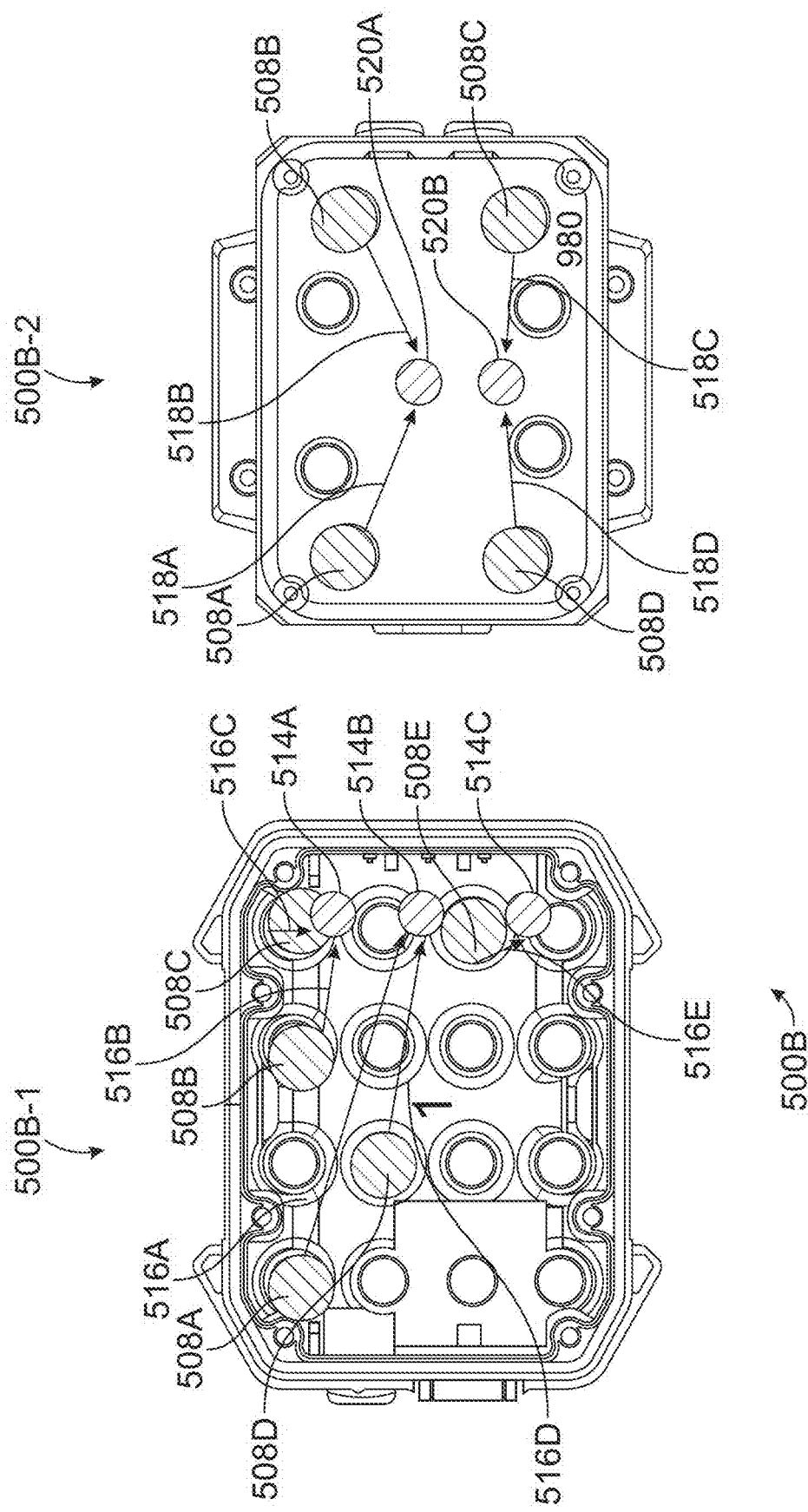
Figure 5C:
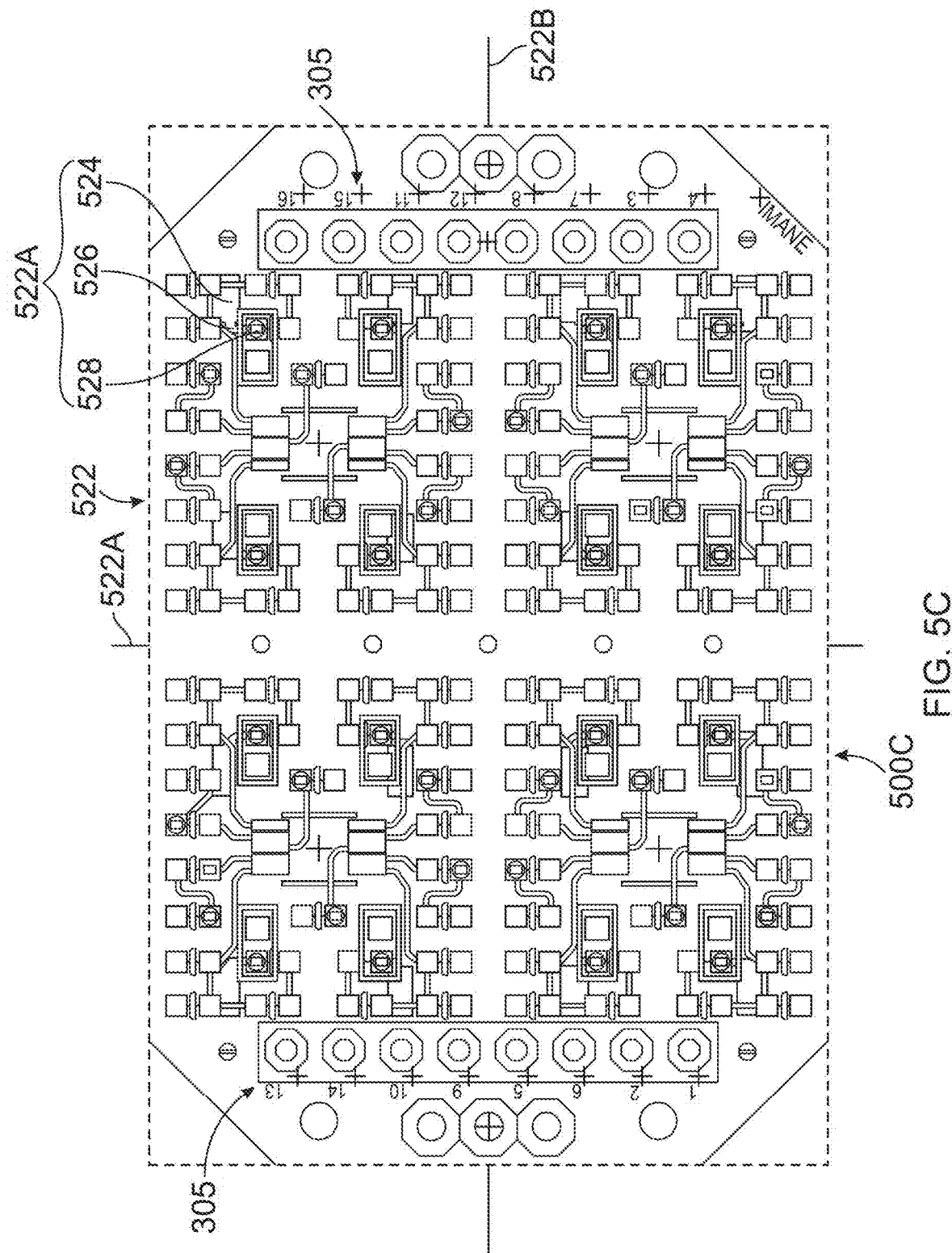
Figure 5D:
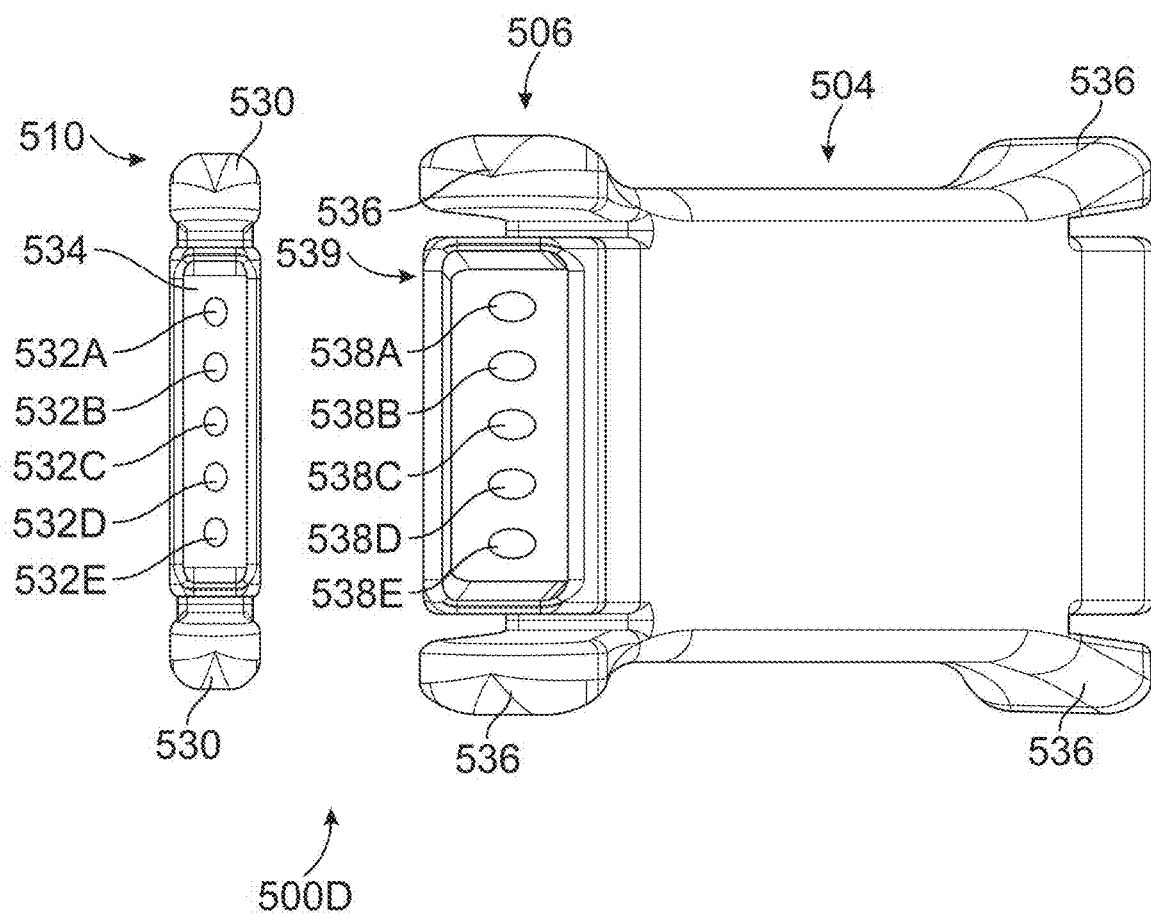
Figure 5E:
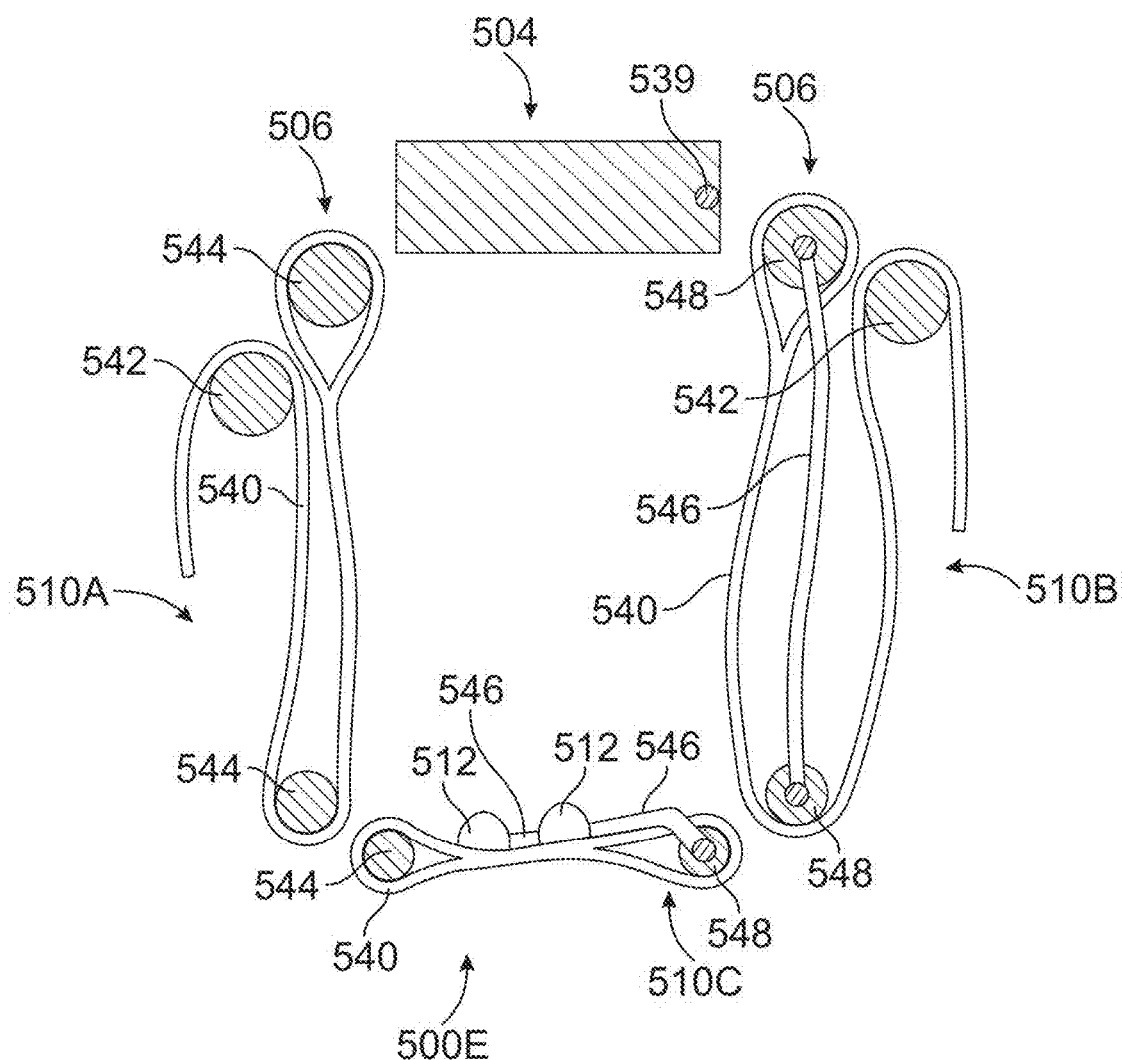

The sealed housing of the hub 504 may include an electrical port 539 (see FIG. 5D or 5E). The electrical port 539 may be electrically connected to at least one analog input (e.g., on a one-to-one basis for a number of wristband electrodes 512) of the plurality of analog inputs 305 of the biopotential chip 502. In some cases, the electrical port 539 may also include a connection to a voltage source of the biopotential chip 502, so as to provide power to the wristband electrodes 512.

The wearable device 110 may include a wristband 510. The wristband 510 may be made out suitable materials, such as textiles, metal, silicon, rubber, plastic, and the like. The wristband 510 may have the wristband electrodes 512 (e.g., one or more, or a plurality of wristband electrodes 512) disposed on an interior surface of the wristband 510, so as to contact a user's arm (e.g., wrist or forearm). For instance, the wristband 510 may be configured so that the wristband electrodes 512 are generally placed in a same location on a user each time the wearable device 110 is worn by the user.

In some cases, the wristband 510 is a closed loop (e.g., does not open). In these cases, the wristband 510 may be adjustable or stretchy to fit over a hand of a user. In some cases, the wristband 510 is configured to be opened and closed by a clasp, or other suitable locking mechanism. In some cases, a wristband electrode 512 may be a part of the clasp or other suitable locking mechanism. The wristband 510 may have one or more wristband conductors to carry biopotential signals from the wristband electrodes 512 to the biopotential chip 502, as discussed herein. For instance, the one or more wristband conductors may electrically connect the wristband electrodes 512 to the electrical port 539 of sealed housing of the hub 504. The wristband 510 and the hub 504 together may be configured to encircle the wrist (or forearm) of the user 105. In some cases, the one or more wristband conductors may be a conductive fabric. In some cases, the one or more wristband conductors may be signal conductors (e.g., wires) that are shielded (or not). For instance, the signal conductors may be embedded into the wristband 510 or attached to an exterior (or interior) surface of the wristband 510.

The wearable device 110 may also have a hub-wristband junction 506. The hub-wristband junction 506 may secure the wristband 510 to the hub 504. For instance, the hub-wristband junction 506 may secure the wristband 510 to the hub 504 on two sides of the hub 504. The hub-wristband junction 506 may be in a same location as the electrical port 539 of the sealed housing of the hub 504, so that the one or more wristband conductors may pass electrically signals into the hub 504 via the electrical port 539.

In this manner, the wearable device 110 may obtain biopotential data based on signals received by both hub electrodes 508 and wristband electrodes 512 and processed by the ADCs 250E of the biopotential chip 502. In some cases, the biopotential chip 502 may obtain wrist location data based on outputs from the accelerometer and the gyroscope, and the biopotential chip 502 may be configured to transmit the biopotential data and the wrist location data to a ML classifier 230, discussed herein. The ML classifier 230 be configured to analyze the biopotential data and the wrist location data to generate a gesture output indicating a gesture performed by the user 105.

In some cases, the hub electrodes 508 are disposed in a curved arrangement. The curved arrangement may have a curvature in a plane that extends perpendicular to a length of the forearm when the wearable device 110 is worn on the wrist. For instance, the curvature may correspond to a curved surface with a radius equal to a shallowest curvature of a distribution of user wrists (or forearms). The distribution may be a distribution of an expected population of users (e.g., military users would have a larger wrist or forearm, while civilian population may have smaller wrists or forearms). The shallowest curvature may be within a selected standard deviation of a mean curvature to avoid capturing outliers in a distribution. In other cases, a radius of curvature may be less than 0.5 cm, less than 1 cm, less than 2 cm, less than 3 cm, less than 4 cm, or less than 5 cm. In this manner, hub electrodes 508 may have a consistent fit that may apply across a population of users.

In some cases, the wristband electrodes 512 may be active electrodes. In this case, the wristband electrodes 512 may be coupled to buffer components (such as one or more wristband amplifiers). The buffer components (e.g., the one or more wristband amplifiers) may be disposed between the wristband electrodes 512 and the one or more wristband conductors. The buffer components may be configured to amplify signals received by the wristband electrodes 512 to buffer the signals from noise and/or interference as the signals travel through the one or more wristband conductors.

In some cases, the wristband 510 may be adjustable to a plurality of length states. In this case, each of the plurality of length states may have a respective circumference when the wristband 510 is worn. Moreover, the wristband 510 and the wristband electrodes 512 may be configured so that the wristband electrodes 512 may be situated at a constant position relative to the hub 504 in each of the plurality of length states. In this manner, the wristband electrodes 512 may be disposed at a predetermined position on the user's wrist (or forearm) across a range of wrist sizes of users.

In some cases, the wristband 510 may connect to the hub 504 on two sides of the hub 504, at the hub-wristband junction 506. In some cases, the wristband 510 may be adjustable relative to the hub 504 on both of the two connections between the wristband 510 and the hub 504. In some cases, the wristband 510 may be adjustable on only one of the two connections between the wristband 510 and the hub 504. In some cases, the wristband 510 may not be adjustable on the two connections between the wristband 510 and the hub 504. Thus, in cases where the wristband 510 is adjustable, the adjustment may enable precise (and consistent) placement of electrodes relative to the location of electrode signals, even across various wrist shapes and sizes. In some cases, the adjustment on both sides may be made while still allowing electrical connection between wristband electrodes in the wristband 510 and the hub 504, or across various electrodes in the wristband 510.

In some cases where both sides are adjustable, a first side of the wristband 510 may lock more securely than a second side of the wristband 510. For, the first side may be adjusted to secure the wristband electrodes to the position for a user's wrist once, and the user may use the second side to put the device on and take the device off. In some cases, the first side may where the electrical port 539 is located.

In FIG. 5B, graphic 500B shows aspects of trace lengths of conductors connecting the hub electrodes 508 to the analog inputs 305. For instance, in graphic 500B-1, the hub electrodes 508A, 508B, 508C, 508D, and 508E may have respective trace lengths 516A, 516B, 516C, 516D, and 516E to locations 514A, 514B, and 514C of certain analog inputs 305. The trace lengths 516A, 516B, 516C, 516D, and 516E may be significantly different (e.g., a longest trace length being more than double or triple in length as compared to a smallest trace length). Thus, biopotential signals being carried on the trace lengths 516A, 516B, 516C, 516D, and 516E may be exposed to environmental electrical noise to differing degrees, in accordance with their trace length. Thus, the biopotential signals may have differing signal to noise ratios that may be a challenge to filter out (e.g., via differential amplifiers 315).

In contrast, in graphic 500B-2, the hub electrodes 508A, 508B, 508C, and 508D may have respective trace lengths 518A, 518B, 518C, and 518D to locations 520A and 520B of certain analog inputs 305. The trace lengths 518A, 518B, 518C, and 518D may be significantly similar (e.g., within 5%, 3%, or 1% of each other). Thus, biopotential signals being carried on the trace lengths 518A, 518B, 518C, and 518D may be exposed to environmental electrical noise to a similar degree, in accordance with their trace length. By using equal trace lengths, common noise (such as 60 Hz radiofrequency noise) may apply equally to the various traces, and this noise may be effectively cancelled using differential amplifiers or other signal averaging circuitry or logic. Thus, the biopotential signals may have similar signal to noise ratios that may be a relatively easier to filter out (e.g., via differential amplifiers 315). For instance, the locations 520A and 520B of certain analog inputs 305 may be relatively equidistant to each of the hub electrodes 508A, 508B, 508C, and 508D. In contrast, the locations 514A, 514B, and 514C of certain analog inputs 305 may be relatively closer to certain of the hub electrodes 508A, 508B, 508C, 508D, and 508E and relatively further from others of hub electrodes 508A, 508B, 508C, 508D, and 508E.

In FIG. 5C, graphic 500C depicts trace lengths of conductors 522 from hub electrodes 508 to analog inputs 305 in a different arrangement. The arrangement of conductors 522 may have at least two axis of symmetry, such a first axis of symmetry 522A and a second axis of symmetry 522B. Due to the first axis of symmetry 522A and the second axis of symmetry 522B, the trace lengths may significantly similar. In particular, the conductors 522 may be sixteen (16) identical circuits, each positioned proximate (e.g., within a threshold distance) to a respective electrode. As each conductor 522, has an identical circuit protecting the biopotential signal from each individual electrode, the sixteen biopotential signals are exposed to the same amount of noise (e.g., a variation less than 1%).

In some cases, each conductor 522A (of conductors 522) may have a spring contact 524, a trace 526, and a buffer circuit 528. The spring contact 524 may electrically connect directly to an electrode (e.g., below the spring contact 524, that is into the graphic 500C). The spring contract 524 may be a biased deformable conductive metal to ensure electrical connection to the electrode even in the presence of vibration or shock. The trace 526 may be an electrical conduit on a PCB board. The trace 526 may be a very short trace (e.g., less than 1 mm, less than 2 mm, less than 3 mm, less then 4 mm, and the like) electrically connecting the spring contact 524 and the buffer circuit 528. In some cases, the trace 526 may be configured to a top layer of a PCB and connected to the buffer circuit 528. Thus, in this manner, the electrodes may be as close as possible to the buffer circuit, and thus reduce exposure of the biopotential signals to noise. The buffer circuit 528 may include buffer components and electrically connect the electrode (via the spring contact 524 and the trace 526) to an analog input 305. The buffer circuit 528 may protect the biopotential signals from noise by various means, as discussed herein. In FIG. 5D, graphic 500D may depict the hub-wristband junction 506 of the hub 504 to secure the wristband 510 to the hub 504 and pass signals (and power) between the wristband 510 and hub 504 with a non-adjustable connection (to adjust a length of the wristband 510). For instance, each of a first end and second end of the wristband 510 may have first connectors 530 configured to connect to second connectors 536 of the hub-wristband junction 506. In some cases, the first connectors 530 and second connectors 536 may be a snap fit, a ball-joint connection, and the like. For instance, the second connectors 536 may flex while the first connectors 530 are inserted, and flex back to hold the first connectors 530 after the first connectors 530 are fully inserted.

Also depicted in graphic 500D, wristband conductors 532A, 532B, 532C, 532D, and 532E may be embedded in a material 534 (e.g., textile, rubber, silicon, and the like) of the wristband 510. After the first connectors 530 are connected to the second connectors 536, the wristband conductors 532A, 532B, 532C, 532D, and 532E may be electrically connected (e.g., by insertion and/or contact, and the like) to corresponding electrical junctions 538A, 538B, 538C, 538D, and 538E of the electrical port 539 of the sealed housing of the hub 504. For instance, one of electrical junctions 538A, 538B, 538C, 538D, and 538E may provide power to wristband electrodes 512, while four of electrical junctions 538A, 538B, 538C, 538D, and 538E may receive signals from the wristband electrodes (e.g., in the case of four wristband electrodes 512).

Accordingly, as shown the exemplary embodiment of FIG. 5D, a wristband may have biopotential electrodes, and wire traces carrying signals from those wristband electrodes may connect to a hub of a smartwatch using an electrical port on the hub. In some embodiments, the band may mechanically and releasably couple (e.g., via snap fit or latch) to the hub, and in the process of being mechanically coupled, and electrical connection between the wristband electrodes and processing circuitry (such as that described above with reference to FIGS. 2-3) may automatically be established, without need for separate mechanical and electrical connections. This may advantageously allow for simple and intuitive connections between wristband and hub, so that wristbands may easily be released and replaced, e.g., for user customization in sizing or style, or to replace damaged items.

In FIG. 5E, graphic 500E may depict the hub-wristband junction 506 of the hub 504 to secure the wristband 510 to the hub 504 and pass signals (and power) between the wristband 510 and hub 504 with an adjustable connection on both sides (to adjust a length of the wristband 510). At each hub-wristband junction 506, the wearable device 110 may have one of a first retention member 544 or a second retention member 548. For instance, the first retention member 544 may be textile retainer (e.g., a bar) that may be configured to open and close to retain a first portion of the wristband 510A (e.g., made of textile 540). The second retention member 548 may be textile retainer (e.g., a bar) that may be configured to open and close to retain a second portion of the wristband 510B (e.g., made of textile 540). The second retention member 548 may also pass electrical signals to electrical junctions 538A, 538B, 538C, 538D, and 538E of the electrical port 539 (preferably, a combined electrical port/mechanical coupling) of the sealed housing of the hub 504. For instance, the second retention member 548 may pass the electrical signals via an electrical conductor (e.g., a wire or slip ring).

The first portion of the wristband 510A and the second portion of the wristband 510B may be connected by a third portion of the wristband 510C, via additional first retention members 544 and second retention members 548. The third portion of the wristband may include the wristband electrodes 512 and be made of textile 540. Thus, the power and signals may be transmitted between the wristband electrodes 512 and electrical port 539 via wristband conductors 546.

The first retention member 544 and the second retention member 548 may each be paired with an adjustment member 542. The adjustment member 542 may lock the textile 540 of each of the first portion of the wristband 510A and the second portion of the wristband 510B in place (e.g., by compression, tension, or torsion).

It is desirable that electrodes 512 be able to maintain a common radial location on the lower side of a user's wrist regardless of the size of the user's wrist. The ML classifier may be trained based on an expectation that the electrodes will be located in or near that predetermined radial location, which has known electrical relationships to the muscles and nerves of the arm and wrist. In conventional wristbands that are tightened on only one side, tightening the band moves the material of the band relative to the wrist, which, if electrodes were incorporated, would result in the electrodes being undesirably shifted relative to the wrist. Conversely, in the embodiment shown in FIG. 5E (and in other embodiments within the scope of this disclosure), the size of the wristband may be adjusted while the position of the wristband electrodes relative to the wrist is maintained.

FIGS. 6A-6D depict graphics 600A, 600B, 600C, and 600D of different aspects of wristband electrodes 512 (corresponding to wristband electrodes 235B) of a biopotential sensor 205. The different aspects of the wristband electrodes 512 of the biopotential sensor 205 in graphics 600A, 600B, 600C, and 600D may apply to the wearable device 110, as discussed in FIGS. 1, 2A-2C, 3A-3C, 4A-4D, and 5A-5E above. Graphics 600A, 600B, 600C, and 600D may be modified to have different arrangements and include less or more components as shown.

Figure 6A:
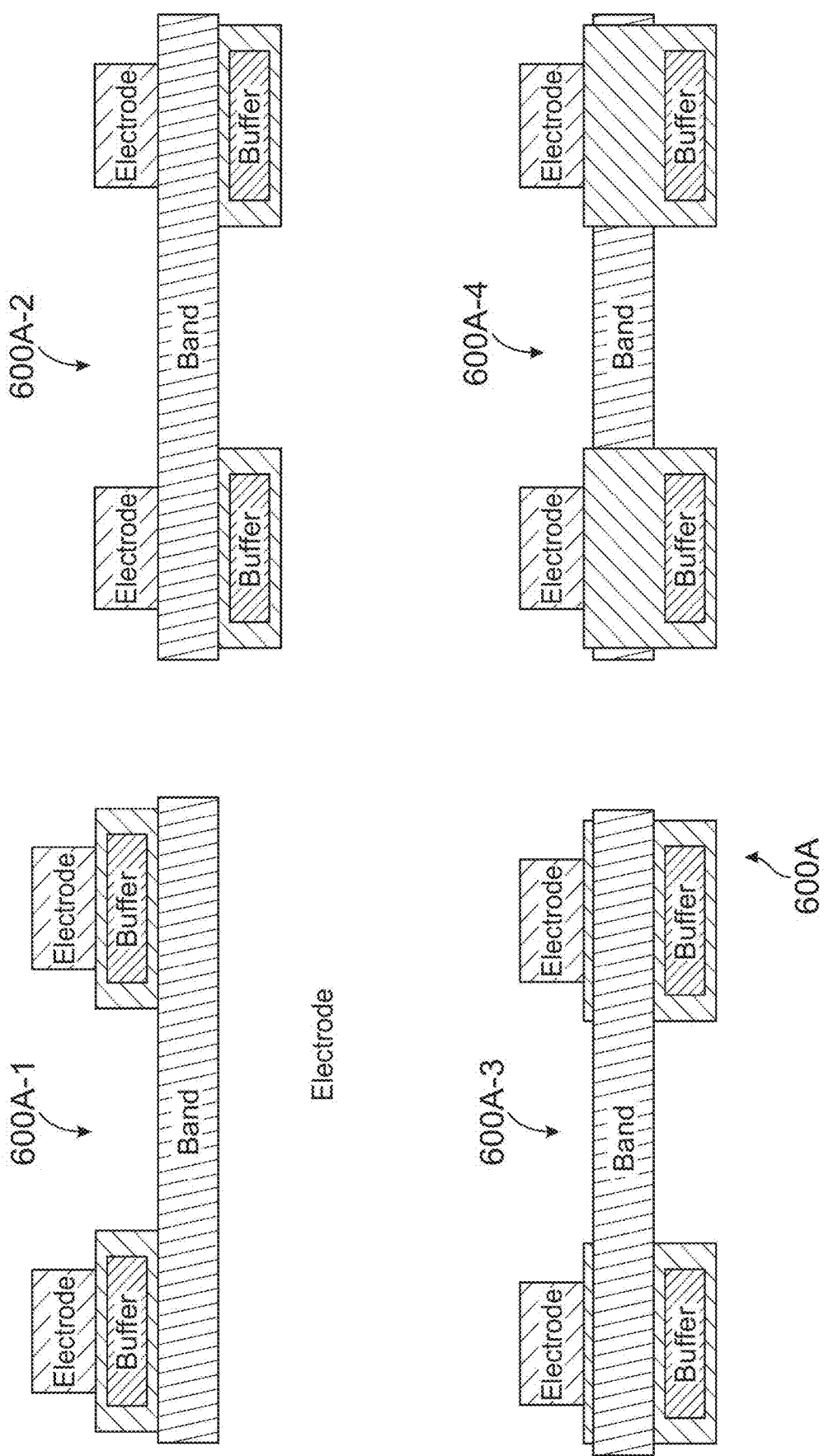

In FIG. 6A, graphic 600A may depict different arrangements of buffer components and housings of active wristband electrode 512. In graphic 600A-1, the housing is attached to an interior of the wristband with the buffer components sealed inside and an electrode attached to the housing on an interior of the wristband. In graphic 600A-2, the housing is attached to an exterior of the wristband with the buffer components sealed inside and an electrode attached to an interior of the wristband and connected to the buffer components via, e.g., a wristband conductor or the electrode extends through the wristband. In graphic 600A-3, the housing is attached to an exterior of the wristband with the buffer components sealed inside and an electrode attached to the housing on the interior of the wristband, as the housing may extend through a portion of the wristband. In graphic 600A-4, the housing is attached to and surrounds the wristband with the buffer components sealed inside and an electrode attached to an interior facing side of the housing on an interior of the wristband.

Figure 6B:
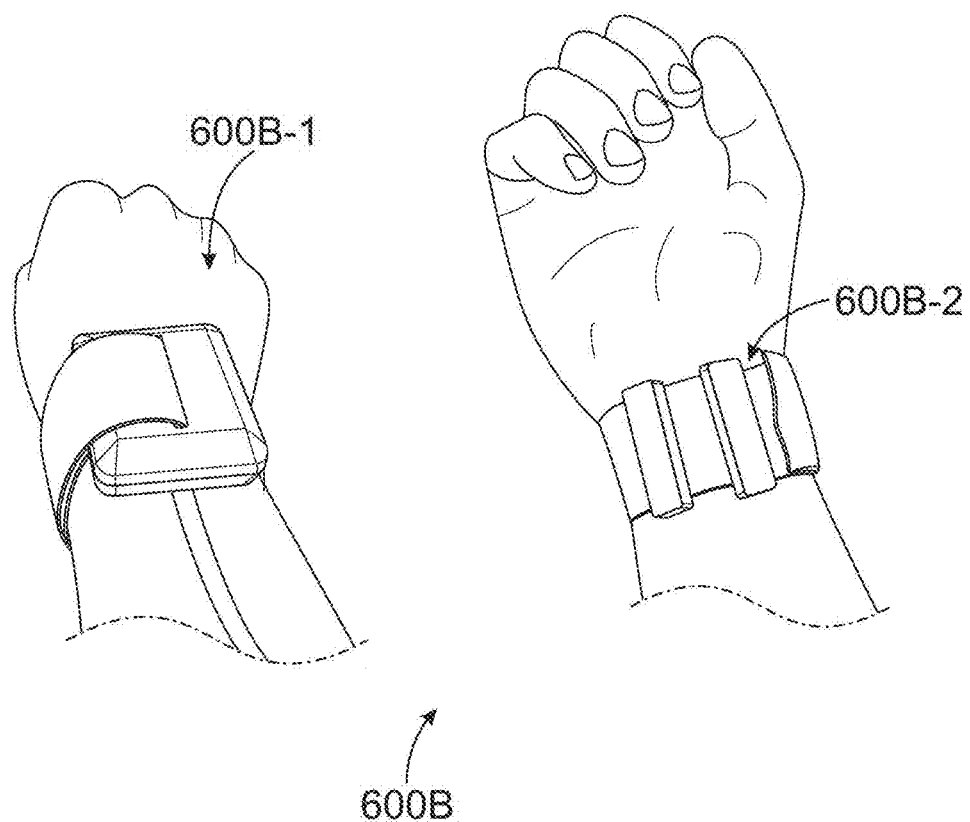

In FIG. 6B, graphic 600B may depict an active electrode housing for wristband electrodes 512 surrounding the wristband 510 (in graphic 600B-2) and a hub 504 (in graphic 600B-1).

In FIG. 6C, graphic 600C may depict textile wristband electrodes 512 (in graphic 600C-1) and conductors from the electrical port 539 connecting to analog inputs 305 (in graphic 600C-2).

Figure 6D:
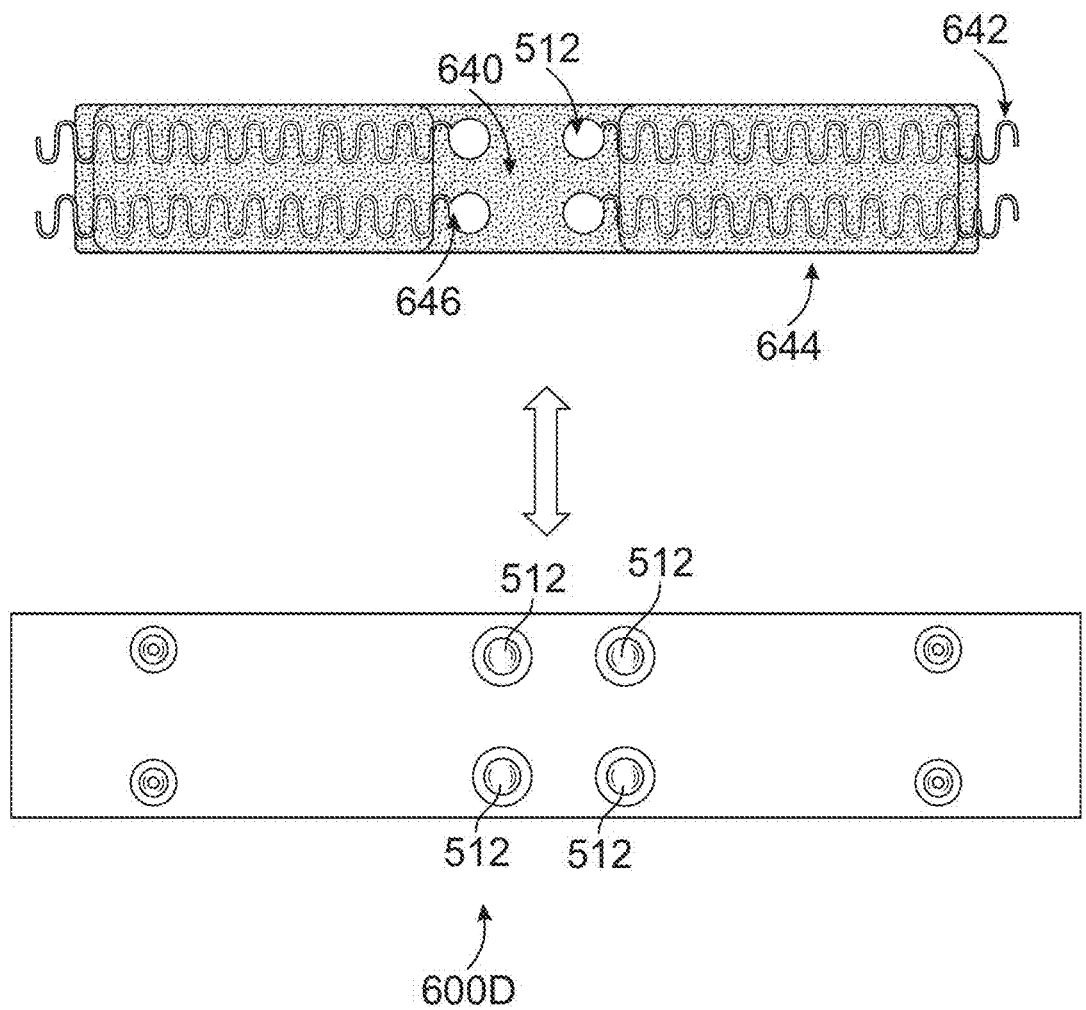

In FIG. 6D, graphic 600D may depict features of textile wristband electrodes 512. For instance, the wristband 510 may include portions e-textile that includes wristband conductors 646 shielded using a shield 644 (e.g., a layer of textile or laminate covering the wristband conductors on a textile). The textile wristband electrodes 512 may be e-textile fabric thread (metal filament and the like) that is built into a shape to act as an electrode. The textile wristband electrodes 512 may be connected to the wristband conductors 646, which may run the electrical port 539 where extensions 642 of wristband conductors 646 may be connected to the electrical port 539. In this case, the textile wristband electrodes 512 may "passive electrodes" that do not have buffer components. Moreover, in this case, the wristband 510 may include a middle region of textile 640 between the textile wristband electrodes 512 to provide stretch to the wristband 510. Furthermore, the wristband conductors 646 may be shaped in certain arrangements (e.g., sine wave) to elongate with a stretching of the e-textile.

Figure 7B:
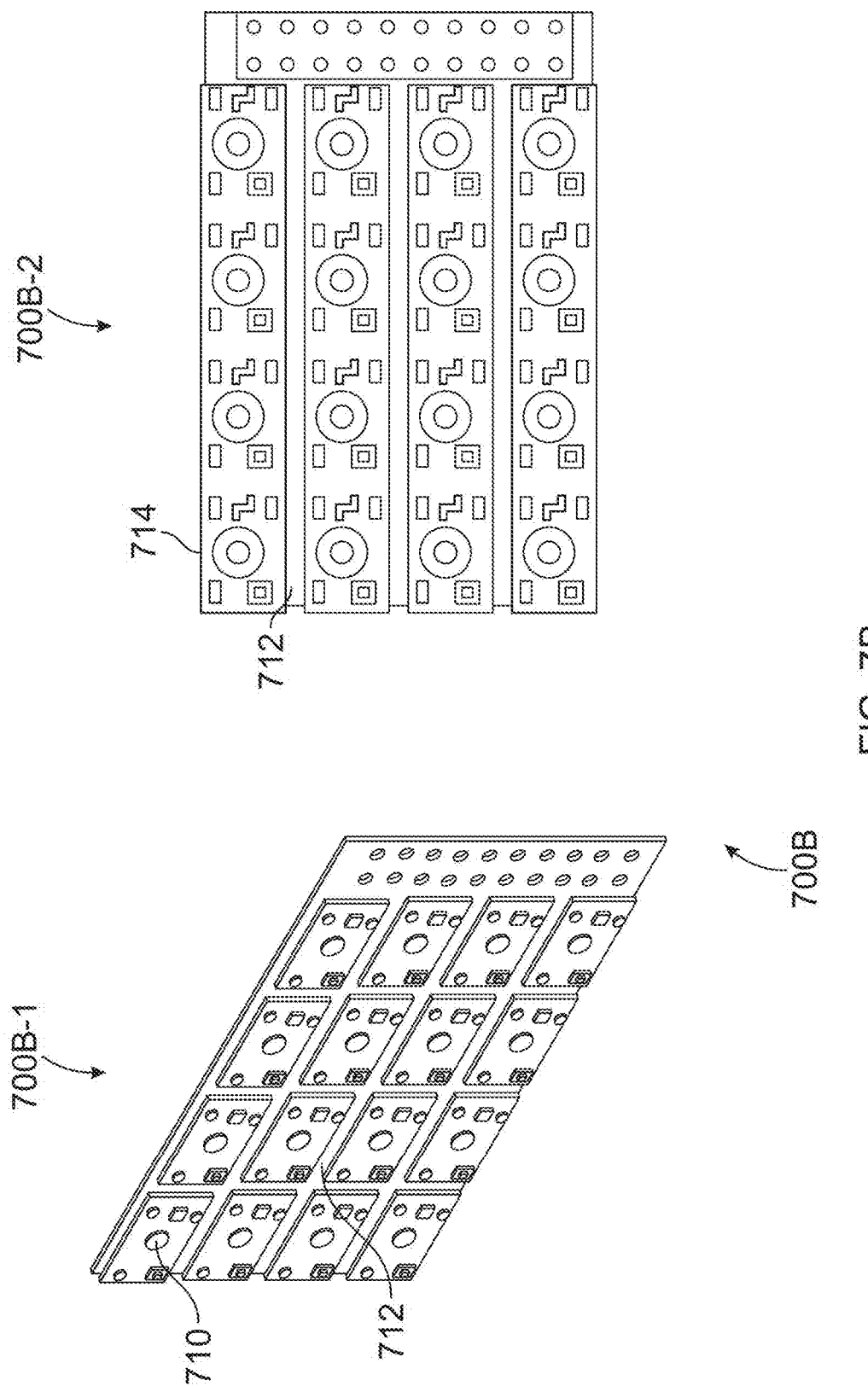

FIGS. 7A-7B depict graphics 700A and 700B of different aspects of hub electrodes 235A disposed in a curved arrangement. The different aspects of the hub electrodes 235A disposed in a curved arrangement in graphics 700A and 700B may apply to the wearable device 110, as discussed in FIGS. 1, 2A-2C, 3A-3C, 4A-4D, 5A-5E, and 6A-6D above. Graphics 700A and 700B may be modified to have different arrangements and include less or more components as shown.

In FIG. 7A, graphic 700A may depict different perspectives of a curved arrangement of hub electrodes 508. In graphic 700A-2, the hub electrodes 508 are depicted arranged in an array (e.g., four by four matrix). The curved arrangement of the array may have a curvature in a plane 702 that extends perpendicular to an axis the length of the forearm when the wearable device 110 is worn on the wrist. The curved arrangement of the array may not have a curve in the axis the length of the forearm. In graphic 700A-1, the curvature in the plane 702 that extends perpendicular to the axis the length of the forearm may be recognized by the facing direction of hub electrodes 508. For instance, a plane 704 arranged normal from a face of hub electrode 508 from a first group (e.g., on far left) would intersect a plane 706 arranged normal from a face of hub electrode 508 from a second group (e.g., on far right).

In FIG. 7B, graphic 700B may depict how signals may be collected from the curved arrangement of hub electrodes 508. Generally, the hub electrodes 508 may be attached to a PCB 710 (graphic 700B-1) or PCB 714 (graphic 700B-2), with or without buffer components, to secure the hub electrodes 508 to the hub 504. In graphic 700B-1, each hub electrode 508 may have a single PCB 710 to attach to, and each PCB 710 may be independent of any other PCB 710 (that is not connected to other PCB 710 and may be flexible independent of the other PCB 710). Sets of hub electrodes 508 may be attached respective PCB 714, and each PCB 714 may be independent of any other PCB 714 (that is not connected to other PCB 714 and may be flexible independent of the other PCB 714). The sets of hub electrodes 508 may include hub electrodes along a row (or column) of the array, so that the PCB 714 may be curved into position in accordance with the curvature in the plane 702.

In both cases, the PCB 710 and PCB 714 are mounted to a flexible PCB 712. The flexible PCB 712 may carry signals to the biopotential chip 250 and power from the biopotential chip 250 to the hub electrodes 508.

In this manner, the hub electrodes 508 may be curved to match a curved surface of a user's wrist or forearm. Thus, the hub electrodes 508 may have more uniform contact between the electrode face and the user's skin, and generate more accurate biopotential data (and more accurate gesture detection).

In some cases, the hub 504 may also be flexible. The hub 504 and/or the PCBs may (combined) have a flex with spring constant to start in a flat arrangement and then the user 105 may strap the hub 504 down (and thereby curve the PCBs and electrodes 508) so that the hub electrodes 508 are in contact with skin of the user 105. In some cases, to strap down the hub, the straps may have attachment points at ends of the hub 504. In this case, this may be easier to attach straps to the hub 504. In some cases, the strap may strap down over top of the hub 504. In this case, it may be harder to attach the straps, but the force maybe evenly distributed across the hub electrodes 508. In this case, the curvature in the plane 702 (at default without straps) may correspond to a curved surface with a radius equal to median curvature of a distribution of user wrists (or forearms). The distribution may be a distribution of an expected population of users (e.g., military users would have a larger wrist or forearm, while civilian population may have smaller wrists or forearms). The median curvature may be selected from within one standard deviation of a mean curvature, preferably on the larger end of the distribution, so to flex down to the skin of users while being strapped down.

Figure 8A:
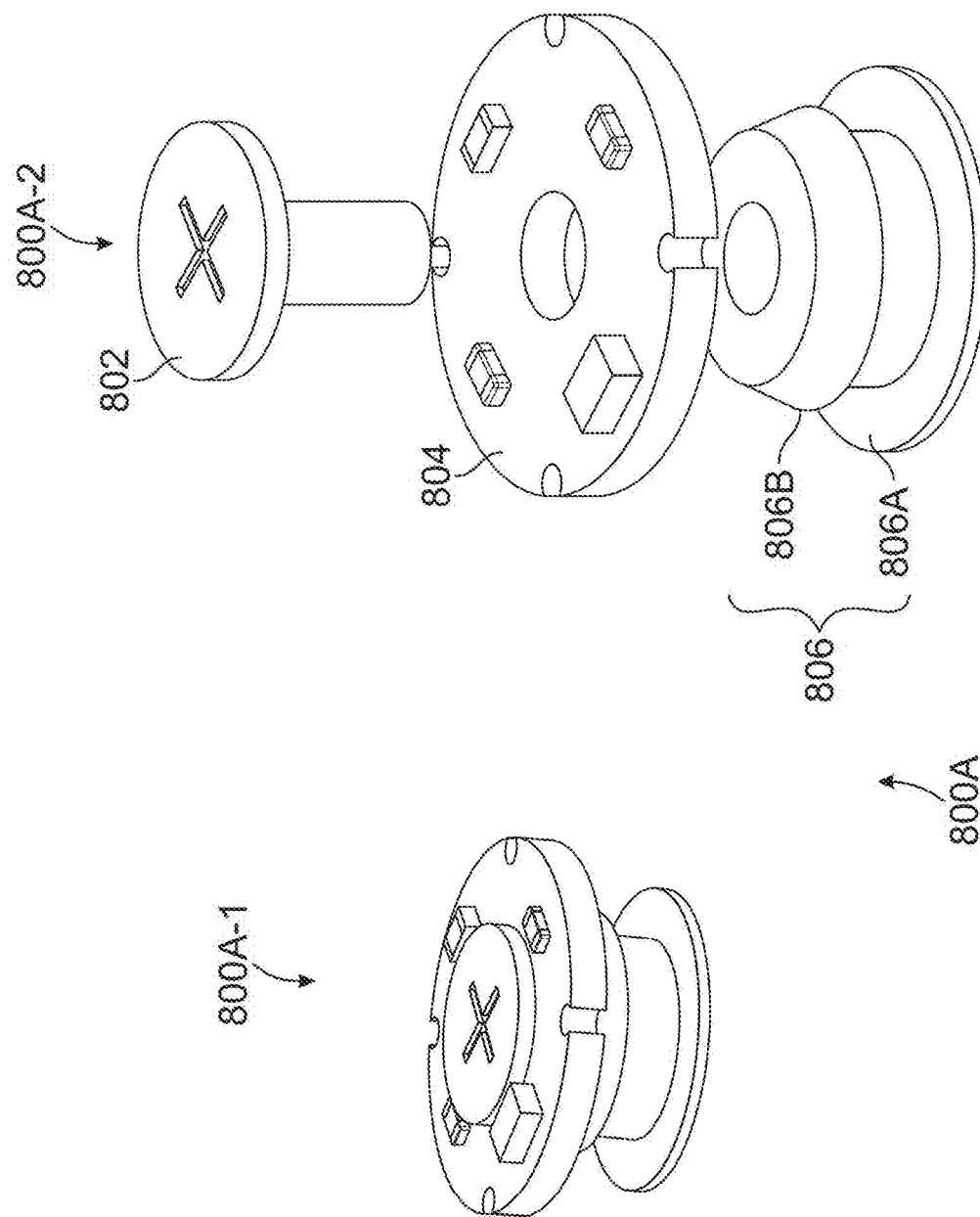
FIGS. 8A-8B depict graphics of different aspects of electrodes of a biopotential sensor.
Figure 8B:
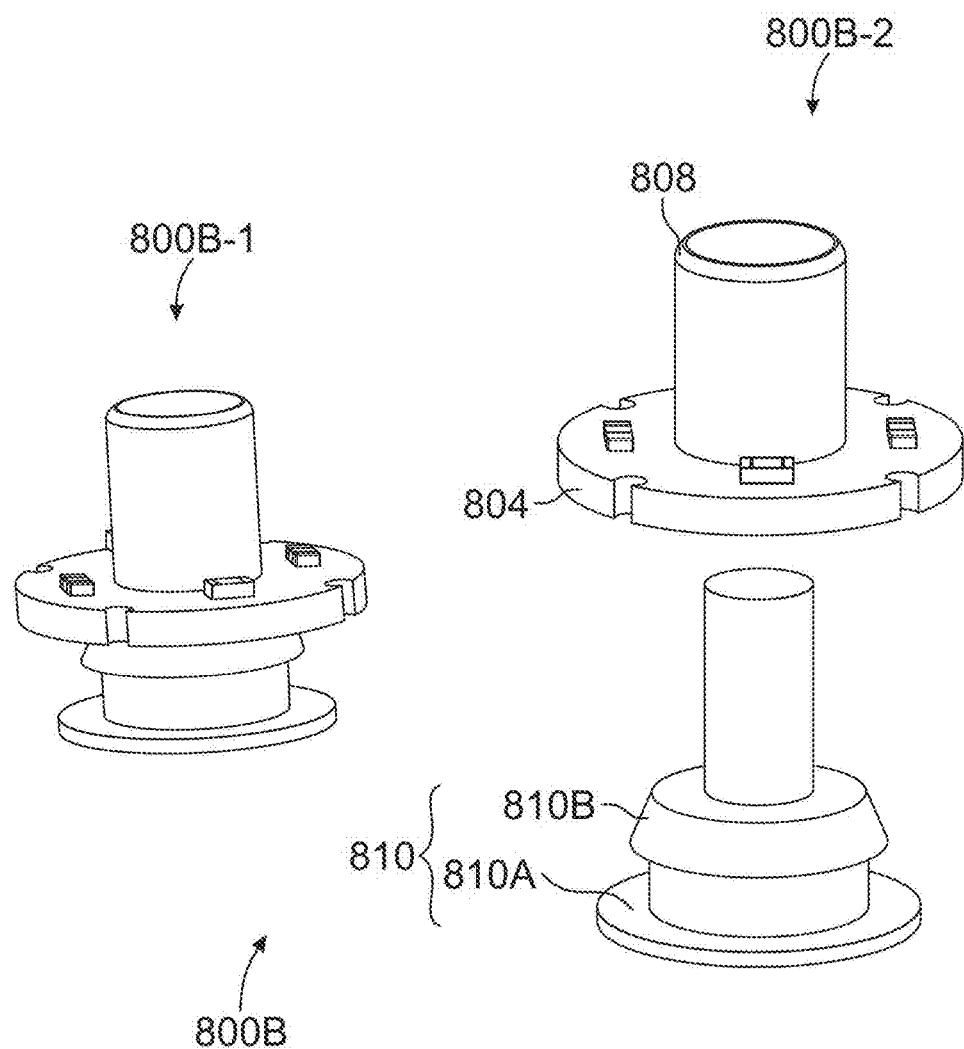

FIGS. 8A-8B depict graphics 800A and 800B of different aspects of electrodes 235 of a biopotential sensor 205. The different aspects of the electrodes 235 of the biopotential sensor 205 in graphics 800A and 800B may apply to the wearable device 110, as discussed in FIGS. 1, 2A-2C, 3A-3C, 4A-4D, 5A-5E, 6A-6D, and 7A-7B above. Graphics 800A and 800B may be modified to have different arrangements and include less or more components as shown.

In FIG. 8A, graphic 800A may depict an active electrode with a solid metal body 806 (as assembled in 800A-1, and in exploded form 800A-2) that affixes to a hub or case via a first retention member 802. The solid metal body 806 may include a face 806A and an extended portion 806B. The extended portion 806B may have a thread for engaging a corresponding thread of the first retention member 802. The first retention member 802 may affix the solid metal body 806 to the hub or case. In some cases, the PCB 804 (with buffer components) may be affixed by the first retention member 802 to the solid metal body 806 (and/or a portion of an interior of the hub or case).

In FIG. 8B, graphic 800B may depict an active electrode with a solid metal body 810 (as assembled in 800B-1, and in exploded form 800B-2) that affixes to a hub or case via a second retention member 808. The solid metal body 810 may include a face 810A and an extended portion 810B. The extended portion 810B may have a pressure fit portion (e.g., increasing in diameter away from the face) for engaging the second retention member 808. The second retention member 808 may be a hollow cylinder for receiving the extended portion 810B. The hollow cylinder may have tapering walls (e.g., decreasing in diameter toward the face). The second retention member 808 may affix the solid metal body 810 to the hub or case. In some cases, the PCB 804 (with buffer components) may be affixed to the second retention member 808 on an exterior of the hollow cylinder of the second retention member 808. In some cases, the active electrode may be attached to the housing of the hub 504 via a clip.

Example Routine(s)

Figure 9A:
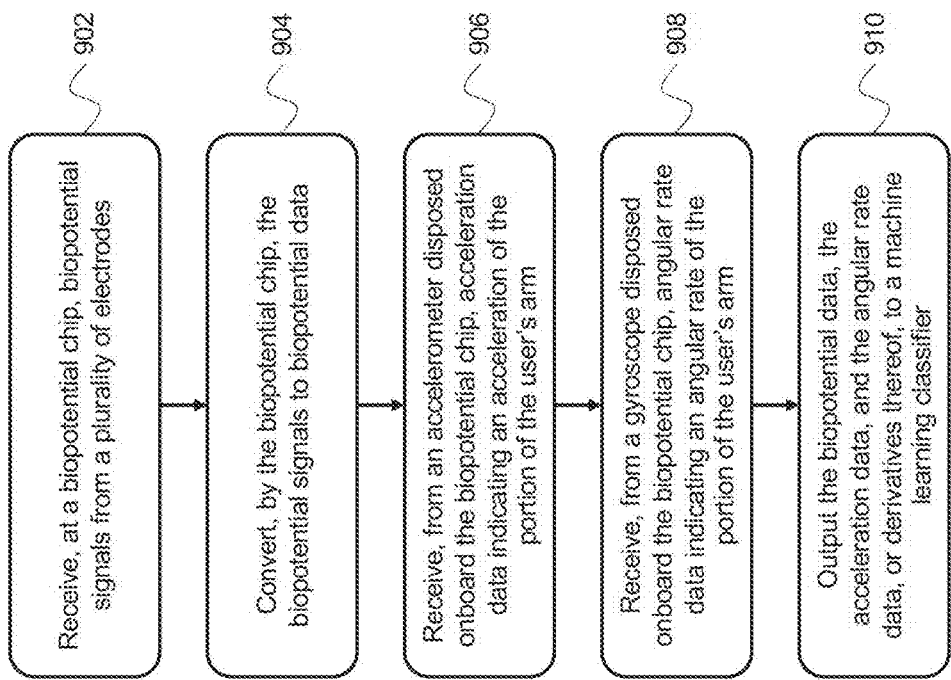
FIGS. 9A and 9B depict flowcharts of routines of a wearable device.
Figure 9B:
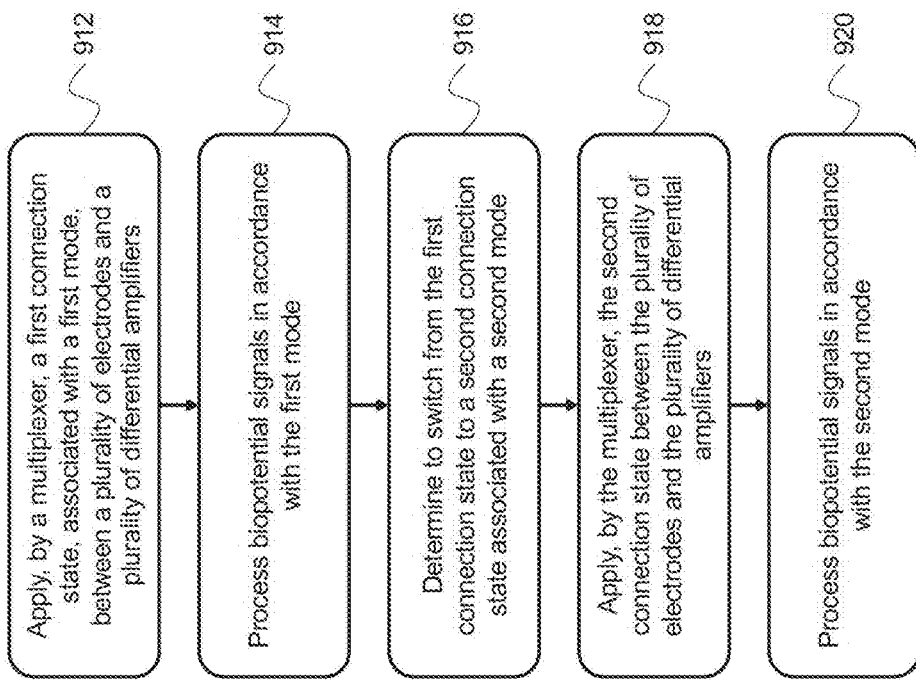

FIGS. 9A and 9B depict flowcharts of routines of a wearable device. FIG. 9A depicts a flowchart of an exemplary routine 900A for outputting gesture data to a ML classifier. In the routine 900A, the routine 900A may be performed by one or more systems, such as biopotential chip 250 that performs certain data obtains and outputs the biopotential data, the acceleration data, and the angular rate data, or derivatives thereof, as discussed herein. The routine 900A may start at block 902, where the biopotential chip 250 may receive biopotential signals from a plurality of electrodes. At block 904, the biopotential chip 250 may convert the biopotential signals to biopotential data. At block 906, the biopotential chip 250 may receive, from an accelerometer disposed onboard the biopotential chip, acceleration data indicating an acceleration of the portion of the user's arm. At block 908, the biopotential chip 250 may receive, from a gyroscope disposed onboard the biopotential chip, angular rate data indicating an angular rate of the portion of the user's arm. At block 910, the biopotential chip 250 may output the biopotential data, the acceleration data, and the angular rate data, or derivatives thereof, to a machine learning classifier.

FIG. 9B depicts a flowchart of an exemplary routine 900B for switching connection states from a first connection state to a second connection state. In the routine 900B, the routine 900B may be performed by one or more systems, such as the biopotential chip 250 that performs the switch between different connection states, as discussed herein.

The routine 900B may start at block 912, where the biopotential chip 250 may apply, by a multiplexer, a first connection state, associated with a first mode, between a plurality of electrodes and a plurality of differential amplifiers. At block 914, the biopotential chip 250 may process biopotential signals in accordance with the first mode. For instance, the first mode may correspond to first one of obtain biopotential data, obtain training data, obtain ECG data, obtain impedance data, and the like, as discussed herein. At block 916, the biopotential chip 250 may determine to switch from the first connection state to a second connection state associated with a second mode. For instance, the biopotential chip 250 may receive an external command to switch modes. At block 918, the biopotential chip 250 may apply, by the multiplexer, the second connection state between the plurality of electrodes and the plurality of differential amplifiers. At block 920, the biopotential chip 250 may process biopotential signals in accordance with the second mode. For instance, the second mode may correspond to second one of obtain biopotential data, obtain training data, obtain ECG data, obtain impedance data, and the like, as discussed herein.

Figure 10B:
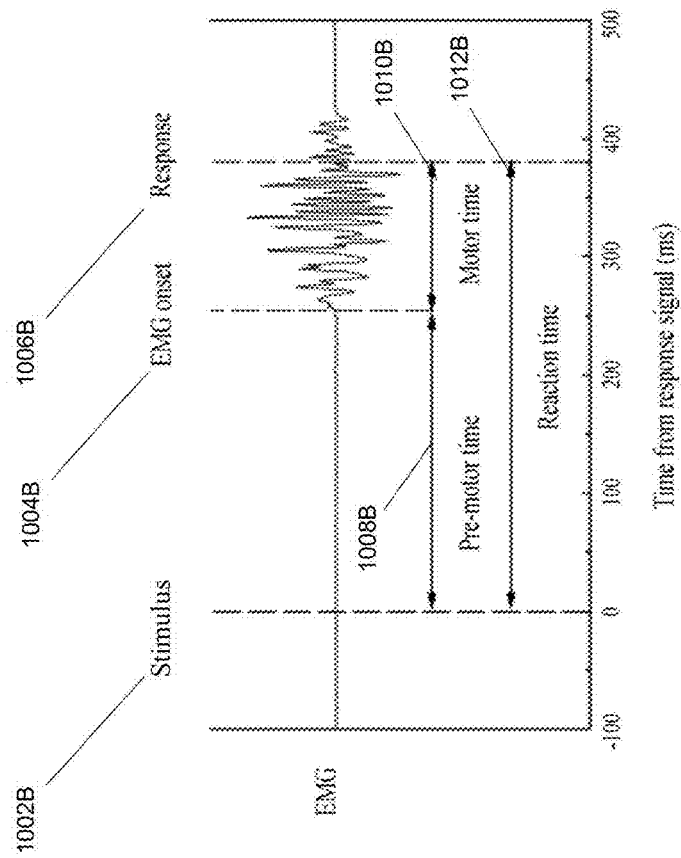
FIGS. 10A and 10B show exemplary graphs illustrating the variability introduced when attempting to measure a reaction time capturing the time it takes for a user to respond to a stimulus.
Figure 10A:
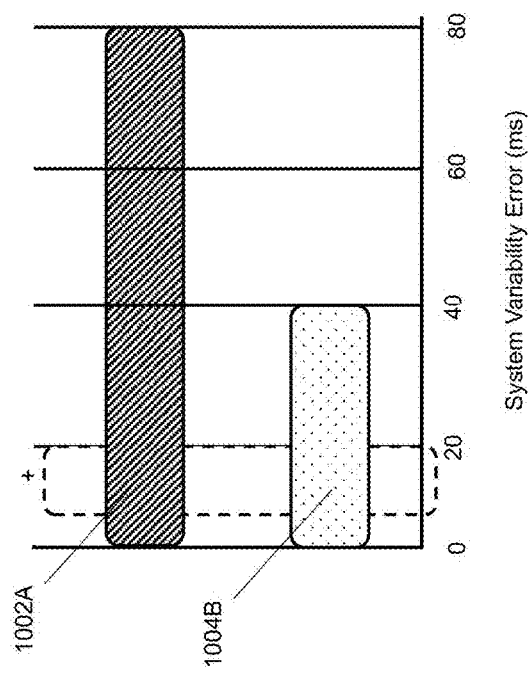

FIGS. 10A and 10B show exemplary graphs illustrating the variability introduced when attempting to measure a reaction time by capturing the time it takes for a user to respond to a stimulus. For context, measuring a user's reaction time, which can be thought of as the time it takes a user to perform a responsive action in response to a stimulus presented to the user, can be helpful in terms of assessing a physiological state of the user. The physiological state may be a psychological state, a physical state, or a combination thereof. For example, a recorded reaction time may be analyzed (e.g., examples of such analysis may be described further with respect to FIG. 13) to determine whether a user is currently experiencing any physiological effects associated with conditions such as a traumatic brain injury, concussion, post-traumatic stress disorder, cognitive performance, dementia, intoxication, neurodegenerative disease, fatigue (e.g., muscle fatigue), attention deficit hyperactivity disorder (ADHD), anxiety, Alzheimer's disease, caffeine intake, sleep deprivation (e.g., drowsiness), circadian rhythm disorders, adrenal gland disorders, neuromuscular disease such as amyotrophic lateral sclerosis (ALS), and/or the like. There are, however, multiple challenges to gathering meaningful insight(s) about the user's current physiological state. One such challenge includes eliminating variabilities in measurement (i.e., the "noise") when performing reaction time tests. Reaction times must be recorded accurately so that the time recorded truly reflects how long it took for a user to perform a responsive action. This may require both the time the stimulus was presented to the user to be accurately recorded (which as described herein may be referred to as the first timestamp) and the time it took for the user to respond to such stimulus to be accurately recorded (which as described herein may be referred to as the second timestamp). Accordingly, in order to improve accuracy, any noise that can cause variability/delays that obscure the recordings and leads to imprecise measurements should be reduced/removed. And in the context of accurately measuring reaction time to make a determination as to a user's physiological state, such noise can be especially problematic due to the small differences (e.g., milliseconds) between a normal reaction time and an impaired reaction time. FIGS. 10A and 10B present some possible sources of such noise and FIGS. 11-15 describe ways in which such noise may be reduced/eliminated.

FIG. 10A shows an exemplary graph 1000A illustrating variability that may be introduced due to system errors when attempting to measure the reaction time using computerized assessments. As will be described later, this variability can be reduced by incorporating software/hardware dedicated to accurately measuring the reaction time.

Sources of noise from computerized assessments may stem from system delays inherent when trying to execute the reaction test using a general processor and an input device. In such a case, the assessments may be subject to the system latency of the testing protocol (e.g., testing software) and input device, which adds noise to the recordings of the reaction time. As an example, the stimulus presented to the user to initiate the reaction test may be a graphical rendering of a prompt to be presented on a display of a user device. In the case of using a general processor to perform the reaction test, instructions/data to be used to generate the stimulus graphics may be placed in a queue along with other tasks that the general processor has scheduled. There may be an unknown delay between when the instructions are queued and when the stimulus is actually presented to the user, resulting in noise and an inaccurate recording of the first timestamp (the "start" timestamp). Continuing with this example, another source of noise when using a general processor to present a visual prompt to the user may stem from the display having to be refreshed according to a refresh rate. For example, a screen of the user device may be configured with a refresh rate (e.g., which may be thought of as the number of times per second that the display device updates the content being displayed) of 60 Hz. In such a case, there may be a delay of up to 16 milliseconds (ms) between when the system registers a time when the stimulus was presented (the first timestamp) and when the screen actually presents the visual stimulus, again introducing noise and inaccuracy in the computerized reaction test.

As mentioned above, other sources of noise may stem from latency caused by the input device, for example, when the user performs the responsive action with the input device. This noise may affect the accuracy of the second timestamp (e.g., the recorded time when the user performs the responsive action in response to the stimulus). For example, as shown in both 1002A and 1002B, the user taking the reaction test may use as input devices a touch screen (shown in 1002A) and a mouse connected via a universal serial bus interface (shown in 1002B), respectively. A normal or expected variability may be anywhere between 5 ms to 20 ms, as marked by the + sign box. When performing a test with a touchscreen, variability can reach 80 ms or more, and when performing the test with a mouse, variability can reach 40 ms or more, both of which are well over an acceptable variability. Possible sources of this noise may, for example, stem from variability in: how the user physically interacts with the input device, how far the finger is from the touchscreen, which finger is used when pressing the touchscreen, how the mouse was held, etc. Another form of variability may include whether the touchscreen is in portrait mode or landscape mode. A source of the noise may include jitter that is introduced when the user attempts to touch the touchscreen. For example, jitter may cause the touch point on the screen to fluctuate even when the user holds his or her finger still. This may cause inaccurate recordings of the second timestamp, i.e., the system may not register the touch as a responsive action due to the fluctuations. Jitter may also be caused by outdated drivers/software, environmental factors such as electrical disturbances/pressure, an unclean screen, etc. Embodiments of the invention reduce or eliminate the latency and variability introduced by the input device by measuring a pre-motor-time (PMT) of a user's response, as will be further described below.

FIG. 10B shows an exemplary graph 1000B illustrating how measuring PMT instead of a physical response can produce a more accurate reaction time calculation. More specifically, measuring PMT may produce a recorded second timestamp (i.e., the time registered by the system indicative of when the user performed the responsive action to the stimulus) with less noise/variability.

The graph in FIG. 10B depicts the behavior of an electromyography (EMG) signal of a user undergoing a reaction time test. As will be described further herein, electroneurography (ENG) techniques/tools, which measures electrical signals at the peripheral nerve, may be implemented instead of EMG techniques, which measures electrical signals produced by the muscles, due to its advantages in terms of reduced noise/delay. As can be seen, a stimulus may be presented to a user taking the reaction time test at step 1002B. In response, the user's motor cortex may generate a nerve signal/impulse (by triggering an action potential in response to the presented stimulus) that may travel to the upper motor neuron and subsequently the lower motor neuron, where such signal may indicate to perform the response action. The signals may reach the nerve and may be detected, for example, by the electrodes described in FIG. 11. The time it takes from presenting the stimulus to detecting the signals at the nerve may be considered PMT, as shown in 1008B. During this time, the EMG signal may remain flat due to no muscle activity being detected (e.g., EMG onset 1004B begins at start of motor time 1010B). As described above, the stop timestamp of the reaction time test was conventionally recorded as the time the user provided a physical response 1000B to the stimulus. In such cases, the calculated reaction time would be the sum of the pre-motor time 1008B and motor time 1010B. However, noise is often introduced during the motor time phase and often causes the stop timestamp to be inaccurate. Such noise may stem from electromechanical delays which are delays when the response signal 1002B hits the target nerve/muscle and when motor activity occurs. This delay is often due to the body having to build up enough motor unit action potentials (MUAPs) to overcome the inertia of the body part being at rest to actually initiate the movement (e.g., biological ballistic loading). Additionally, these delays may vary among a population (e.g., older people tend to experience more of a delay than younger) and may increase as one ages, causing more uncertainty/noise for reaction tests that require motor activity to detect the user response. As will be described further herein, by measuring PMT instead, such delays may be reduced/removed.

Figure 11:
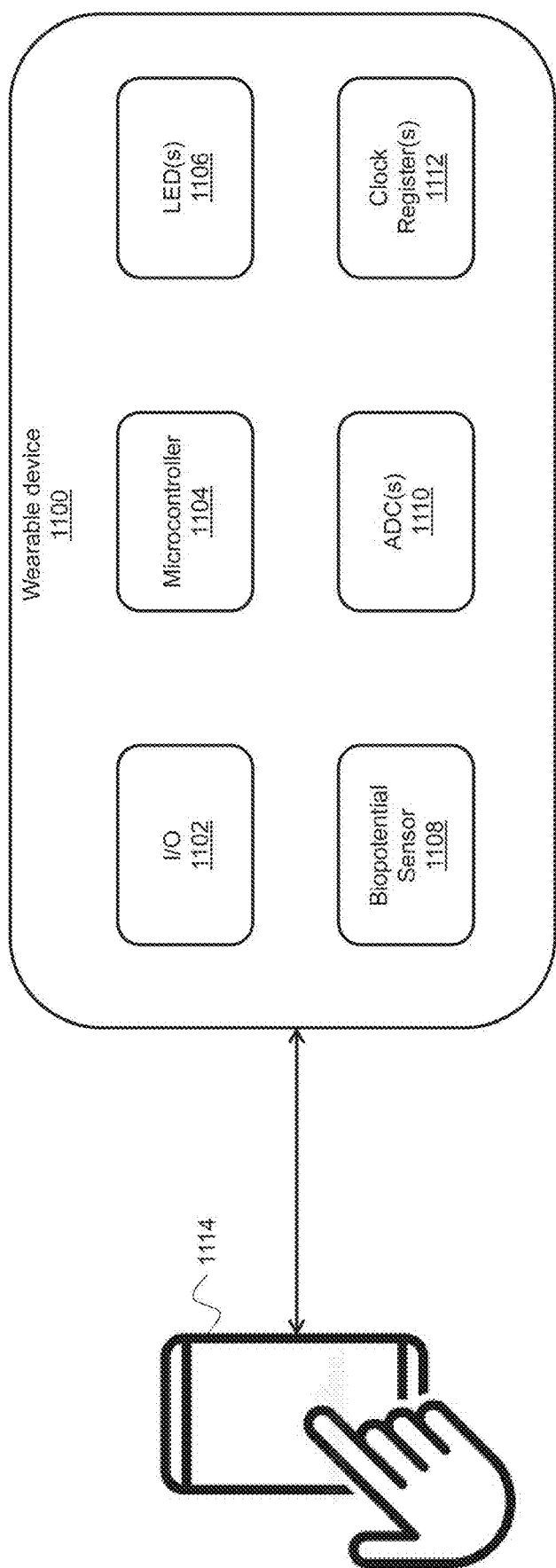
FIG. 11 depicts an overview of a system for assessing a physiological state of a user based on biopotentials detected at an external surface of a skin portion of the user.

FIG. 11 depicts an overview of a system for assessing a physiological state of a user based on biopotentials detected at an external surface of a skin portion of the user. As shown, the system may include a wearable device 1100 that may include input/output (I/O) 1102, a microcontroller 1104, LED(s) 1106, a biopotential sensor 1108, one or more ADC(s) 1110, and one or more clock registers 1112. The system may include a responsive device 1114 communicatively coupled to the wearable device 1100. Each of the foregoing may be described further herein.

A wearable device 1110 may be a smart device configured to be worn around a user's wrist, ankle, or other body part with peripheral nerve tissue coupled to the user's central nervous system. The wearable device 1110 may comprise any of the components described with respect to FIGS. 1-9. For example, the wearable device 1110 may be a gesture control device, a smartwatch, or other wrist or forearm wearable (e.g., a smart sleeve). The wearable device 1110 may be coupled to a biopotential sensor that may obtain nerve signals indicative of a user's responsive action to a stimulus. As described below, data/instructions may be received by and sent to the wearable device 1110 via I/Os 1102.

The I/Os 1102 may provide operations to allow a CPU of the wearable device 1100 to receive and process data/instructions from an external source. This in turn may allow the CPU of the wearable device 1100 to be customized or specialized to perform specific tasks related to the presentation of the stimulus to the user, which may result in processing the biopotential samples at a lower latency. Additionally, noise generated when executing the reaction time test with a general processor (e.g., described with respect to FIG. 10A) may be reduced/removed entirely. The aforementioned advantages may result in more accurate timestamps and accordingly a more accurate reaction time measurement. One reason why the CPU may be specialized is due to the incorporation of the I/Os which may allow the wearable device to import data/instructions from a general processor. For example, instead of having to generate the software instructions needed to trigger the stimuli locally, the CPU may retrieve the instructions from a responsive device 1114, described below, and process the instructions via one or more I/O operations. As an example, the responsive device 1114 may receive a request from a user to start a reaction time test and may generate software instructions to be used by the CPU of the wearable device 1100 to trigger the stimuli. I/O network operations may dictate the protocol to use when wirelessly transmitting the data from the responsive device 1114 to the local wearable device 1100, for example, the communication protocols may include Wi-Fi or Bluetooth connection. Establishing the communication protocol between the responsive device 1114 and the wearable device 1100 may create a reliable link and ensure that the instructions are obtained by the wearable device 1100. When the instructions are received and ready to be processed at the microcontroller 1104, an indication (such as an interrupt signal) may be sent to the CPU to indicate that the data is ready to be translated to machine instructions, which is described below. It should be noted that in some embodiments, generating the software instructions for triggering the stimulus occurs locally at the wearable device 1100. In such a case, the reaction time test may be considered "self-contained" within the wearable device. For example, in such an embodiment, the wearable device may contain a UI that allows user to input a command (e.g., press a presented button graphic) to initiate the reaction time test. The device may include software/firmware to execute the test and analyze the results without having to import any of the software instructions as described above.

A microcontroller 1104 may obtain machine instructions translated based on the software instructions. The machine instructions may be used to activate/control hardware components of the wearable device 1100 designated to present a stimulus to the user. For example, the stimulus for a given wearable device 1100 may be an illumination of an LED disposed on the wearable device 1100. In such a case, a machine instruction may indicate a command to have an electrical current sent through the LED 1106, which then may illuminate and present a stimulus to the user. Without significant delay, a first timestamp may be registered at the clock registers 1112 by a clock/timer module (e.g., a monotonic clock) of the microcontroller 1104 described below. The stimulus delay between when the machine instruction was processed and when the LED 1106 was illuminated may be reduced due to the reduction or removal of the system variability noise described with respect to FIG. 10A. The reduction or removal of the system variability noise may be due to the CPU and microcontroller 1104 being specialized to execute the tasks to present the stimulus. In such a case, these components may be free from having to perform any general processing operations such as refreshing the screen of a user display or managing a queue of general CPU tasks. For example, the stimulus delay may be less than 1 ms, 5 ms, 10 ms, or up to 20 ms.

As mentioned above, LEDs 1106 may be included in the wearable device 1100 and used to present a visual stimulus to the user taking a reaction time test. While LEDs 1106 are used as an example herein, other stimuli may be used either in combination with the LEDs 1106 or as an alternative. Such stimuli may include an audio sound emitted by a speaker attached to the wearable device 1100, a haptic/tactile feedback to the wearable device 1100, and/or the like. In response to the stimulus, the user may perform a responsive action (e.g., raising a finger) that generates nerve signals to be detected by the biopotential sensor 1108 described below.

The biopotential sensor 1108 may be similar or identical to the biopotential sensor described with respect to FIGS. 1-9 and may be configured to obtain raw analog biopotential signals of the peripheral nerve tissue of the body portion where the wearable device is placed. For example, if the user is wearing the wearable device 1100 around his or her wrist as a smart watch, the biopotential sensor 1106 may obtain the biopotential signals of the user's ulnar nerve, radial nerve, and/or median nerve. To obtain such signals, the biopotential sensor 1106 may comprise one or more electrodes configured to be disposed adjacent to an external surface of the skin portion. Additional components/features of the biopotential sensor 1106 and how it functions to obtain the biopotential signals may be described further with respect to FIGS. 1-9. The signals received by the electrodes may be sent to the one or more ADC(s) 1110 described below.

The ADC(s) 1110 may include a plurality of ADCs 1110. The ADCs 1110 may be configured to obtain and the convert the biopotential signals to a series of biopotential data samples and may include identical or similar features to the ADC(s) 1110 described with respect to FIGS. 1-9. Sampling the biopotential signals may involve the ADCs 1110 converting the analog signals, which may be in form of a continuous data stream, into a discrete format, where a sequence of discrete data points are recorded at periodic time intervals. Accordingly, each biopotential data sample may be associated with the time interval when it was generated which the clock/timer module of the microcontroller 1104 (e.g., the same clock/timer module that registered the first timestamp when the machine instruction for the stimulus was generated) may use to assign timestamps to each of the samples. As will be described below, when a sample is determined to have crossed a threshold, the clock/timer module may register the timestamp assigned to the sample as the second timestamp (e.g., the time when the user intends to perform the responsive action in response to the stimulus) to the clock registers 1112. The ADC(s) 1110 may have a sample rate (e.g., the sample rate dictates at what intervals the sample will be recorded) that is optimized to produce a reaction time calculation as accurately as possible. The sample rate may, for example, be set to at least 200 Hz, 300 Hz, 400 Hz, 500 Hz, 1000 Hz, 5,000 Hz, 10,000 Hz, or up to 20,000 Hz.

The clock registers 1112 may be considered specialized registers designed to store and manage clock-related information of the system. Such information may include the first timestamp, as described above, and the second timestamp. The second timestamp may be determined by analyzing the series of biopotential data samples and selecting a set of one or more biopotential data samples that indicate the intention by the user to perform the responsive action. When selected, the timestamp assigned to the given biopotential sample(s) may be obtained and set to the clock register 1112. Determining whether the sample of biopotential data indicates the intention by the user to perform the responsive action may involve comparing a value associated with the sample (e.g., determined based on inspecting and/or modeling the discrete datapoints of the sample to infer a user's central nervous system activity) to a threshold that is set to a level known to be associated with peripheral nerve activity indicative of a response. Using these techniques, embodiments of the system measure PMT when recording the time for a user to respond to a stimulus during a reaction time test and, as was described in FIG. 10B, embodiments may remove any electromechanical noise from the calculations. Accordingly, some embodiments may measure, with an accuracy to within 5 milliseconds, a pre-motor time indicating a time between presentation of the stimulus and peripheral nerve activity responsive to the stimulus. In some embodiments, the accuracy may be within 1 ms. In some embodiments, detecting the onset of peripheral nerve activity can be based on one or more different techniques. For example, a kurtosis wavelength model can be used to generate and analyze a kurtosis value associated with the biopotential data to detect the onset of peripheral nerve activity. Such a model may be configured to output a positive detection when a kurtosis value generated from the biopotential data indicates a Gaussian, or Gaussian-like, distribution. Other techniques may include setting power-based and/or frequency-based thresholds, fusing sensor data generated from IMU sensor(s), and/or setting multichannel power thresholds. In some embodiments, the timestamps, along with relevant contextual information, may be sent to the responsive device 1114 for further processing.

The responsive device 1114 may be a user device configured to run a software application coupled to the system. As described above, the device 1114 may comprise a user interface with which a user may indicate a request (e.g., by touching a button graphic) to start a reaction time test. Upon such indication, the device 1114 may generate and send to the wearable device 1100 software instructions that, when translated to machine instructions, command a given hardware component to output a stimulus. In some embodiments, the system may be configured to transmit (e.g., wirelessly from the wearable device 1100) to the responsive device 1114, the subject response time, and/or one or both of the first timestamp and the second timestamp. In such a case, the software application may be configured to generate an assessment as to whether the received timestamps associated with the reaction test indicate a change in the user's physiological ability (e.g., when compared to a baseline). In some embodiments, the reaction time-based assessments can be initiated on-demand, on a schedule, or randomly. In such cases, a notification can be sent to the user via the software application. For example, the notification may be a prompt graphic presented on a display on the responsive device, a sound alert emitted from the responsive device, and/or haptic feedback such as a vibration of the responsive device. In some embodiments, the user may initiate an assessment by pressing a button on the responsive device. The details of such assessment/analysis are described further with respect to FIGS. 12A-B.

Figure 12B:
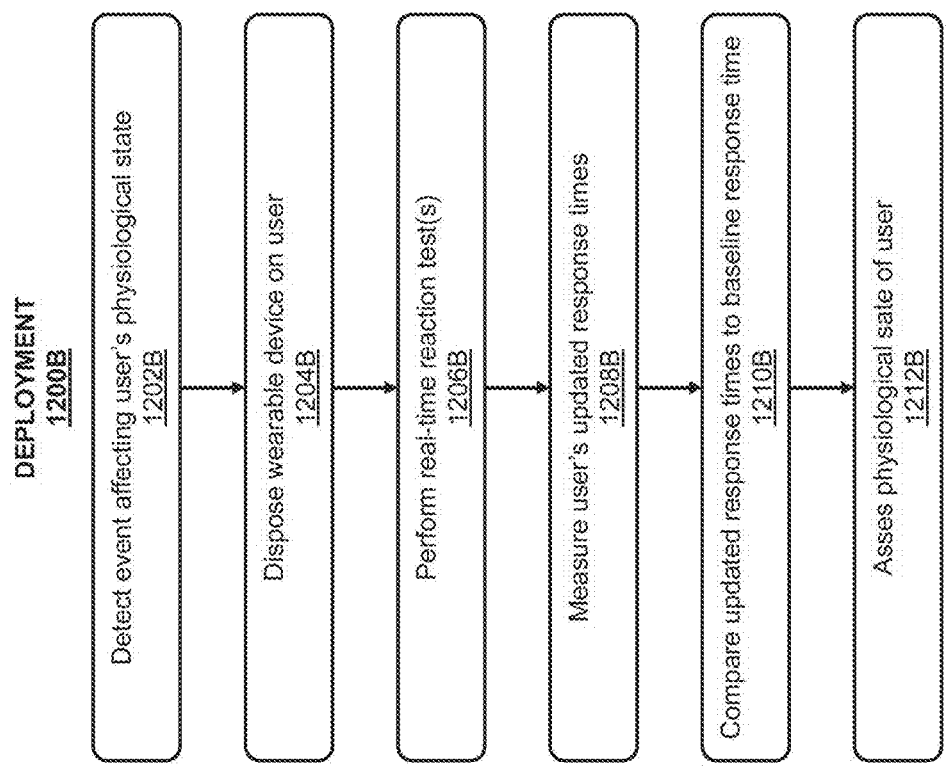
FIGS. 12A and B show exemplary flow diagrams of assessing a physiological state of a user of the wearable device using response time recorded during performed reaction tests.
Figure 12A:
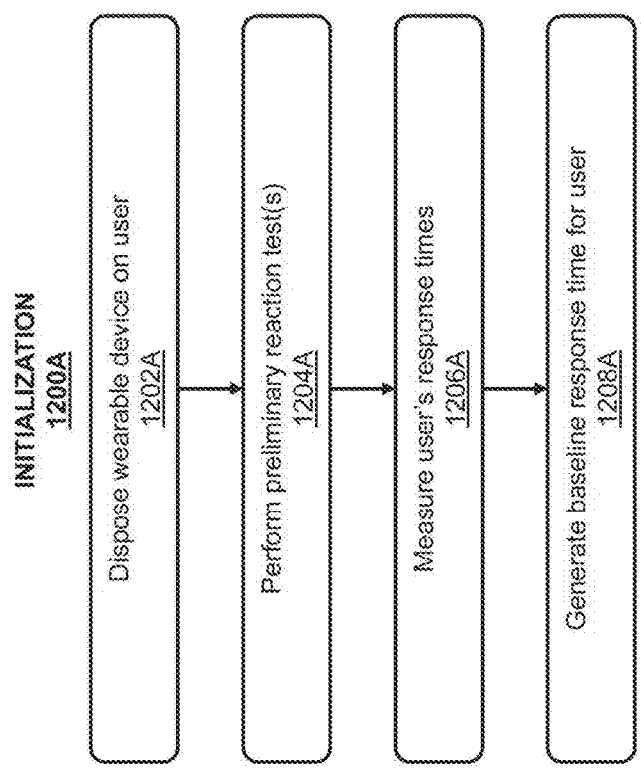

FIGS. 12A and B show exemplary flow diagrams of assessing a physiological state of a user of the wearable device using response time recorded during performed reaction tests.

FIG. 12A shows an exemplary flow diagram for initialization 1200A of the system to generate a baseline response time for an individual user of the wearable device. In some embodiments, the user may decide to pursue an activity where he or she is at risk of experiencing an event (described further in FIG. 12B) that can impact the user's physiological state. For example, the user may decide to play football where the risk of being tackled and suffering a concussion is high. By comparing the user's baseline response time collected during a preliminary reaction time test (e.g., which represents how quickly the user responds while in a normal physiological state) to an updated response time collected during a reaction time test that takes place after the event, such as the tackle, has occurred, a reliable assessment as to whether the user is in an impaired physiological state can be made. In the case of the concussion example mentioned above, a baseline response time may be calculated at 180 ms. When concussed though, the updated response time may be 20 to 30 ms higher and as the user recovers, the updated response time may return to the 180 ms baseline. By tracking and comparing the updated response times to the baseline response time, a user may be able to determine when he or she is no longer concussed. As discussed above, conventional reaction time tests that do not account for noise (see, e.g., FIGS. 10A-B) may include 80 ms or more of variability that dwarfs a considerable change in a user's physiological abilities. The system described above may eliminate such noise and improve the effectiveness of the reaction time test at assessing physiological states.

At 1202A, the wearable device may be disposed on the user. The wearable device may be identical or at least comprise similar functionality to the wearable device described with respect to FIGS. 1-9. For example, the wearable device may be worn by the user such that one or more electrodes of the device are disposed adjacent to an external surface of the skin of a body part that includes peripheral nerve tissue, and the electrodes are configured to obtain biopotential signals of peripheral nerve tissue. At 1204B, one or more preliminary reaction test(s) may be performed by the user at a time when the user is determined to be in a baseline physiological state. In some embodiments, multiple preliminary reaction test(s) may be performed at different times of a day. For example, the baseline response times may be determined based on subject measurements previously collected for the user at two or more times of day separated by at least 3 hours. Performing the test at spaced out intervals may result in a more accurate baseline response time by considering how much the individual user's response varies depending on the time of day. In some embodiments, the baseline may be updated over a longer stretch of time. For example, instead of having the user do tests spaced 3 hours apart, a user may be ordered to take tests a week or a month apart during a certain time of day (which may be the same time of day as the initial test taken by the user a week or a month earlier). In such a case, as the user completes more reaction time tests, a model of the user's circadian rhythm may be dynamically built/visualized over time. At 1206A, the user's response time during the preliminary reaction tests may be recorded using the techniques described with respect to FIG. 11. At 1208A, the baseline response time may be generated. Generating the baseline response time may involve performing a mathematical operation, such as averaging or aggregating multiple samples of response time in the case where the user performed a series of preliminary tests. In the example where the preliminary tests are spaced out throughout the day, the generated baseline response time may comprise each of the response time values. The multiple response time values of the baseline response time may indicate response times that are representative of a pre-motor time of the user that is typical for the user at respective times of day. In some embodiments, instead of recording the individual user's unique response time to generate the baseline, a population average may be used as the baseline response time. However, there may be an advantage in using the user's unique response time due to the variability in response times among a population (e.g., if this individual user happens to respond 20 milliseconds faster than the general population, then false negatives or other erroneous detections may occur when using the population average).

FIG. 12B shows an exemplary flow diagram for deployment 1200B of the system to compare the updated response to the baseline response time generated for a user of the wearable device. At 1202B, an event that may impact a user's physiological state, such as the football tackle mentioned in FIG. 12A, may be detected. Other examples of events may be a car accident (e.g., for which the reaction time test may be used to test for a traumatic brain injury or for alcohol intoxication), a seizure (e.g., for which the reaction test may be used to test for a neurodegenerative disorder), an uptick in involuntary tremors (e.g., for which the reaction time test may be used to test for Parkinson's disease), and/or the like. In some embodiments, a user may request to take a real-time reaction test without the occurrence of a particular event. For example, the user may indicate the request via the software application described with respect to FIG. 11, whereupon the application may begin generating the software instructions used to trigger the stimuli.

At 1204B, in order to begin the reaction time test, the wearable device may be disposed on the user in a manner similar to what was described in step 1202A. It should be noted that in some cases this user may have already taken the preliminary reaction tests and have had a baseline response generated based on his or her recorded response times. At 1206B, the user wearing the wearable device may perform one or more real-time reaction tests. In some embodiments, the stimulus used for the real-time reaction test may be identical to the stimulus used during the preliminary reaction test in order to eliminate any variability in response times that may result when using different stimuli. For example, a user's response time may on average be faster for a haptic/tactile feedback stimulus than a visual stimulus, or vice-versa. At 1208, the user's updated response times may be recorded (e.g., using the techniques described with respect to FIG. 11) based on his or her performance during the real-time reaction test. In the case of using the responsive device described with respect to FIG. 11, a software application may be configured to receive multiple updated subject measurements for the user. Each of the updated subject measurements may comprise a respective response time that indicates, with an accuracy to within at least 5 milliseconds, a respective pre-motor time between presentation of a stimulus and peripheral nerve activity responsive to the stimulus. Additionally, the software application may be configured to send the updated subject measurements for the user to local or remote storage. At 1210B, the updated response times (e.g., also referred to as the updated subject measurements) may be compared to the baseline response time generated for the user during the initialization phase. In some embodiments, the updated subject response time for the user, or one or more values based thereon, may be compared to at least a baseline response time for the user. The comparison, along with any additional analysis such as regression, clustering, modeling, normalization, etc., may be performed by the software application of the responsive device described above. In some embodiments, an aggregate measure, which has been determined based on multiple of the plurality of subject measurements for the user, may be compared to the baseline response time for the user. In some embodiments, a delta between the second timestamp and the first timestamp recorded during the real-time test may be compared to a delta between the second timestamp and the first timestamp recorded during the preliminary reaction test and if such comparison reveals that the two deltas exceed a threshold, it may be determined that the user has experienced a change in physiological ability. At 1212B, based on the comparison (e.g., or any additional analysis performed based on the generated baseline response and the update response time), an assessment as to the current physiological state of the user may be made.

In some embodiments, the techniques to improve the performance of the simple reaction time test (which measures the PMT based on the user's response to a single stimulus) described above may be used for other reaction time tests, which may be used in combination with the simple reaction time or as alternatives. An example of another reaction time that may incorporate one or more of the techniques described herein to improve accuracy of results (e.g., along with other performance metrics such as decreased latency, less power consumption, etc.) may be a psychomotor vigilance test (PVT). Such a test may be particularly helpful when assessing cognitive issues dealing with attention/alertness disorders (e.g., attention-deficit/hyperactivity disorder symptoms). Rather than presenting a stimulus at a single moment of time, during a PVT users may be required to perform responsive actions to a series of stimuli randomly presented over a span of time, for example, for around 3, 5, 10, or 15 minutes. In some embodiments, a stimulus may be a visual prompt and whenever the user is presented such a prompt over the course of the test, he or she must perform a responsive action, such as extending the hand, clenching a first, or lifting a finger. If the user fails to perform the responsive action when presented a prompt or if the user performs the responsive action when no prompt has been presented, a mistake or error may be recorded for the user. At the conclusion of the test, a score may be generated based on an analysis of the number of errors along with other factors such as age of the user, duration of the test, etc. The resulting score may be associated with the user account, stored, and analyzed to generate insights relating to one or more physiological states of the user.

Another reaction test that may incorporate one or more of the techniques to improve results may be a "Stop Signal Reaction Test" (SSRT), which may be a test that not only measures how quickly a user responds to stimuli, but also how quickly a user ceases his or her response when such stimuli are changed or terminated. For example, a wearable device may be configured to present two or more stimuli, where a first stimulus indicates that the user should initiate a responsive action and a second stimulus, which may be presented a short time (e.g., 20, 30, 40, 50, 60, 70, or 80 milliseconds, which value can optionally be selected by a user) after the first stimulus, indicates that the user should cease the responsive action. A user may be presented a "Start" stimulus (an example may be a green LED symbolizing a "start" trigger) during which he or she must perform a responsive action such as a gesture like extending a finger. The "Start" stimulus may be continuously displayed throughout a first interval, during which the user will maintain performing the responsive action. Then, a "Stop" stimulus may be presented (an example may be a red LED representing a "stop" trigger) and, as quickly as possible, the user must cease the responsive action. The second stimulus can optionally be presented only a percentage of the time following the first stimulus. For example, the "Start" stimulus may be presented alone a percentage of the time (10%, 20%, 30%, 40%, 50%, 60%, 70%, 80%, or 90%, which value can optionally be selected by a user), and the "Stop" stimulus can rapidly follow in the other cases. For example, in the case where the responsive action is a hand opening, upon receiving the first stimulus, the user may begin opening their hand, and upon receiving the second stimulus, the user may, as quickly as possible, cease the hand opening response. The sequence of events may be repeated intermittently over a length of time. Both response times (how long it took the user to respond to the "Start" stimulus and how long it took the user to respond to the "Stop" stimulus) may be stored and associated with the user account, and the results may be analyzed to generate insights relating to one or more physiological conditions of the user. In some embodiments, the system may generate a score for the user's performance, which may be based one or both of the user's response time to the "Start" signal and their response time to the "Stop" signal. In some embodiments, the score can be generated based on a series of SSRT response time measurements. The disclosures herein regarding storing user response times, generating baselines, comparing results to baselines, and other analyses can be performed using any or all of reaction times, PVT scores, SSRT, and/or Go/No-Go response times (e.g., will be described below) and/or scores.

Another reaction test that may incorporate one or more of the techniques may be a "Go/No-Go" reaction time test. During the test, a user may be presented at different time periods either a "Go" stimulus or a "No-Go" stimulus. If presented the former, a user may be required to perform a responsive action, such as making a gesture. If presented the latter, a user may be required to refrain from performing the responsive action. For example, a wearable device may be configured to illuminate a blue LED, at a first time interval, to indicate the "Go" stimulus to the user and to illuminate an orange LED, at a second time interval, to indicate the "No-Go" stimulus to the user. Each combination of stimulus presentation and user response may be considered an independent trial and throughout the entirety of an individual "Go/No-Go" test, a total of up to 10, 20, 30, 40, etc. trials may be executed. For context, a test with 30 trials may last around 60 seconds. The ratio between the number of "Go" trials and the number of "No-Go" trials for a given test may be set to a value optionally selected by a user. For example, the test may consist of 66% "Go" trials which require the user to perform the responsive action and 33% "No-Go" trials which require the user to refrain from performing the responsive actin.

In some embodiments, additional testing parameters may be set/adjusted per test in order to diversify the trials. Examples of testing parameters may include inter stimulus interval (ISI), trial order, stimulus characteristics, and/or any other parameter that can manipulate how the trial proceeds.

For example, ISI may be the time period from the end of a first trial to the onset of a second trial during which no stimulus is presented and the user remains idle. The ISI parameter may be set to a value (e.g., ranging from 500 ms to 2000 ms) that may be randomized throughout the test. For example, the ISI between the end of a first trial and the onset of a second trial may be 500 ms while the ISI between the end of a third trial and the onset of a fourth trial may be 2000 ms. Scoring the "Go/No-Go" test may involve performing a combination of mathematical operations on the response times of the trials, the number of incorrect trials, the values of the testing parameters, and/or any other information related to the test. An example of a scoring protocol may be calculating an inverse efficiency score (IES) for a given test. An IES may be calculated for a given test by first determining a value associated with a mean response time (which may be a mean of the measured PMT response times recorded using the techniques described above) and dividing such value by the number of correct trials. The number of correct trials can be calculated by subtracting proportion of incorrect trials from 1. An incorrect trial may be any trial where a user either fails to perform a response action in response to a "Go" stimulus within a detection window (e.g., for a time interval of 750 ms a blue LED will be presented as a stimulus to the user), erroneously performs a response action (in other words, fails to refrain from performing a response action) in response to a "No-Go" stimulus within a detection window (e.g., for a time interval of 750 ms an orange LED will be presented as a stimulus to the user), or any response action detected outside of a detection window (which will cause the next trial to be marked as incorrect). In some embodiments, the IES may be normalized to fit within a standard/universal scale so that it can be more easily interpreted when assessing a physiological state.

Another scoring technique that may provide insights into a user's decision-making process may involve comparing a user's mean PMT measured based on a series of simple reaction time (referred to as mean SRT PMT herein) tests, which is described in detail above, with the user's mean PMT measured during a "Go/No-Go" test (referred to as mean GNG PMT herein). As an example, a user may take a series of simple reaction time tests, for which respective PMTs may be recorded. An mean of these PMTs may be calculated to a value of 150 ms, which may be recorded as the user's mean SRT PMT. Subsequently, the same user may take a "Go/No-Go" test. The result of the test may reveal that the user had a mean GNG PMT at a value of 180 ms. By subtracting the mean SRT PMT from the mean GNG PMT, a difference of a value of 30 ms may be calculated. This value may account for additional latency that the user experienced when deciding whether to respond or refrain during the Go/No-Go test. Moreover, this value may be isolated and analyzed to make an inference about the user's decision-making ability. In some embodiments, the mean SRT PMT may be compared to the results of the other reactions tests mentioned above to provide meaningful insights into the user's physiological state (e.g., comparing it with the results of the PVT may infer the user's impulse control).

Figure 13:
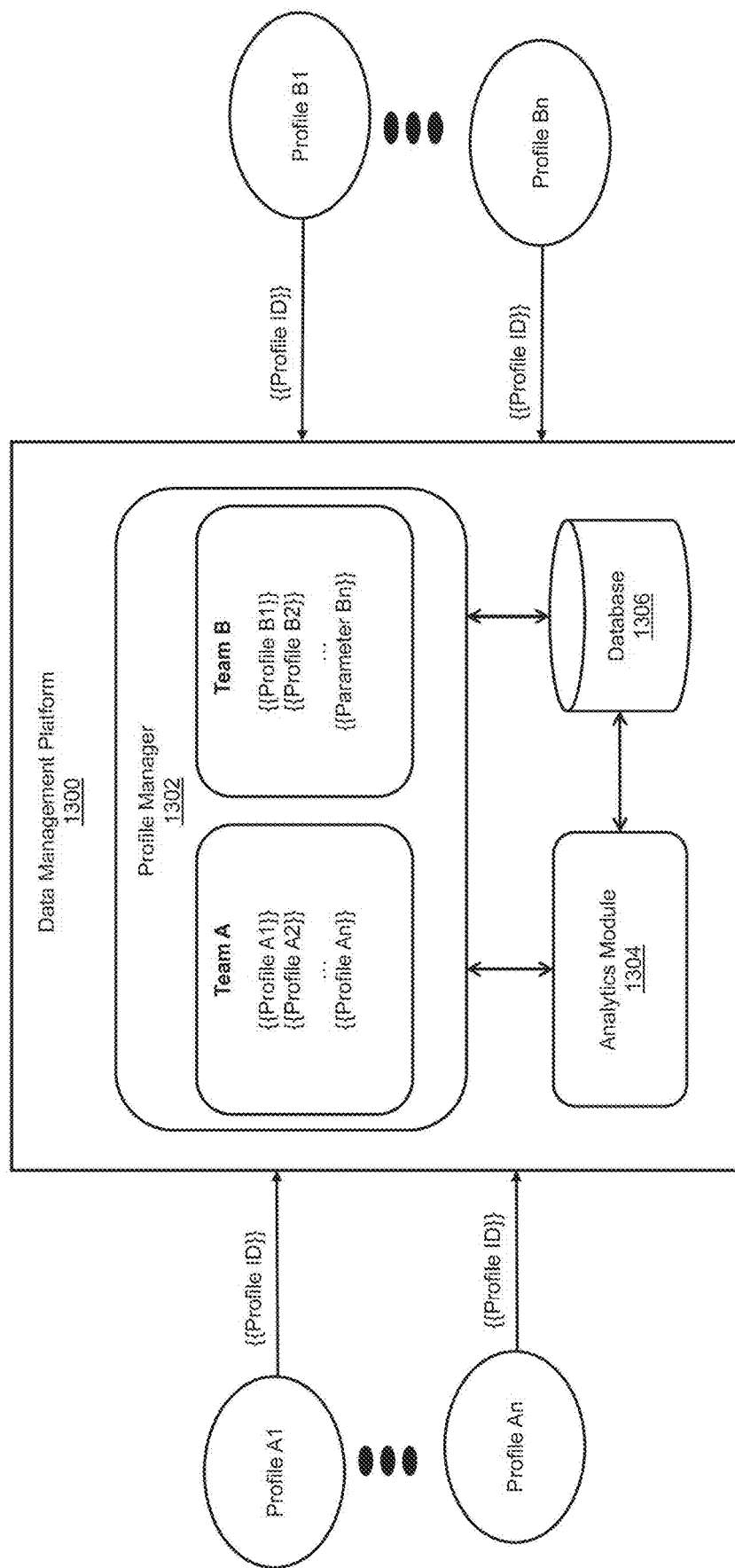
FIG. 13 shows an exemplary architecture of the system configured to be shared across multiple subjects to collect and manage information related to reaction time tests for each of the subjects.

FIG. 13 shows an exemplary architecture of the system configured to be shared across multiple subjects to collect and manage information related to reaction time tests for each of the subjects. As shown, the system may include a data management platform 1300, a profile manager 1302, an analytics module 1304, and/or a database 1306, each of which is described herein.

The data management platform 1300 may be configured to receive information indicative of user profiles (profiles A1 through An and B1 through Bn) from a multitude of registered users. In some embodiments, the data management platform 1300 may be communicatively coupled to the software application installed in one or more responsive devices described above. In some embodiments, an organization, such as a team, may register profiles for each of its members to the platform 1300. In response, the platform 1330 may generate/send logic credentials for each of the profiles.

When a user of the registered profile enters the login credentials, any data, such as the baseline response time or update response times described with respect to FIGS. 11 and 12, may be tagged with the profile ID or other identifier to associate that data with the corresponding profile. The profile manager 1302 may send the data along with information indicative of the entry of the profile ID to the database 1306.

The database 1306 may store information indicative of the baseline response times and updated response times for each user with a profile ID. The profile manager 1302 may receive new data, for example, from the responsive device that indicate that a user with a registered profile ID performed a reaction time test using the wearable device. Accordingly, the profile manager 1302 may send an instruction for the database 1306 to send an existing baseline reaction test associated with the profile ID to the analytics module 1304 while the profile manager 1302 sends the updated response times.

The analytics module 1304 may be designated to perform the comparison between a baseline reaction test associated with the profile ID with the updated response times of the profile ID. The techniques used for the comparison/analysis may be described further with respect to FIG. 12B. In some embodiments, the analytics module 1304 may generate recommendations to be sent, for example, to the responsive device based on identifying that the user of the profile ID has experienced a change in physiological state.

As an example to demonstrate how the platform allows multiple users to share the wearable device in order to perform individual reaction time tests, the software application may receive a human instruction to perform a response time measurement for a first user. In response, the application may generate software instructions to present the stimulus to the user to be wirelessly transmitted to the wearable device, as described with respect to FIG. 11. The responsive device may receive, from the wearable device, user measurement data and send such data along with the profile ID to the data management platform 1300. Such data may include a premotor time and/or one or more user timestamps linked to the profile ID of the first user (e.g., the user measurement data may be associated with a user account for the first user and may be stored at an entry of the first user on the database 1306). The application may receive a request to log out of a first account associated with the user and subsequent request to log into a second account associated with a second user. The application may receive a second human instruction to perform a response time measurement for the second user and may cause a software instruction to present the stimulus to the second user to be wirelessly transmitted to the wearable device. The responsive device may receive, from the wearable device, second user measurement data, which may comprise a second user premotor time and/or one or more user subject timestamps. Like it did for the first user, the responsive device may send the data along with the profile ID of the second user to the data management platform 1300. The user measurement data may be associated with a user account for the second user and may be stored as an entry of the second user in the database 1306.

Figure 14:
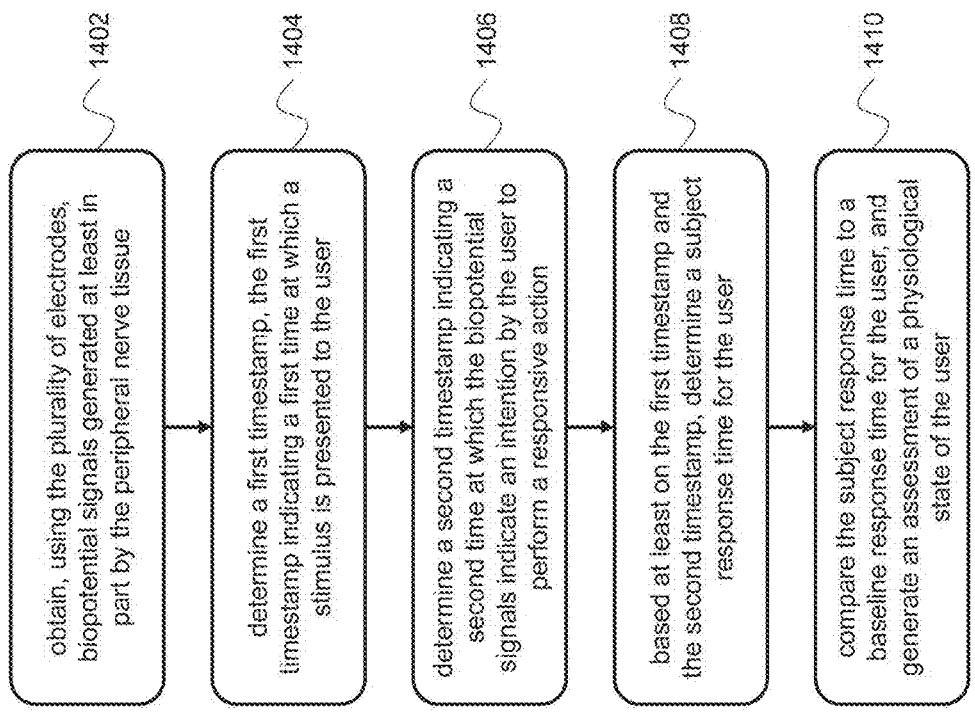
FIG. 14 shows an exemplary method for assessing a physiological state of a user based at on biopotentials detected at an external surface of a skin portion of the user.

FIG. 14 shows an exemplary method 1400 for assessing a physiological state of a user based at on biopotentials detected at an external surface of a skin portion of the user. A wearable device may be configured to be worn by the user. The wearable device may include one or more electrodes configured to be disposed adjacent to an external surface of the skin portion. The skin portion may be disposed at a body portion comprising peripheral nerve tissue that is biologically coupled to a central nervous system of the user. At 1402, biopotential signals generated at least in part by the peripheral nerve tissue may be obtained using the plurality of electrodes. At 1404, a first timestamp may be determined. The first timestamp may indicate a first time at which a stimulus is presented to the user. In some embodiments, the stimulus may be presented to the user by illuminating an LED. In such a case, a stimulus delay between a machine instruction to illuminate the LED and the illumination of the LED is less than 10 a microsecond. In some embodiments, the first timestamp may be determined by registering a time, on a monotonic clock, that the machine instruction to illuminate the LED is generated, received by a microcontroller, and/or passed to the LED. In such a case, the biopotential signals received by the one or more electrodes may be converted to a series of biopotential data samples, and each sample of biopotential data may have a respective timestamp determined by the same monotonic clock used to generate the first timestamp. At 1406, a second timestamp may be determined. The second timestamp may indicate a second time at which the biopotential signals indicate an intention by the user to perform a responsive action in response to the stimulus. In some embodiments, the second timestamp may be determined by analyzing the series of biopotential data samples, selecting a set of one or more biopotential data samples, from the series of biopotential data samples, that indicate the intention by the user to perform the responsive action, and determining the second timestamp based on one or more timestamps of the selected set of one or more biopotential samples that indicate the intention by the user to perform the responsive action. At 1408, based at least on the first timestamp and the second timestamp, a subject response time for the user may be determined. In some embodiments, the determined subject response time may measure, with an accuracy to within 5 milliseconds, a pre-motor time indicating a time between presentation of the stimulus and peripheral nerve activity responsive to the stimulus. At 1410, the subject response time for the user, or a one or more values based thereon, may be compared to at least a baseline response time for the user, and, based on this comparison, an assessment of a physiological state of the user may be generated. In some embodiments, the assessment of the physiological state of the user may relate to whether the user is one or more of concussed, intoxicated, has a neurodegenerative disease, or mentally fatigued. In some embodiments, a software application may wirelessly transmit from a wearable device to a responsive device one or more of the assessment of the physiological state of the user, the subject response time, or one or both of the first timestamp and the second timestamp. The software application may be configured to receive a plurality of subject measurements for the user, each subject measurement comprising a respective response time that indicates, with an accuracy to within 5 milliseconds, a respective pre-motor time between presentation of a respective stimulus and respective peripheral nerve activity responsive to the respective stimulus. The software application may compare the subject response time for the user, or one or more values based thereon, to at least a baseline response time for the user that was previously determined by the software application. In such a case, the comparison may be performed by the software application comparing an aggregate measure, determined based on multiple of the plurality of subject measurements for the user, to the baseline response time for the user. In some embodiments, the method described above may include one or more of the following: receiving a human instruction to perform a response time measurement for the user; causing a software instruction to present the stimulus to the user to be wirelessly transmitted to a wearable device; receiving, from the wearable device, user measurement data, the user measurement data comprising a user premotor time and/or one or more user timestamps; and associating the user measurement data with a user account for the user and store the user measurement data.

Figure 15:
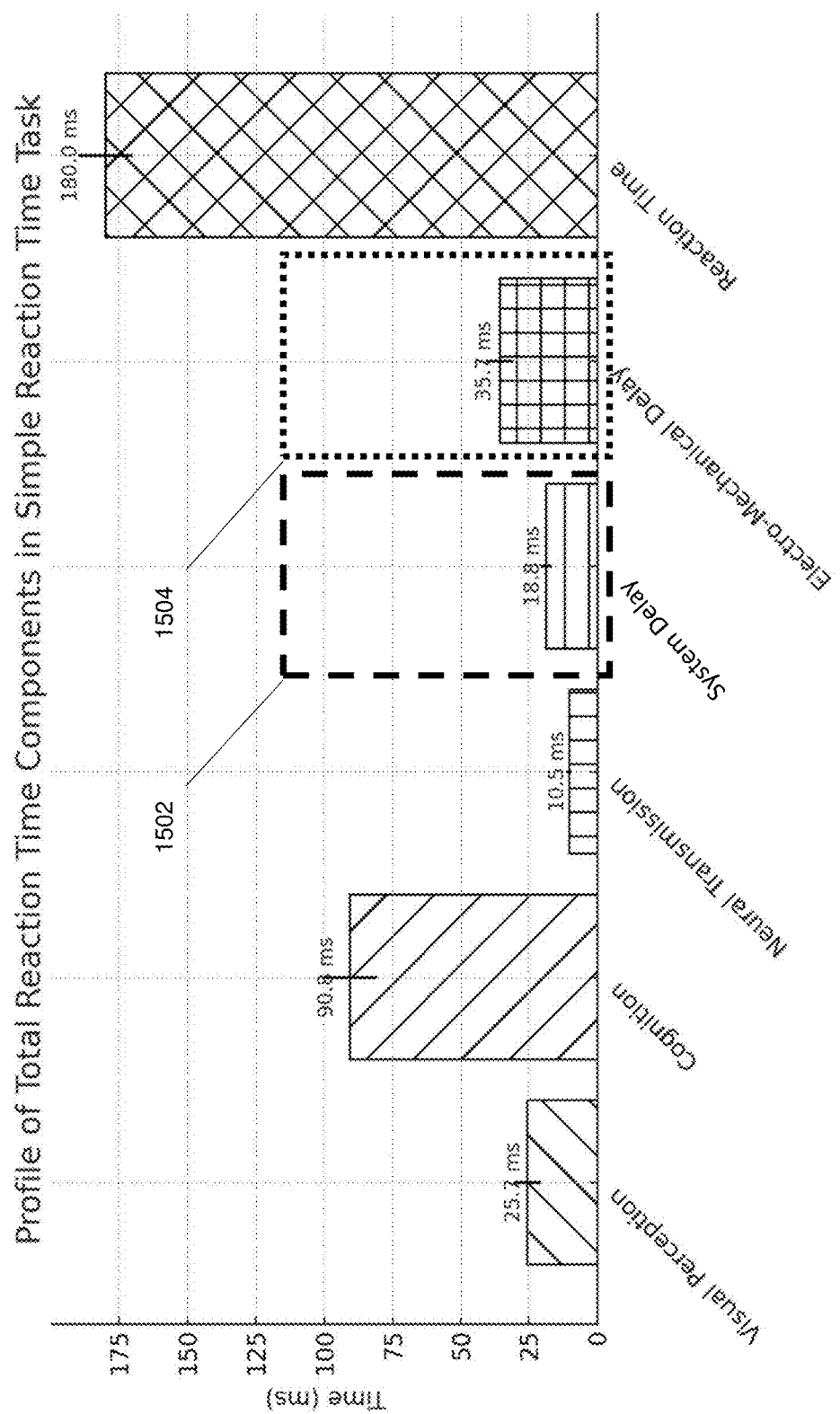
FIG. 15 depicts an example diagram demonstrating the different reaction time components involved when a user performs a simple reaction time test task.

FIG. 15 depicts an example diagram 1500 demonstrating the different reaction time components involved when a user performs a simple reaction time test task. It should be noted that the use of a simple reaction time test task is for exemplary purposes and that the labeled components may additionally impact the other reaction time test(s) (e.g., Go/No-Go, SSRT, PVT, etc.) mentioned herein. The reaction time test task may be executed as a user is engaged in an interactive digital program (examples of which are provided below). For example, respective measurements of start and stop timestamps may be generated based on how quickly a user performs a responsive action in response to a stimulus condition (such as a graphical display) presented during the interactive digital program. As will be described herein, such measurements along with supplemental information (which may be indicative of a context of the interactive digital program, a position/state of a user at a given moment during the interactive digital program, etc.) can be used to provide insights into a user's overall reaction performance.

As shown in FIG. 15, a user's responsive action involves the user performing at least one task. Additionally, the individual times it takes for the user to execute each component of the task is summed, thereby resulting in a reaction time. For example, visual perception, or in other words how long it takes for the user to relocate his or her field of view (FOV) to obtain/send visual information/signals of the presented stimulus condition, may take roughly 25.7 ms. Cognition (how long it takes for the brain to process said visual information and generate a neural response) may take 90.8 ms, while neural transmission (sending signals of the neural response along neural pathways to one or more muscles that will be used by user to perform the responsive action) tends to take around 10.5 ms.

Traditionally, accurately measuring each of these components (and thus accurately measuring total reaction time) was negatively impacted by noise and other delays that skewed the "true" start and stop times recorded for a user's responsive action to a stimulus condition. These delays and their impact on accurate measurements are discussed in FIGS. 10A and 10B. One source of delay is electro-mechanical delay 1504 as shown in FIG. 15, which can be summarized as the time it takes between the neural signal (generated in response to a stimulus condition) hitting a target muscle and physical motor activity, which is due to the need for the motor division of the nervous system to build-up enough motor units to overcome the inertia that comes from the target muscle being at rest. As discussed in FIGS. 10A and 10B, this time is usually irrelevant when measuring reaction time since reaction time focuses on capturing how fast the user's central nervous system generates and transmits neural signals to nerve tissue in response to a stimulus condition. In terms of how this affects the results of a reaction time test, electro-mechanical delays 1504 often distort the accuracy of the recorded stop time(s) (as shown in FIG. 15, these delays add around 35.7 ms to the recorded reaction time). Accordingly, the system described herein is configured to eliminate such electro-mechanical delays 1504 by measuring PMT (instead of relying on sensors that track physical movement), details of which are provided above.

Another source of noise comes from system delay(s) 1502, often caused by the time it takes between when a general CPU sends an instruction to present a stimulus condition and the actual display of the stimulus condition to the user. Like the electro-mechanical delays, a description of various system delays 1502 and their negative impacts when measuring reaction time is provided in FIGS. 10A and 10B. This mismatch between when the logic of the general CPU believes the stimulus condition has been presented to the user and the actual display often skews the start time recorded during the reaction time test (as shown in FIG. 15, system delays 1502 add around 18.8 ms to the recorded reaction time). Accordingly, the system described herein is designed with dedicated hardware and software that eliminates, or at least reduces, system delays 1502 commonly found in general processor implementation. For example, the system may be equipped with a specialized priorization feature that allows the CPU(s) to control the scheduling of tasks. In some embodiments, the system may include one or more sensors and/or cameras that monitor and analyze where a user who is engaged in an interactive digital program is looking (e.g., "gaze-tracking"). Information generated from the sensors/cameras may be obtained by the system to accurately record when the user spotted the stimulus condition (the recorded start time for the reaction time test). Other advantages of using the specialized CPU(s) are provided in FIGS. 10A and 10B.

As will be described below, the techniques to eliminate noise mentioned above may be implemented during the course of an interactive digital program, where a user interacts with generated digital content such as a displayed graphic (which can be considered the presented stimulus condition). These interactions may be in turn be used to measure start and stop times of one or more of the reaction time tests described herein (along with additional performance metric testing) and an assessment of the user's overall reaction performance may be determined/analyzed. Examples of interactive digital programs include interactive fitness apps, virtual reality (VR) and/or augmented related (AR) experiences, social media platforms with interactive features, video games such as mobile and online games, e-learning platforms, and/or other applications that implement interactive digital technology. The integration of the system, including the wearable device, with the host CPUs executing the interactive digital program is described below.

Figure 16:
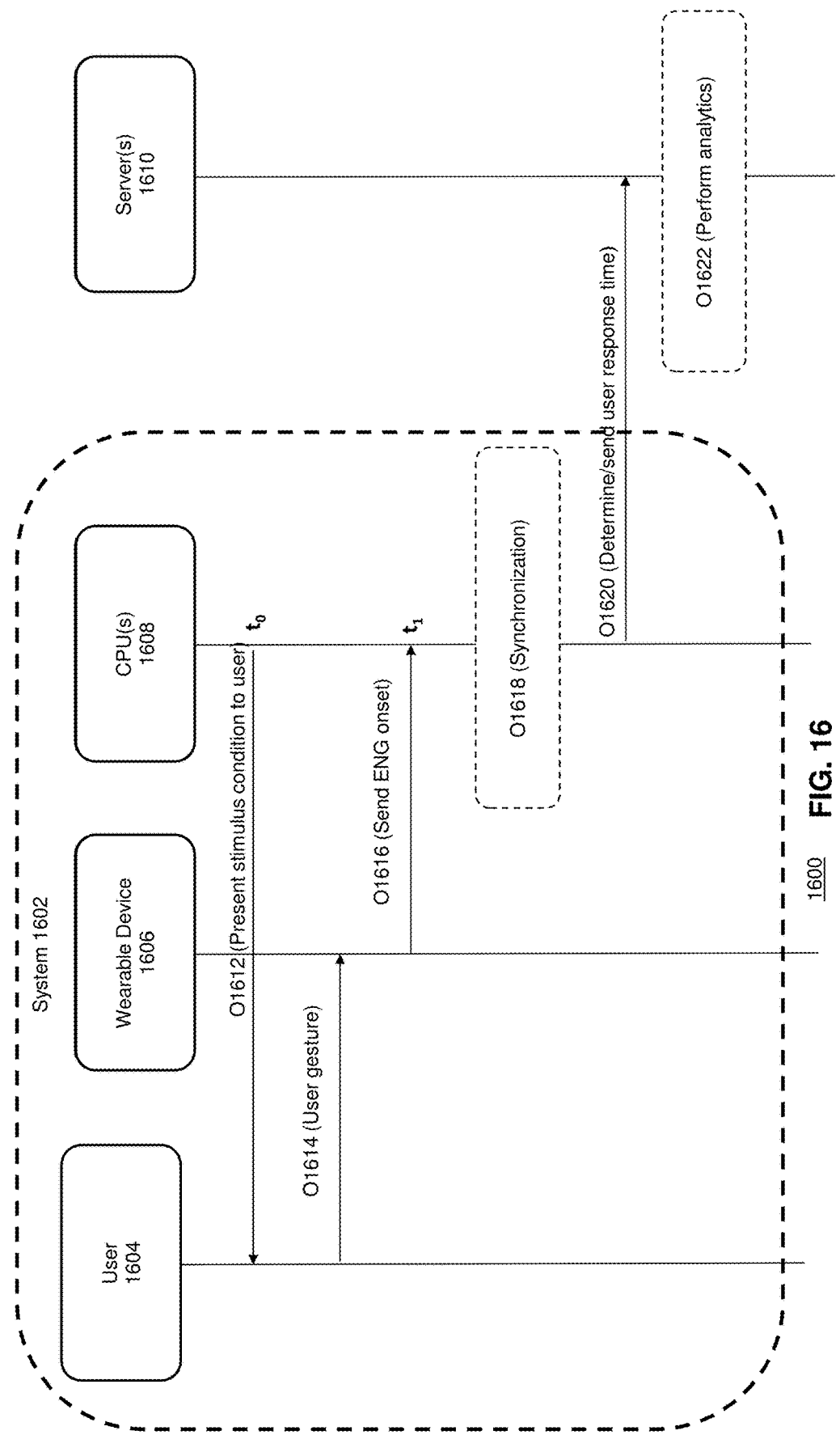
FIG. 16 depicts an example sequence diagram for a system configured to assess a reaction performance of a user engaging with an interactive digital program.

FIG. 16 depicts an example sequence diagram 1600 for a system 1602 configured to assess a reaction performance of a user 1604 engaging with an interactive digital program. As shown, the system 1602 may include one or more of a wearable device 1606 and one or more CPUs 1608 (that execute the operations of the interactive digital program), both of which may be able to send communications to a user 1604 (via a user device of the user). In some embodiments, the system 1602 may be configured to wirelessly transmit information related to a performed reaction time test to one or more server(s) 1610. Each of the foregoing is described in detail below.

At operation 1612, a stimulus condition may be presented to a user 1604. In some embodiments, the stimulus condition may be generated based on instructions associated with the execution of the interactive digital program to the CPU(s) 1608, which in turn the CPU(s) 1608 uses to generate and transmit a real-time data stream of the interactive digital program. For example, the interactive digital program can be a VR video game running on a game engine that generates low-level instructions that the CPU 1608 execute, for example, which can involve the CPU 1608 sending instructions to other components such as a GPU for rendering. In such a case, the user 1604 wears special equipment such as a VR headset to immerse him or herself in a virtual environment. The user 1604 is then able to experience gameplay elements digitally created by the one or more CPUs 1608, which may include objects, characters, spaces, etc. of the game. The user 1604 may be able to interact/manipulate such elements using, for example, VR equipment, game controllers, or other input devices such as a hand controller that contains various motion tracking sensors (e.g., gyroscopes, accelerometers, cameras designed for positional tracking, etc.) configured to continuously transmit spatial data related to the user's position/orientation/motion to the one or more CPUs 1608. In some embodiments, in order for the CPUs 1608 to interpret the raw sensor data, a software development kit (SDK) of the VR equipment may be equipped with an application programming interface (API) along with other tools/resources that ensure compatibility between the two entities. For example, the API may be designed with functions and/or methods that work with the communication protocol used by the one or more sensors, thereby abstracting the complexities of the underlying protocol and allowing the one or more CPUs to read from and send data to the one or more sensors.

Figure 17:
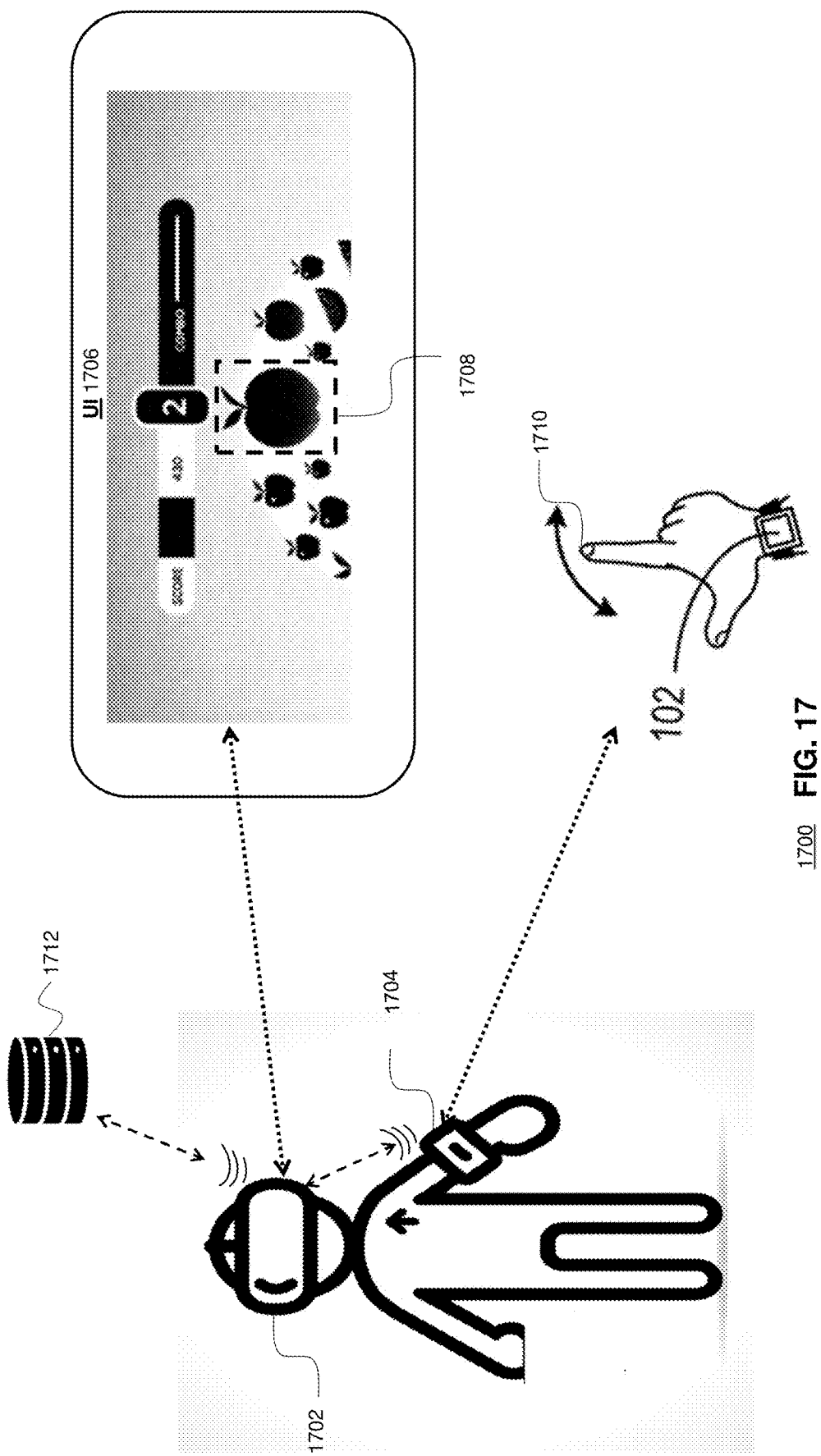
FIG. 17 depicts an example system overview for assessing a reaction performance of a user engaging in an interactive digital program.

In some embodiments, the stimulus condition may be a graphical display of an object presented to the user 1604 in the virtual environment (as shown in FIG. 17). In some embodiments, the stimulus condition may be presented to the wearable device 1606 of the system 1602. Examples of such a stimulus condition include the illumination of one or more LEDs disposed on the wearable device 1606, an audio sound emitted by a speaker attached to the wearable device 1606, a haptic/tactile feedback to the wearable device 1606 (causing the wearable device to vibrate), and/or the like. Using the example mentioned above, one of the operations of the game engine may be to continuously check for events (based on event information) where the stimulus condition is presented (often referred to as a game loop). Additionally, timestamp information, which may be included in the event information, of when the stimulus condition has been presented can be acquired by the game engine based a game clock. Once this event is detected, the game engine may send an instruction to the CPUs 1608 indicating a stimulus condition has been presented to the user and the associated timestamp information. The CPUs 1608 may store the timestamp information in memory such as a register located within the CPU 1608. In the context of assessing a reaction time test as a user 1604 engages the interactive digital program, this recorded timestamp may be considered the start time, or to as shown in FIG. 16. In some embodiments, the game engine and/or CPUs 1608 may consist of dedicated hardware/software customized/designed to minimize system latency (described above) often introduced when using a general processor/OS. Examples of such customized hardware/software are provided in FIGS. 10 and 11. For example, the game engine and/or CPUs 1608 may be independent from the OS that manages the computer resources and/or services and is responsible to perform the system-level operations. The game engine may request/retrieve data/instructions from the system OS via, for example, an API configured to facilitate interaction between the two entities. Given this, the game engine may be configured with an internal time-keeping mechanism (prioritized and unaffected by the latency/noise associated with the general OS). Accordingly, the start timestamp may be more accurately recorded.

At operation 1614, a user 1604 may perform a gesture in response to the presentation of the stimulus condition. For example, the user 1604 may move a hand controller to manipulate a displayed graphic of the stimulus condition. In some embodiments, the wearable device 1606 may be able to detect that the user 1604 is gesturing in response to the stimulus condition without any incorporation of an external controller. For example, the wearable device 1606 may consist of the biopotential chip described in detail above. The biopotential chip may employ one or more electrodes configured to generate biopotential signals based on the user's gestures, which are then converted, using one or more ADCs, to biopotential data to determine when the user 1604 is performing a gesture or action in response to the stimulus condition (this process is described in detail in FIGS. 1-14). In some embodiments, sensors configured to generate spatial data, which are mentioned above, may be disposed on the wearable device 1606 and such spatial data may be used in combination with the generated biopotential data to identify the responsive action. Additionally, the spatial data (IMU data) may be transmitted to and processed by the CPUs 1608 in order to identify a current state of the user 1604. For example, based on the spatial data, the CPUs 1608 may determine that the user 1604 is holding a controller at a given position. Upon receiving the ENG onset signal from the wearable device 1606, the CPUs 1608 (or the game engine operating in conjunction with the CPUs 1608) may predict how a user 1604 will motion his or her controller based on the user's current state (along with contextual information about the gameplay). In such a case, the CPUs 1608 may initiate instructions for rendering an animation of the user's movement (which may include rendering other elements of the gameplay environment) before obtaining spatial data of the physical movement. This may help improve the latency of the game engine and reduce overall lag experienced by the user 1604 during the course of the interactive program.

At operation 1616, a wearable device 1606 worn by the user may detect an ENG onset and transmit information indicative of the detection to the CPUs 1608. This detection may be based on analyzing samples of the biopotential data discussed above. In some embodiments, the wearable device 1606 may be integrated with the one or more CPUs 1608 (and the game engine) using techniques similar to those used when integrating external gameplay equipment (the VR headset, controller, the one or more sensors, etc. which are discussed above). For example, an API may be set-up to facilitate transmissions between the wearable device 1606 and the CPUs 1608. For example, the API can contain one or more functions/rules that abstract the complexities of the underlying hardware and protocol used by the wearable device when transmitting the ENG data such that the one or more CPUs 1608/game engine can interpret the data. In some embodiments, the wearable device 1606, a user device, and the one or more CPUs 1608 may transmit data to one another via a wired connection (e.g., a USB), which is often a more convenient means of communication in circumstances where the game engine is a console. Timestamp information of when the ENG onset was detected (which can be stored at an internal register of the wearable device 1606 as discussed above) may be included in the information transmitted to the CPUs 1608 (e.g., such information may be sent to the API that the CPUs 1608 can query to retrieve such information). In some embodiments, the CPUs 1608 may regularly check the API for new ENG onset information (polling-based protocol) or the API may notify (e.g., via a callback function) the CPUs 1608 of newly obtained ENG onset information (event-driven protocol). In the context of assessing reaction time, this timestamp information may be recorded by the CPUs 1608 as the stop timestamp, or ti as shown in FIG. 16. By virtue of using the ENG onset (which measures PMT) instead of physical movement, electromechanical delay does not skew the recorded timestamp, thus the stop timestamp is more accurate and better reflects the user's reaction time to a given stimulus condition. Further details of the advantages for opting to use ENG onset as the indicator of the user's responsive action are provided in FIGS. 10-14.

At operation 1618, the timestamp of the ENG onset obtained from the wearable device 1606 may be synchronized with the internal clock of the game engine. Such synchronization may be especially useful in real-time applications due to the wearable device 1606 and the game engine operating on separate clocks that can be misaligned from one another. In some embodiments, the API may be designed with methods that synchronize the ENG timestamp (in addition with timestamp information sent from other external devices such as the one or more motion-tracking sensors) with the internal clock of the game engine. In some embodiments, the start and stop timestamps may only be recorded at the CPUs 1608 upon an indication of successful synchronization between the relevant timestamp information.

At operation 1620, a user response time (also referred to as subject response time herein) may be determined and sent to one or more servers 1610. The user response time may measure the results of the reaction time test performed at some point during the course of the user 1604 engaging the interactive digital activity. For example, the response time may be calculated by an internal component of the system 1602 designed to perform computations on the recorded start and stop timestamps (e.g., a calculation can be generating a delta between the two recordings). In some embodiments, the system 1602 may simply send the start and stop timestamps to the one or more servers 1610 without performing any computation. In such a case, the analytics performed at the one or more servers 1610 may include computational analysis along with the other statistical analysis techniques provided below. It should be noted that while a singular pair of start and stop timestamps used during an assessment of a simple reaction time test is used an example herein, the system 1602 may be configured to generate an assortment of different variations of measuring reaction time, which can include multiple start and stop timestamps and defined relationships among the timestamps. For example, Go/No-Go, SSRT, PVT, and/or other reaction tests discussed above may be performed by duplicating one or more of the techniques described in FIGS. 15 and 16 and sending multiple iterations of start and stop timestamps for analysis (along with contextual information associated with the gameplay such as the period between when the stimulus condition was presented, the type of stimulus condition that was presented, etc.).

At operation 1622, one or more remote servers 1610 may perform analytics on the obtained response time (or in the case of direct transmission of timestamps, on the timestamp information itself). Such analysis may provide insights as to a user's reaction performance during an interactive digital program. To use an example, during a session of the user 1604 engaging in an interactive digital program, a plurality of subject response times may be determined for the user, at periodic intervals, based on respective first and second timestamps. The one or more servers 1610 may calculate an aggregate measure based on multiple of the plurality of subject response and generate one or more scores reflecting how well the user 1604 performed during the session. In some embodiments, each score may be based on an individual, separate reaction time test. For example, a first score may be generated from the result of a Go/No-Go reaction time test and may reflect the user's impulse control ability while a second score may be generated from the results of a PVT reaction time test and may reflect the user's overall alertness. One or more scores may be generated to assess performance metrics that are insightful to video game skill and/or athletic performance. Examples of scores related to the reaction performance of a user include one or more of actions per minute (APM), completion time, decision-making speed, response time, and/or time-to-target.

FIG. 17 depicts an example diagram 1700 for a system assessing a reaction performance of a user engaging in an interactive digital program. As shown, the system may involve a user wearing a wearable device 1704 and specialized equipment 1702. The user may interface with a stimulus condition graphic 1708 shown during a rendering of the interactive digital program via a user interface 1706. In some embodiments, the user may perform one or more responsive actions in response to the stimulus condition, which can include one or more gestures 1710. Information related to the user's responsive actions may be transmitted to one or more servers 1712 for further analysis. Each of the foregoing is described below.

In some embodiments, a user may wear specialized equipment 1702 integrated with a game engine (executing the interactive digital program via one or more processors) or another software framework that executes the operations of an interactive digital activity. Examples of specialized equipment 1702 are provided in FIG. 16. In some cases, no specialized equipment 1702 may be needed in order for the system to assess the reaction performance of a user during an interactive digital program. For example, the interactive digital program may be executed by an application hosted on a user device, where graphical renderings of the gameplay are presented on a display of the user device. When one or more of the graphical renderings represent a stimulus condition, the user may be able to perform a responsive action by gesturing while wearing the wearable device 1704. Information representative of an ENG onset that is detected from the gesture 1710 (along with spatial data generated from one or more sensors disposed on the wearable device 1704) may dictate how the user intends to interface with the graphical interface. For example, such information may indicate that the user intends to strike a certain stimulus condition and, accordingly, the host program may generate and send instructions to modify the graphical rendering in accordance with the strike (remove the graphic of the stimulus condition).

In some embodiments, specialized equipment 1702 may be useful for the system to identify start and stop times along with contextual information pertinent to the user's reaction performance. For example, equipment 1702 with tracking/monitoring functionality that can track how the user is interacting during the interactive digital program may provide additional insights related to the user's response times to respective stimuli conditions. For example, the user may wear a headset that utilizes a camera-based eye tracking system (or another tracking method such as electrooculography (EOG)) to generate data based on how the user moves/positions his or her eyes. Such data may enable the system to perform event detection of the stimulus condition, or in other words, signal when the user sees the presented stimulus condition. In some cases, the system may incorporate this technique when determining the start timestamp of the reaction time test (instead of the first timestamp being recorded based on the time when the CPUs sent the instruction to present the stimulus condition, it will be recorded based on the time when the tracking data indicates the user first spots the stimulus condition). In some embodiments, this data may be compared to the timestamp of when the instruction to present the stimulus condition was sent. This comparison may provide additional insights related to reaction performance, such as how quickly the user's eyes, as opposed to their body, respond to presented stimulus conditions. Other examples of tracking equipment features that could be useful for the system include head tracking (often used as a proxy for eye-tracking), motion tracking, voice recognition (particularly useful in the case where the responsive action is a voice command performed by the user), mouse tracking, facial expression analysis (system can determine if the user lacks engagement or expresses a particular emotional response), and/or other tracking methodologies.

A wearable device 1704 may be worn by the user as he or she engages the interactive digital program, as shown in FIG. 17. Characteristics and features of the wearable device 1704 are described in detail in FIGS. 1-16. As shown, the wearable device 1704 may be wirelessly connected (via Bluetooth, WiFi, etc.) to any specialized equipment 1702 as well as to the game engine or software program executing the interactive digital program. In some embodiments, similar to the specialized equipment 1702, the wearable device 1704 may incorporate tracking functionality to generate data that can assist in detecting the ENG onset and/or the particular gesture that the user is performing.

In some embodiments, the graphic rendering of the interactive digital program may be displayed via a UI 1706, as shown in FIG. 17. In some embodiments, the UI 1706 may be part of an application/framework (such as a web or mobile application or desktop environment) that the user interacts with. In some embodiments, a "display-only" or static UI may be used (particularly in gaming or multimedia applications) in which case the UI 1706 presents the graphics to the user, but doesn't respond to user input. Using this UI 1706 does not impair the system's ability to record the stop timestamp of the user's responsive action since the system determines the stop timestamp based on the output from the wearable device 1704.

In some embodiments, when the one or more CPUs determine that a stimulus condition is to be presented to a user as described in FIG. 16, it may generate and send a rendering command (comprising a variety of information necessary for the rendering) to the UI framework that manages the graphical rendering. The rendering command may instruct the UI framework to display a graphical rendering that includes a graphic for the stimulus condition 1708. Additionally, the command may contain information on how to differentiate this graphic 1708 from other non-stimulus condition graphics included in the rendering. For example, the information may include a set of vertices that define where the graphic of the stimulus condition 1708 is to be presented as well as color data for the vertices (color this graphic red), which is used to distinguish this graphic 1708 from others. Other means for distinguishing the stimulus condition graphic 1708 may be implemented such as a rendering command that places a dashed box around the stimulus condition graphic 1708, as shown in FIG. 17. In some embodiments, an auditory alert or haptic feedback may be outputted to the user when the stimulus condition is presented.

In some embodiments, the responsive action performed by the user in response to the stimulus condition may be a gesture 1710. Gestures 1710 may be performed by any body part comprising peripheral nerve tissue coupled to the central nervous system of the user, where if the wearable device 1704 is disposed adjacent to a skin portion of the body part and the user performs a gesture 1710, the electrodes of the wearable device 1704 can detect biopotential signals from the peripheral nerve tissue. For example, the wearable device 1704 may be worn on the wrist of the user. In such a case, hand and/or arm gestures 1710 may generate biopotential signals indicative of an ENG onset. For the wrist use case, examples of gestures 1710 may be a swipe, a fist, a finger/hand extension, a circular movement, an arm swing, a swat, etc. In some cases, data generated from the ENG onset triggered as the user intends to perform a given gesture 1710 may be used to indicate the timestamp when the user performed the responsive action in response to the stimulus condition. This may occur before the user physically performs the gesture 1710 and thus before any IMU data is generated, which is described above.

Figure 18:
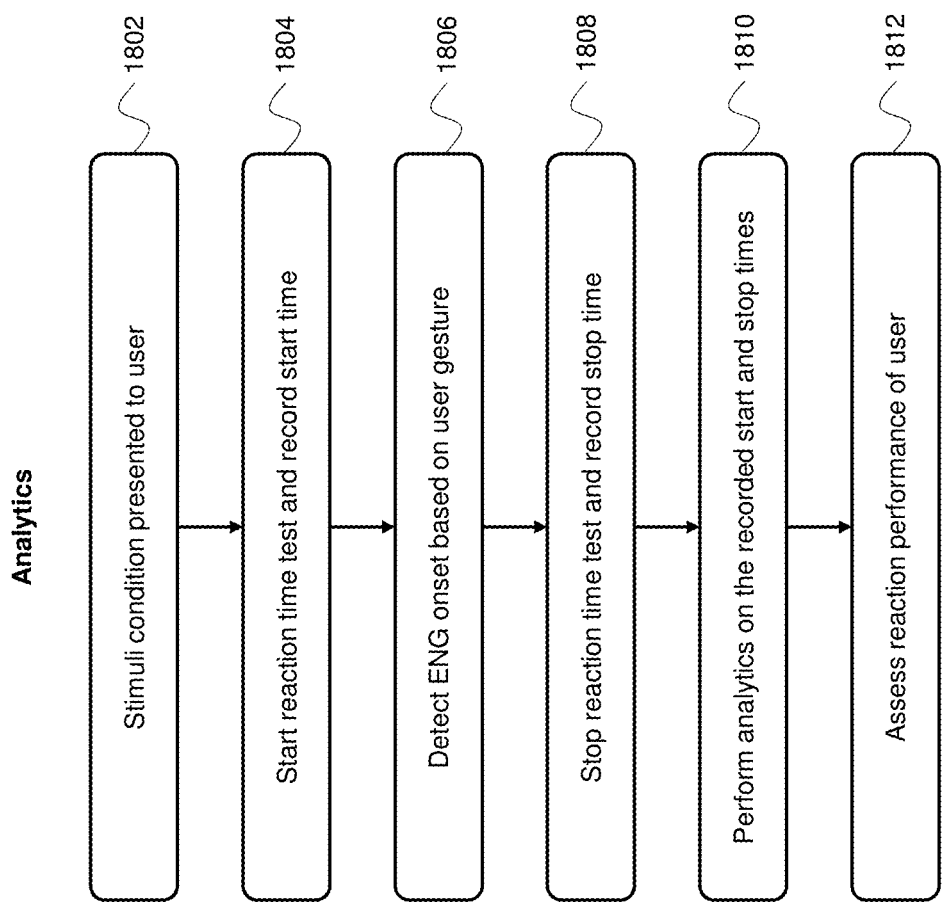
FIG. 18 depicts an example method of performing analytics in order to assess a reaction performance of a user engaging in an interactive digital program.

FIG. 18 depicts an example method 1800 of performing analytics in order to assess a reaction performance of a user engaging in an interactive digital program. In some embodiments, one or more server(s) may obtain the information generated during the interactive digital program and perform one or more server-side analytics to provide insights or reports about the reaction performance of the user. It should be noted that there are other analytics platforms/methodologies similar and/or complementary to server-side analytics that are capable of generating meaningful insights/reports, which are described below.

At operation 1802, the stimulus condition may be presented to the user. Details of the manner and purpose of presenting the stimulus condition are discussed in FIGS. 15-17. In some embodiments, the selection of which stimulus condition to present may depend on the type of reaction test being utilized by the system. For example, during the execution of the interactive digital program, the system may want to assess how well the user responds to a series of varying stimulus conditions and decide to initiate a suitable reaction time test such as a sequential reaction time test, a PVT, a Go/No-Go reaction time test, a discrimination reaction time test, a choice reaction time test, etc. The one or more CPUs can generate and send a series of instructions (command renderings along with rendering information) that when processed graphically render stimulus condition graphics with varying characteristics.

At operation 1804, the reaction time test may be initiated at a given time during the execution of the interactive digital program. As described above, the start timestamp may be recorded upon the test being initiated. In some embodiments, determining when to initiate a given reaction time test may be based on a context of the interactive digital program. For example, a game engine may be equipped to collect and analyze data related to the progression of the interactive digital program in real-time. Such data may be used as feedback allowing the system to track the dynamic interactions of the user engaged with the interactive digital program. Accordingly, based on the feedback, the system can determine at which state during the interactive digital program a reaction time test would produce meaningful insights for the user's reaction performance and initiate the reaction time test.

At operation 1806, an ENG onset may be detected from the wearable device based on the user intending to perform a responsive action, such as a gesture to the stimulus condition. Detecting ENG onset that measures PMT may eliminate noise such as electromechanical delays, resulting in more accurate measurements of when the user performs the responsive action (reacts) to the stimulus condition, details of which are provided above.

At operation 1808, the reaction time test may be stopped/terminated and a stop timestamp may be recorded. Details of how the system determines when the reaction time test has been completed by the user are provided above. In some embodiments, the system may only determine to stop the reaction time test if the ENG onset is detected during a certain context/state of the interactive digital program. For example, the game engine may provide feedback (using the technique mentioned) indicating that the interactive digital program is currently executing a non-interactive sequence. During such a period, user input may be temporarily disabled or ignored by the game engine. Additionally, the system may consider any information indicative of an ENG onset detection obtained during such period as not reflective of a user performing a responsive action. In some embodiments, if a reaction time test has been initiated and is active during an interactive-digital sequence, the system may obtain timing information (timestamps of the start and stop times of the non-interactive digital sequence) stored by the game engine. Upon the system determining that the responsive action has been performed and terminating the reaction time test, it may subtract or otherwise account for this timing information when recording the stop timestamp (since the second timestamp may be recorded based on the internal game clock that may continuously run during non-interactive sequences, this period can distort how long it actually took the user to react).

At operation 1810, analytics may be performed based on the information generated during the interactive digital program (the recorded start and stop timestamps). The system may incorporate or alternatively opt to use various platforms/methodologies in order to generate an assessment of the reaction performance. Examples of such platforms/methodologies include client-side analytics (which happens locally at the system), edge analytics performed at one or more edge servers or edge computational devices located in proximity to the source (the CPUs of the system) generating the reaction time information (these can be located within the same network of the system), cloud analytics performed on a cloud platform, distributed analytics where processing the input information is distributed across multiple devices/nodes using a configured framework, and/or other analytics platforms/methodologies with features designed to provide insightful outputs.

At operation 1812, a reaction performance assessment may be generated for the user. Details of the reaction performance assessment are provided in FIG. 16. In some embodiments, a baseline response time may be generated for an individual user based on an aggregate measure of a series of subject response times determined during one or more interactive digital programs that the user engaged. The baseline response time may demonstrate how a particular user usually performs during an interactive digital program. Data for this baseline response time may be stored at the analytics platform and linked to a registered user account of the user. When sending the information generated from a new interactive digital program, the system may additionally include registration information (such as the ID of the registered user account) so that the analytics platform can identify the given user and retrieve the user's stored baseline response time which might provide insights as to any change in the user's reaction performance.

Figure 19:
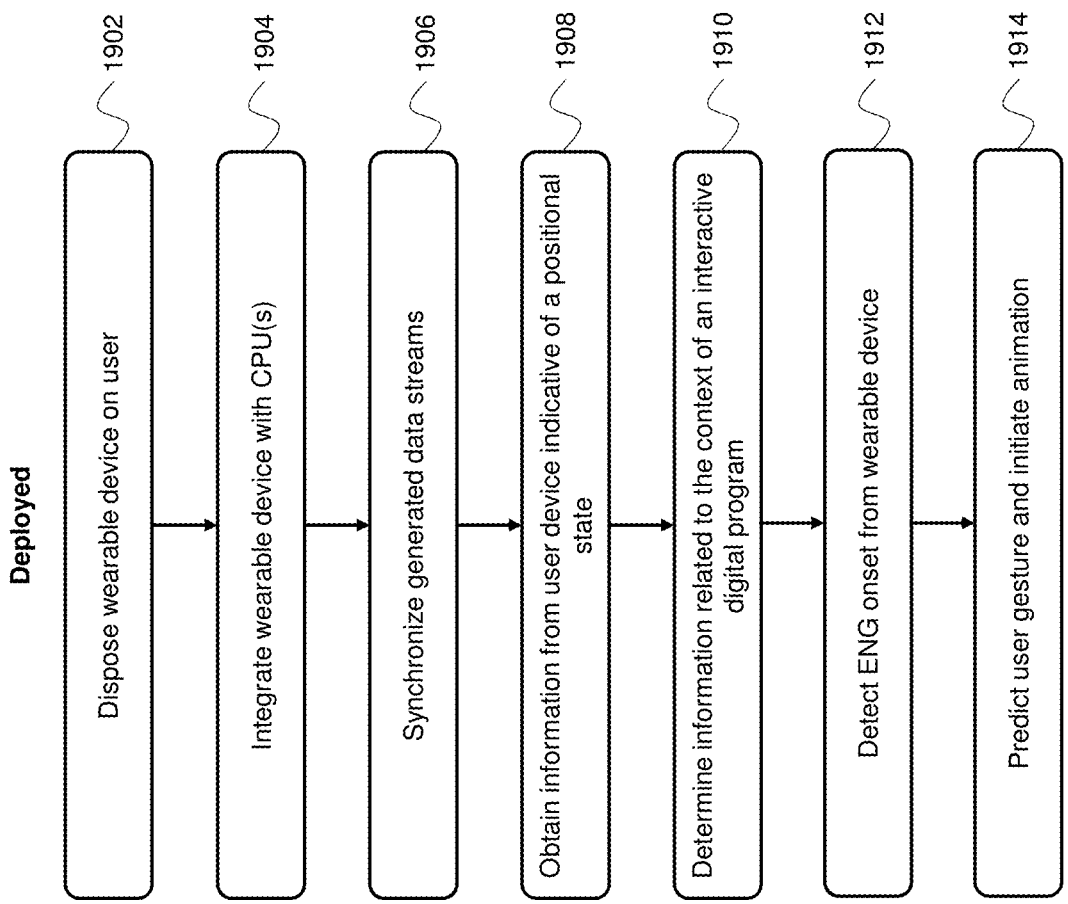
FIG. 19 depicts an example method of predicting a gesture for the user engaging in an interactive digital program and initiating an animation based on the predicted gesture.

FIG. 19 depicts an example method 1900 of predicting a gesture for the user engaging in an interactive digital program and initiating an animation based on the predicted gesture.

At operation 1902, a wearable device may be disposed on (worn by) the user. Details of the significance of placing the wearable device at a portion of the user's body where biopotential signals can be detected are provided above.

At operation 1904, the wearable device may be integrated with the one or more CPUs/game engine to ensure compatibility. Integrating the two entities may include establishing a communication protocol defining how data is to be exchanged, transforming that data generated from the wearable device into a format where the game engine/CPUs can correctly parse and interpret any obtained data, setting-up one or more APIs between the two entities, and/or the like.

At operation 1906, timing information received from the wearable device may be synchronized with the internal clock of the game engine. Different synchronization techniques are discussed in detail above. To reiterate, synchronization may be an important feature of the system in order to ensure that the recorded stop timestamp (based on the timing information associated with the ENG onset) is accurate.

At operation 1908, information may be obtained from a user device indicting that the user is in a current positional state. For example, a user device may be a controller that the user manipulates in order to interact with the interactive digital program. Such a controller may contain equipment, such as one or more sensors, that can track the user's position/movement within a given space and generate spatial data (examples of which are provided above) in accordance with the movement. In some embodiments, the generated spatial data may be obtained by the one or more CPUs/game engine and mapped to vertices of the environment of the interactive digital program such that the displayed graphical renderings match the user's current position.

At operation 1910, information related to the context of the interactive digital activity may be determined. For example, the game engine may generate and store such information throughout the course of the interactive digital activity, details of which are describe above.

At operation 1912, information indicative of an ENG onset may be detected from the wearable device. As described herein, such information may be transmitted to the one or more CPUs/game engine for further processing.

At operation 1914, a user gesture may be predicted and an animation sequence of the interactive digital program may be initiated. The prediction may be based on one or more of the current positional state of the user (as determined by the generated spatial data), the context of the interactive digital program, and/or the detection of the ENG onset. In some embodiments, the game engine may map the obtained spatial data and determine that the user is currently positioned in a state where he or she is likely to perform a particular gesture at a given frame (subsequent frame) of the interactive digital program. Additionally, the game engine may make such a determination based on the context of the frame, such as which gameplay elements are actively present in the interactive digital program. For example, an element depicting a stimulus condition graphic may be presented to the user. Additionally, the system may determine based on the mapped spatial data that the user is holding the controller at a position directly above the stimulus condition graphic. Based on these two pieces of information, the system may identify that the user is likely to perform the gesture of moving his or her hand downwards in order to strike the stimulus condition graphic. In some embodiments, an EMG onset may be detected from a wearable device worn on a wrist of the user, where the wearable device and the controller are disposed on the same arm. The system may predict the downward movement gesture upon processing the ENG onset detection before any spatial data indicative of physical movement is received (in some cases, the prediction may be made before the user actually moves his or her arm). Accordingly, the one or more CPUs may begin sending instructions to graphically render an animation of the gesture. Using one or more of the techniques described above may improve the latency of the interactive digital program, resulting in less lag experienced by the user.

Figure 20:
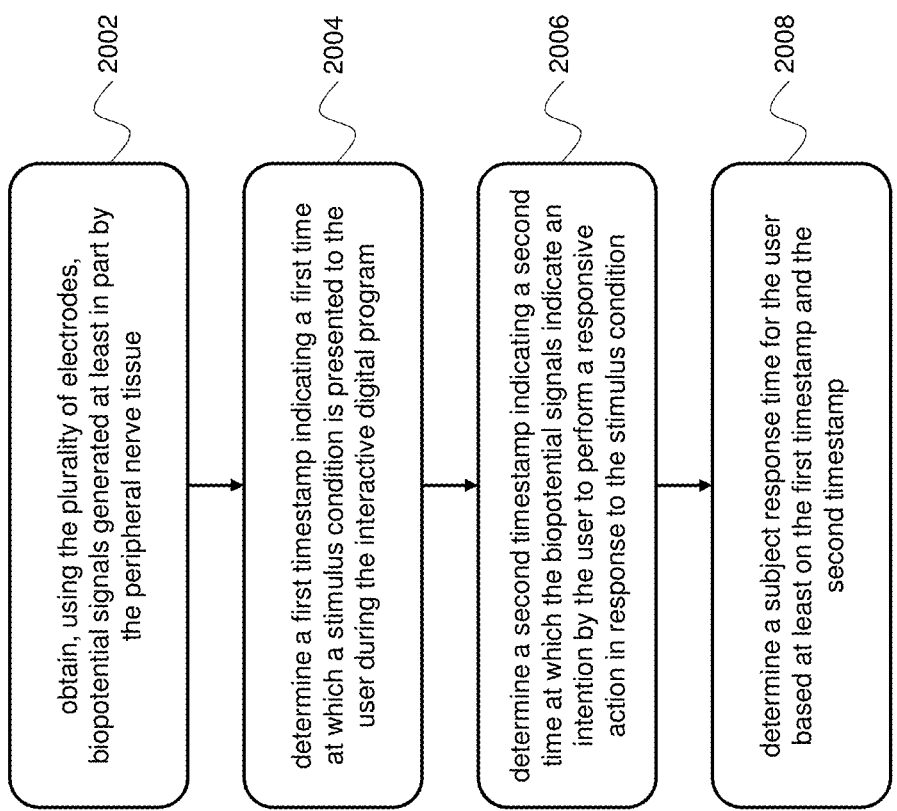
FIG. 20 shows an exemplary method for assessing a reaction performance of a user engaging with an interactive digital program based at least in part on biopotentials detected at an external surface of a skin portion of the user.

FIG. 20 shows an exemplary method 2000 for assessing a reaction performance of a user engaging with an interactive digital program based at least in part on biopotentials detected at an external surface of a skin portion of the user. A wearable device may be configured to be worn by the user. The wearable device may comprise one or more electrodes configured to be disposed adjacent to an external surface of the skin portion. The skin portion may be disposed at a body portion comprising peripheral nerve tissue that is biologically coupled to a central nervous system of the user. A system may configured to perform one or more of the following described below. At 2002, biopotential signals generated at least in part by the peripheral nerve tissue may be obtained, using the plurality of electrodes. At 2004, a first timestamp may be determined. The first timestamp may indicate a first time at which a stimulus condition based on a graphical display is presented to the user during the interactive digital program. In some embodiments, the system may comprise the interactive digital program being executed by the one or more processors. The one or more processors may be wirelessly connected to the wearable device and configured to generate a real-time data stream comprising a sequence of digitally encoded signals based on instructions from the interactive digital program. At least a portion of the sequence of digitally encoded signals may be indicative of the stimulus condition. In some embodiments, the interactive digital program may provide an instruction to the one or more processors indicating that the stimulus condition of the graphical display has been presented to the user. The first timestamp may be determined by registering a time, on a game clock, that the instruction to present the stimulus condition is received and processed by the one or more processors. At 2006, a second timestamp may be determined. The second timestamp may indicate a second time at which the biopotential signals indicate an intention by the user to perform a responsive action in response to the stimulus condition. In some embodiments, the wearable device may comprise a monotonic clock and one or more analog-to-digital converters (ADCs) being configured to convert biopotential signals received by the one or more electrodes to a series of biopotential data samples, and each sample of biopotential data has a respective timestamp determined by the monotonic clock. The second timestamp may be determined by analyzing the series of biopotential data samples, selecting a set of one or more biopotential data samples that indicate the intention by the user to perform the responsive action in response to the stimulus condition, and determining the second timestamp based on one or more timestamps of the selected set of one or more biopotential samples that indicate the intention by the user to perform the responsive action. At 2008, a subject response time for the user may be determined based at least on the first timestamp and the second timestamp. In some embodiments, during a session of the user engaging in the interactive digital program, a plurality of subject response times may be determined for the user, at periodic intervals, based on respective first and second timestamps and an aggregate measure may be determined based on multiple of the plurality of subject response times. Based on the aggregate measure, or one or more values based thereon, a score associated with the reaction performance of the user may be generated. The score may relate to one or more of actions per minute (APM), completion time, decision-making speed, response time, or time-to-target. In some embodiments, the one or more processors executing the interactive digital program may be included in one or more of a video game console, a personal computer, a mobile device running a software application, or an extended reality (XR) headset. In some embodiments, the system may comprise an inertial measurement unit (IMU) device connected to the one or more processors. The IMU device may determine a current position of the user's hand. The system may be configured to predict a gesture of the user based, at least in part, on the biopotential signals and the hand position. Based on the predicted gesture of the user, the interactive digital program may be configured to provide an instruction to the one or more processors indicating to initiate an animation sequence reflecting the predicted gesture.

Computer System

Figure 21:
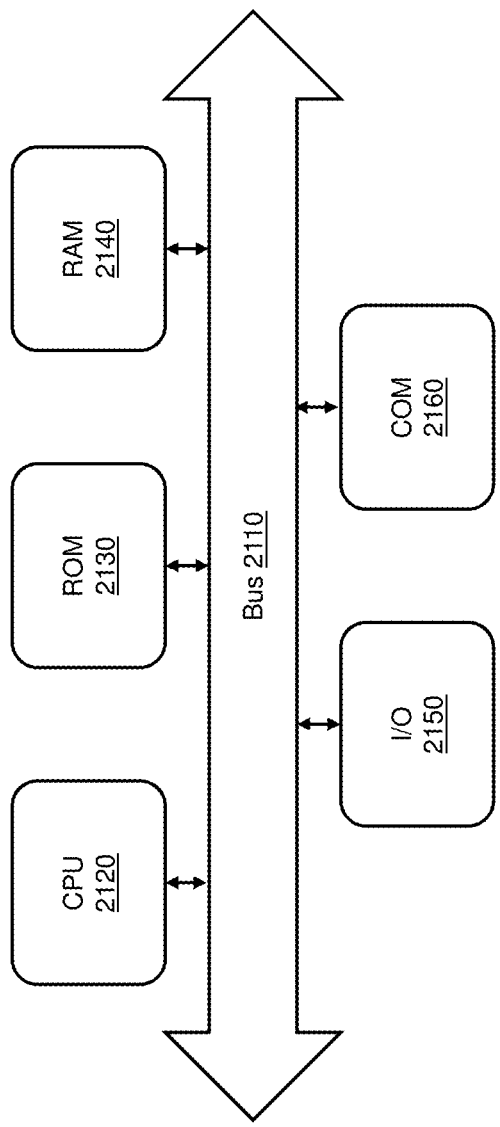
FIG. 21 depicts an example system that may execute techniques presented herein.

FIG. 21 depicts an example system that may execute techniques presented herein. FIG. 21 is a simplified functional block diagram of a computer that may be configured to execute techniques described herein, according to exemplary cases of the present disclosure. Specifically, the computer (or "platform" as it may not be a single physical computer infrastructure) may include a data communication interface 2160 for packet data communication. The platform may also include a central processing unit 2120 ("CPU 2120"), in the form of one or more processors, for executing program instructions. The platform may include an internal communication bus 2110, and the platform may also include a program storage and/or a data storage for various data files to be processed and/or communicated by the platform such as ROM 2130 and RAM 2140, although the system 2100 may receive programming and data via network communications. The system 2100 also may include input and output ports 2150 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of 10% in a stated value.

The term "exemplary" is used in the sense of "example" rather than "ideal." As used herein, the singular forms "a," "an," and "the" include plural reference unless the context dictates otherwise.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

EXAMPLES

Clause 1. A system for assessing a reaction performance of a user engaging with an interactive digital program based at least in part on biopotentials detected at an external surface of a skin portion of the user, the system comprising: one or more processors; and a wearable device configured to be worn by the user, the wearable device comprising: one or more electrodes configured to be disposed adjacent to an external surface of the skin portion, wherein the skin portion is disposed at a body portion comprising peripheral nerve tissue that is biologically coupled to a central nervous system of the user; wherein the system is configured to: obtain, using the plurality of electrodes, biopotential signals generated at least in part by the peripheral nerve tissue; determine a first timestamp, the first timestamp indicating a first time at which a stimulus condition based on a graphical display is presented to the user during the interactive digital program; determine a second timestamp, the second timestamp indicating a second time at which the biopotential signals indicate an intention by the user to perform a responsive action in response to the stimulus condition; and determine a subject response time for the user based at least on the first timestamp and the second timestamp.

Clause 2. The system of Clause 1, the system further comprising the interactive digital program being executed by the one or more processors, wherein the one or more processors are wirelessly connected to the wearable device and configured to generate a real-time data stream comprising a sequence of digitally encoded signals based on instructions from the interactive digital program, wherein at least a portion of the sequence of digitally encoded signals are indicative of the stimulus condition.

Clause 3. The system of Clause 2, wherein the interactive digital program provides an instruction to the one or more processors indicating that the stimulus condition of a graphical display has been presented to the user, and wherein a first timestamp is determined by registering a time, on a game clock, that the instruction to present the stimulus condition is received and processed by the one or more processors.

Clause 4. The system of any of Clauses 1-2, wherein during a session of the user engaging in the interactive digital program, a plurality of subject response times are determined for the user, at periodic intervals, based on respective first and second timestamps and an aggregate measure is determined based on multiple of the plurality of subject response times.

Clause 5. The system of any of Clauses 1-4, wherein based on the aggregate measure, or a one or more values based thereon, a score associated with the reaction performance of the user is generated, wherein the score relates to one or more of actions per minute (APM), completion time, decision-making speed, response time, or time-to-target.

Clause 6. The system of Clause 1, wherein the wearable device comprises a monotonic clock and one or more analog-to-digital converters (ADCs) being configured to convert biopotential signals received by the one or more electrodes to a series of biopotential data samples, and each sample of biopotential data has a respective timestamp determined by the monotonic clock.

Clause 7. The system of any of Clauses 1-6, wherein a second timestamp is determined by analyzing the series of biopotential data samples, selecting a set of one or more biopotential data samples that indicate the intention by the user to perform the responsive action in response to the stimulus condition, and determining the second timestamp based on one or more timestamps of the selected set of one or more biopotential samples that indicate the intention by the user to perform the responsive action.

Clause 8. The system of any of Clauses 1-7, wherein the one or more processors executing the interactive digital program are included in one or more of a video game console, a personal computer, a mobile device running a software application, or an extended reality (XR) headsets.

Clause 9. The system of Clause 1, the system further comprising an inertial measurement unit (IMU) device connected to the one or more processors, wherein the IMU device determines a current position of the user's hand, and wherein the system is further configured to predict a gesture of the user based, at least in part, on the biopotential signals and the hand position.

Clause 10. The system of Clauses 9, wherein based on the predicted gesture of the user, the interactive digital program is configured to provide an instruction to the one or more processors indicating to initiate an animation sequence reflecting the predicted gesture.

Clause 11. A method for assessing a reaction performance of a user engaging with an interactive digital program based at least in part on biopotentials detected at an external surface of a skin portion of the user, the method comprising: obtaining, using a plurality of electrodes, biopotential signals generated at least in part by the peripheral nerve tissue that is biologically coupled to a central nervous system of the user; determining a first timestamp, the first timestamp indicating a first time at which a stimulus condition based on a graphical display is presented to the user during the interactive digital program; determining a second timestamp, the second timestamp indicating a second time at which the biopotential signals indicate an intention by the user to perform a responsive action in response to the stimulus condition; and determining a subject response time for the user based at least on the first timestamp and the second timestamp.

Clause 12. The method of Clause 11, further comprising executing the interactive digital program via one or more processors, wherein the one or more processors are wirelessly connected to a wearable device and configured to generate a real-time data stream comprising a sequence of digitally encoded signals based on instructions from the interactive digital program, wherein at least a portion of the sequence of digitally encoded signals are indicative of the stimulus condition.

Clause 13. The method of Clause 12, wherein the interactive digital program provides an instruction to the one or more processors indicating that the stimulus condition of the graphical display has been presented to the user, and wherein a first timestamp is determined by registering a time, on a game clock, that the instruction to present the stimulus condition is received and processed by the one or more processors.

Clause 14. The method of any of the Clauses 11-12, wherein during a session of the user engaging in the interactive digital program, a plurality of subject response times are determined for the user, at periodic intervals, based on respective first and second timestamps and an aggregate measure is determined based on multiple of the plurality of subject response times.

Clause 15. The method of any of Clauses 11-14, wherein based on the aggregate measure, or one or more values based thereon, a score associated with the reaction performance of the user is generated, wherein the score relates to one or more of actions per minute (APM), completion time, decision-making speed, response time, or time-to-target.

Clause 16. The method of Clause 11, wherein a wearable device comprises a monotonic clock and one or more analog-to-digital converters (ADCs) being configured to convert biopotential signals received by the one or more electrodes to a series of biopotential data samples, and each sample of biopotential data has a respective timestamp determined by the monotonic clock.

Clause 17. The method of any of Clauses 11-16, further comprising determining a second timestamp by analyzing the series of biopotential data samples, selecting a set of one or more biopotential data samples that indicate the intention by the user to perform the responsive action in response to the stimulus condition, and determining the second timestamp based on one or more timestamps of the selected set of one or more biopotential samples that indicate the intention by the user to perform the responsive action.

Clause 18. The method of any of the Clauses 11-17, further comprising executing the interactive digital program via one or more processors, wherein the one or more processors executing the interactive digital program are included in one or more of a video game console, a personal computer, a mobile device running a software application, or an extended reality (XR) headset.

Clause 19. The method of Clause 11, further comprising an inertial measurement unit (IMU) device connected to the one or more processors, wherein the IMU device determines a current position of the user's hand, and wherein the method further comprises predicting a gesture of the user based, at least in part, on the biopotential signals and the hand position.

Clause 20. The method of Clause 19, wherein based on the predicted gesture of the user, the interactive digital program is configured to provide an instruction to the one or more processors indicating to initiate an animation sequence reflecting the predicted gesture.

The invention claimed is:

1. A system for assessing a reaction performance of a user engaging with an interactive digital program based at least in part on biopotentials detected at an external surface of a skin portion of the user, the system comprising:
one or more processors; and
a wearable device configured to be worn by the user, the wearable device comprising:
one or more electrodes configured to be disposed adjacent to an external surface of the skin portion, wherein the skin portion is disposed at a body portion comprising peripheral nerve tissue that is biologically coupled to a central nervous system of the user;
wherein the system is configured to:
obtain, using the plurality of electrodes, biopotential signals generated at least in part by the peripheral nerve tissue;
determine a first timestamp, the first timestamp indicating a first time at which a stimulus condition based on a graphical display is presented to the user during the interactive digital program;
determine a second timestamp, the second timestamp indicating a second time at which the biopotential signals indicate an intention by the user to perform a responsive action in response to the stimulus condition presented to the user during the interactive digital program; and
determine a subject response time for the user based at least on an amount of time between the first timestamp and the second timestamp.

2. The system of claim 1, the system further comprising the interactive digital program being executed by the one or more processors, wherein the one or more processors are wirelessly connected to the wearable device and configured to generate a real-time data stream comprising a sequence of digitally encoded signals based on instructions from the interactive digital program, wherein at least a portion of the sequence of digitally encoded signals are indicative of the stimulus condition.

3. The system of claim 2, wherein the interactive digital program provides an instruction to the one or more processors indicating that the stimulus condition of the graphical display has been presented to the user, and wherein the first timestamp is determined by registering a time, on a game clock, that the instruction to present the stimulus condition is received and processed by the one or more processors.

4. The system of claim 1, wherein during a session of the user engaging in the interactive digital program, a plurality of subject response times are determined for the user, at periodic intervals, based on respective first and second timestamps and an aggregate measure is determined based on multiple of the plurality of subject response times.

5. The system of claim 4, wherein based on the aggregate measure, or one or more values based thereon, a score associated with the reaction performance of the user is generated, wherein the score relates to one or more of actions per minute (APM), completion time, decision-making speed, response time, or time-to-target.

6. The system of claim 1, wherein the wearable device comprises a monotonic clock and one or more analog-to-digital converters (ADCs) being configured to convert biopotential signals received by the one or more electrodes to a series of biopotential data samples, and each sample of biopotential data has a respective timestamp determined by the monotonic clock.

7. The system of claim 6, wherein the second timestamp is determined by analyzing the series of biopotential data samples, selecting a set of one or more biopotential data samples that indicate the intention by the user to perform the responsive action in response to the stimulus condition, and determining the second timestamp based on one or more timestamps of the selected set of one or more biopotential samples that indicate the intention by the user to perform the responsive action.

8. The system of claim 1, wherein the one or more processors executing the interactive digital program are included in one or more of a video game console, a personal computer, a mobile device running a software application, or an extended reality (XR) headset.

9. The system of claim 1, the system further comprising an inertial measurement unit (IMU) device connected to the one or more processors, wherein the IMU device determines a current position of the user's hand, and wherein the system is further configured to predict a gesture of the user based, at least in part, on the biopotential signals and the hand position.

10. The system of claim 9, wherein based on the predicted gesture of the user, the interactive digital program is configured to provide an instruction to the one or more processors indicating to initiate an animation sequence reflecting the predicted gesture.

11. A method for assessing a reaction performance of a user engaging with an interactive digital program based at least in part on biopotentials detected at an external surface of a skin portion of the user, the method comprising:
    obtaining, using a plurality of electrodes, biopotential signals generated at least in part by the peripheral nerve tissue that is biologically coupled to a central nervous system of the user;
    determining a first timestamp, the first timestamp indicating a first time at which a stimulus condition based on a graphical display is presented to the user during the interactive digital program;
    determining a second timestamp, the second timestamp indicating a second time at which the biopotential signals indicate an intention by the user to perform a responsive action in response to the stimulus condition presented to the user during the interactive digital program; and
    determining a subject response time for the user based at least on an amount of time between the first timestamp and the second timestamp.

12. The method of claim 11, further comprising executing the interactive digital program via one or more processors, wherein the one or more processors are wirelessly connected to a wearable device and configured to generate a real-time data stream comprising a sequence of digitally encoded signals based on instructions from the interactive digital program, wherein at least a portion of the sequence of digitally encoded signals are indicative of the stimulus condition.

13. The method of claim 12, wherein the interactive digital program provides an instruction to the one or more processors indicating that the stimulus condition of the graphical display has been presented to the user, and wherein the first timestamp is determined by registering a time, on a game clock, that the instruction to present the stimulus condition is received and processed by the one or more processors.

14. The method of claim 11, wherein during a session of the user engaging in the interactive digital program, a plurality of subject response times are determined for the user, at periodic intervals, based on respective first and second timestamps and an aggregate measure is determined based on multiple of the plurality of subject response times.

15. The method of claim 14, wherein based on the aggregate measure, or one or more values based thereon, a score associated with the reaction performance of the user is generated, wherein the score relates to one or more of actions per minute (APM), completion time, decision-making speed, response time, or time-to-target.

16. The method of claim 11, wherein a wearable device comprises a monotonic clock and one or more analog-to-digital converters (ADCs) being configured to convert biopotential signals received by the one or more electrodes to a series of biopotential data samples, and each sample of biopotential data has a respective timestamp determined by the monotonic clock.

17. The method of claim 16, further comprising determining the second timestamp by analyzing the series of biopotential data samples, selecting a set of one or more biopotential data samples that indicate the intention by the user to perform the responsive action in response to the stimulus condition, and determining the second timestamp based on one or more timestamps of the selected set of one or more biopotential samples that indicate the intention by the user to perform the responsive action.

18. The method of claim 11, further comprising executing the interactive digital program via one or more processors, wherein the one or more processors executing the interactive digital program are included in one or more of a video game console, a personal computer, a mobile device running a software application, or an extended reality (XR) headset.

19. The method of claim 11, further comprising an inertial measurement unit (IMU) device connected to the one or more processors, wherein the IMU device determines a current position of the user's hand, and wherein the method further comprises predicting a gesture of the user based, at least in part, on the biopotential signals and the hand position.

20. The method of claim 19, wherein based on the predicted gesture of the user, the interactive digital program is configured to provide an instruction to the one or more processors indicating to initiate an animation sequence reflecting the predicted gesture.

* * * * *